United States Patent
Zhang et al.

(10) Patent No.: US 8,817,751 B2
(45) Date of Patent: Aug. 26, 2014

(54) METHOD, DEVICE AND SYSTEM OF HANDOVER

(75) Inventors: Jian Zhang, Shenzhen (CN); Xiaobo Wu, Shenzhen (CN); Xiaoqin Duan, Shenzhen (CN); Qingyu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 625 days.

(21) Appl. No.: 12/707,236

(22) Filed: Feb. 17, 2010

(65) Prior Publication Data

US 2010/0142488 A1    Jun. 10, 2010

Related U.S. Application Data

(63) Continuation of application No. PCT/CN2008/072044, filed on Aug. 19, 2008.

(30) Foreign Application Priority Data

Aug. 19, 2007    (CN) .......................... 2007 1 0141459

(51) Int. Cl.
*H04W 4/00*    (2009.01)

(52) U.S. Cl.
USPC .......................................................... 370/332

(58) Field of Classification Search
USPC .......................................................... 370/332
See application file for complete search history.

(56) References Cited

U.S. PATENT DOCUMENTS

| | | | |
|---|---|---|---|
| 2005/0268296 A1 | 12/2005 | Marolia et al. | |
| 2006/0239229 A1 | 10/2006 | Marinescu et al. | |
| 2006/0258358 A1 | 11/2006 | Kallio | |
| 2007/0213060 A1* | 9/2007 | Shaheen | 455/436 |
| 2008/0267128 A1* | 10/2008 | Bennett et al. | 370/331 |

FOREIGN PATENT DOCUMENTS

| | | |
|---|---|---|
| CN | 1115165 A | 1/1996 |
| CN | 1859785 A | 11/2006 |
| CN | 1878403 A | 12/2006 |
| CN | 1984487 A | 6/2007 |
| WO | WO 2007/109966 A1 | 10/2007 |

OTHER PUBLICATIONS

Written Opinion of the International Searching Authority issued in corresponding PCT Patent Application No. PCT/CN2008/072044, mailed Dec. 4, 2008.

Search Report issued in corresponding European Patent Application No. 08784035, mailed Oct. 29, 2010.

(Continued)

*Primary Examiner* — Shripal Khajuria
(74) *Attorney, Agent, or Firm* — Brinks Gilson & Lione

(57) ABSTRACT

A handover method includes an evolved mobile switching center (eMSC) that receives a relocation request from a first network and forwards the relocation request to a second network requesting the second network to establish its own media plane association. The eMSC establishes a media plane association with the second network. The eMSC instructs a user equipment (UE) to access the second network. With the handover method, the UE may be handed over between different networks by using the eMSC. A method for reattaching a UE to the eMSC is also provided so that the UE can be reattached to a target eMSC when the eMSC to which the UE is attached is changed. A handover apparatus and a handover system are also provided.

9 Claims, 41 Drawing Sheets

(56) References Cited

OTHER PUBLICATIONS

T-Mobile, "Voice Telephony Services Continuity Between LTE and 2G/3G Radio Accesses", 3GPP TSG SA WG2 Architecture—S2#56b Rel-8 Ad-hoc. S2-070656. St. Louis, Missouri, USA, Feb. 12-15, 2007.
Nortel, "LTE-CS voice call continuity using CS-PS handover, VCC and ICS", 3GPP TSG SA WG2 Architecture—S2#57. S2-072102. Beijing, China, Apr. 23-27, 2007.
Nortel, "LTE-CS voice call continuity using CS-PS handover, VCC and ICS", 3GPP TSG SA WG2 Architecture—s2#57. S2-072281. Beijing, China, Apr. 23-27, 2007.
Qualcomm Europe, "Call Flows for Single Radio VCC", 3GPP TSG SA WG2 #57, Beijing, China, Apr. 23-27, 2007.
Alcatel-Lucent, Single Radio VCC: LTE-VMSC Anchor Solution, 3GPP TSG SA WG2 Architecture—S2#58. S2-072763. Orlando, FL, USA, Jun. 25-29, 2007.
Qualcomm Europe, "SR-VCC—Alternative E Enhancements", 3GPP TSG SA WG2 Architecture—S2#58. S2-072434. Orlando, USA, Jun. 25-29, 2007.
Global Systems for Mobile Communications, "3$^{rd}$ Generation Partnership Project; Technical Specification Group Services and System Aspects; 3GPP System Architecture Evolution: Report on Technical Options and Conclusions" (Release 7), 3GPP TR 23.882, V1.11.0, Jul. 2007.
Office Action issued in corresponding Chinese Patent Application No. 200710141459.3, mailed Apr. 25, 2011.
Office Action issued in corresponding Chinese Patent Application No. 200710141459.3, mailed Nov. 2, 2011.
Office Action issued in corresponding Chinese Patent Application No. 200710141459.3, mailed Mar. 29, 2012.
Office Action issued in corresponding European Patent Application No. 08784035.1, mailed Jul. 11, 2012.
Chinese Patent No. 101370266, issued on Mar. 20, 2013, granted in corresponding Chinese Patent Application No. 200710141459.3.
Extended European Search Report issued in corresponding European Patent Application No. 08784035.1, mailed Feb. 4, 2013.

\* cited by examiner

METHOD, DEVICE AND SYSTEM OF HANDOVER

CROSS-REFERENCE TO RELATED APPLICATIONS

This application is a continuation of International Application No. PCT/CN2008/072044, filed on Aug. 19, 2008, which claims priority to Chinese Patent Application No. 200710141459.3, filed on Aug. 19, 2007, both of which are hereby incorporated by reference in their entireties.

FIELD OF THE DISCLOSURE

The present disclosure relates to the radio communication field, and in particular, to a handover method.

BACKGROUND

To maintain the competitive edge of the 3rd Generation Partnership Project (3GPP) system in the next 10 years or a longer period, the 3GPP organization is making a research on access technology evolution. Particularly, to improve the capability of the 3GPP system to process fast growing IP data traffic, the packet technology used in the 3GPP system must be enhanced. The most important parts in the technology evolution include delay reduction, higher user data rate, enhanced system capacity and wider coverage, and reduction of an operator's total costs. In addition, the compatibility of the evolved network structure with the existing network is also an important index. To protect the existing investments of the operators and fully use traditional entities in a circuit switched (CS) domain, the prior art provides a solution for carrying CS data and signaling in a packet switched (PS) domain in an evolved network. This solution is called an evolved mobile switching centre (eMSC) solution. The eMSC solution in the existing standard is described herein. In a long term evolution (LTE)/system architecture evolution (SAE) network, the CS domain controls voice services of calls on a centralized basis. This solution uses a same control entity, for example, the eMSC, to control services from different access areas and simplifies the voice service continuity between the CS domain and the LTE/SAE network. In the eMSC solution, a UE can simultaneously connect to the IP multimedia sub-system (IMS) and the MSC to process different services. In addition, the eMSC solution provides a new network entity—eMSC, proposes new interfaces and gives some theoretical suggestions.

FIG. 1 is a block diagram of the eMSC solution in the prior art. Only a signaling path is given in FIG. 1. As shown in FIG. 1, the evolved radio network includes an evolved NodeB (eNB), an access gateway (AGW) module, and an eMSC. The AGW module includes a former mobility management module and a former user plane management module and acts as the user plane anchor between different access systems. The eMSC is a new entity for controlling CS voice services with most functions similar to those of a former MSC. For example, the eMSC has CS-oriented C and D interfaces and a PS-oriented Rx interface on the control plane that establishes a PS domain bearer through a policy and charging control (PCC) system.

However, the solution in the prior art does not describe how the UE is handed over between a PS network and a CS network by using the eMSC. That is, the solution in the prior art does not describe how the UE is handed over from a PS network to a CS network and from a CS network to a PS network by using the eMSC.

In addition, the solution in the prior art does not describe how the UE is reattached to a target eMSC when an eMSC to which the UE is attached is changed.

SUMMARY

An embodiment of the present disclosure provides a handover method so that a UE can be handed over between two networks by using an eMSC.

An embodiment of the present disclosure also provides a method for reattaching a UE to an eMSC so that the UE can be reattached to a target eMSC when an eMSC to which the UE is attached is changed.

Embodiments of the present disclosure are implemented as described herein.

A handover method provided in an embodiment of the present disclosure includes receiving, by an eMSC, a relocation request from a first network, forwarding, by the eMSC, the relocation request to a second network to request the second network to establish its own media plane association, establishing, by the eMSC, a media plane association with the second network, and instructing, by the eMSC, a UE to access the second network.

A handover apparatus provided in an embodiment of the present disclosure includes a receiving module configured to receive a relocation request from a first network, a forwarding module configured to forward the relocation request to a second network, a controlling module configured to establish a media plane association with the second network according to the relocation request, and an instructing module configured to instruct the UE to access the second network through the media plane association established by the controlling module.

A handover system provided in an embodiment of the present disclosure includes an eMSC configured to receive a relocation request from a first network and forward the relocation request to a second network and a UE configured to access the second network according to an instruction of the eMSC.

In the handover method provided in embodiments of the present disclosure, the eMSC forwards a relocation request from the first network to the second network, the second network establishes its own media plane connection, and the eMSC establishes a media plane connection with the second network. In this way, the connection between the eMSC and an access network entity in the second network is established. After the UE accesses the access network entity in the second network, the UE may communicate with a remote UE through the media plane connection between the eMSC and the second network and the media plane connection established by the second network. Thus, the UE is handed over from the first network to the second network.

DETAILED DESCRIPTION

For better understanding of the objective, technical solution and merits of the present disclosure, the present disclosure is hereinafter described in detail with reference to the accompanying drawings.

In the existing evolved network, handover processes and lossless transmission of voice data in the eMSC solution are related to the system architecture. However, the prior art does not involve problems such as whether the interface between the eMSC and the evolved system network, handover processes, specific parameters transmitted in handover messages and service areas controlled by the eMSC are introduced, and whether the PS to CS request of the MME may cause the PS to CS response of the eMSC. Thus, embodiments of the present disclosure describe processes of the handover between the first network and the second network in different architectures and also describe specific problems in detail. In some embodiments, the first network may be a PS network, and the second network is a CS network. In some embodiments, the first network may be a CS network, and the second network may be a PS network.

In the present disclosure, the most important thing is to define the architecture of the system. Related problems are described based on the following architecture.

Figure 1:
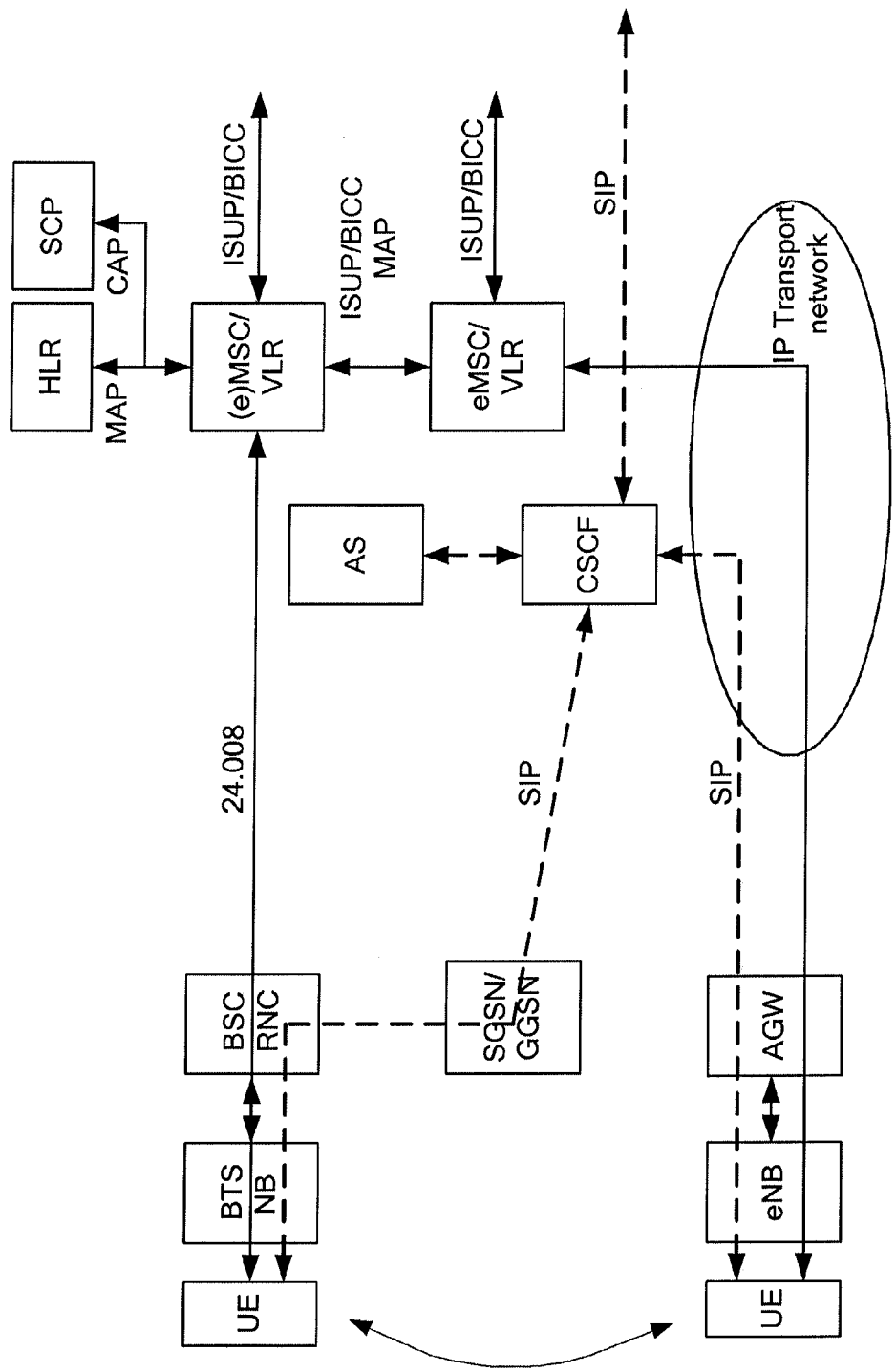
FIG. 1 is a block diagram of an eMSC solution in the prior art.
Figure 2:
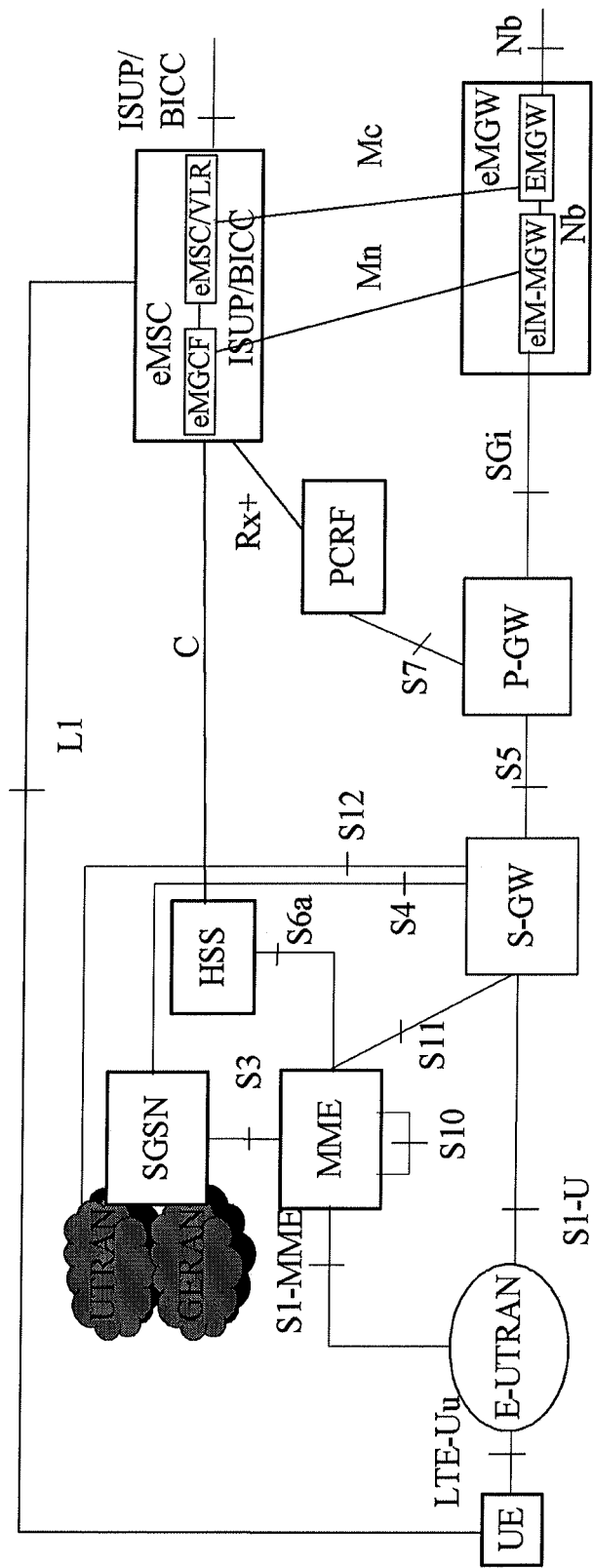
FIG. 2 shows an architecture A of an eMSC solution in an embodiment of the present disclosure.

FIG. 2 shows an architecture A of an eMSC solution in an embodiment of the present disclosure. As shown in FIG. 2, the eMSC includes some functions of the MSC and a media gateway function (MGCF) and functions of an application server (AS) in the PS domain. The eMSC includes an evolved MGCF (eMGCF) and an eMSC/visitor location register (VLR). It controls the establishment of a PS domain bearer via the Rx+interface between the eMSC and the policy and charging rules function (PCRF). The eMSC simulates the transmission of the signaling of the CS domain to the UE via a logical interface between the eMSC and the UE. In addition, an evolved media gateway (eMGW) entity is introduced to act as the conversion gateway of the media plane. That is, the eMGW performs conversion between the PS VoIP data and the CS VoIP data. The eMGW includes an evolved IP multimedia MGW (eIM-MGW) and an EMGW. In practical applications, the eMSC and the eMGW may be separated or integrated into an entity. In the PS network, the MME is the core network entity, and the eNB is the access network entity. Accordingly, in the CS network, the core network entity may be the MSC, and the access network entity may be a base station sub-system (BSS) or a radio network controller (RNC). In all embodiments of the present disclosure, it is supposed that the access network entity is the BSS. The situation is the same when the access network entity is the RNC.

Figure 3:
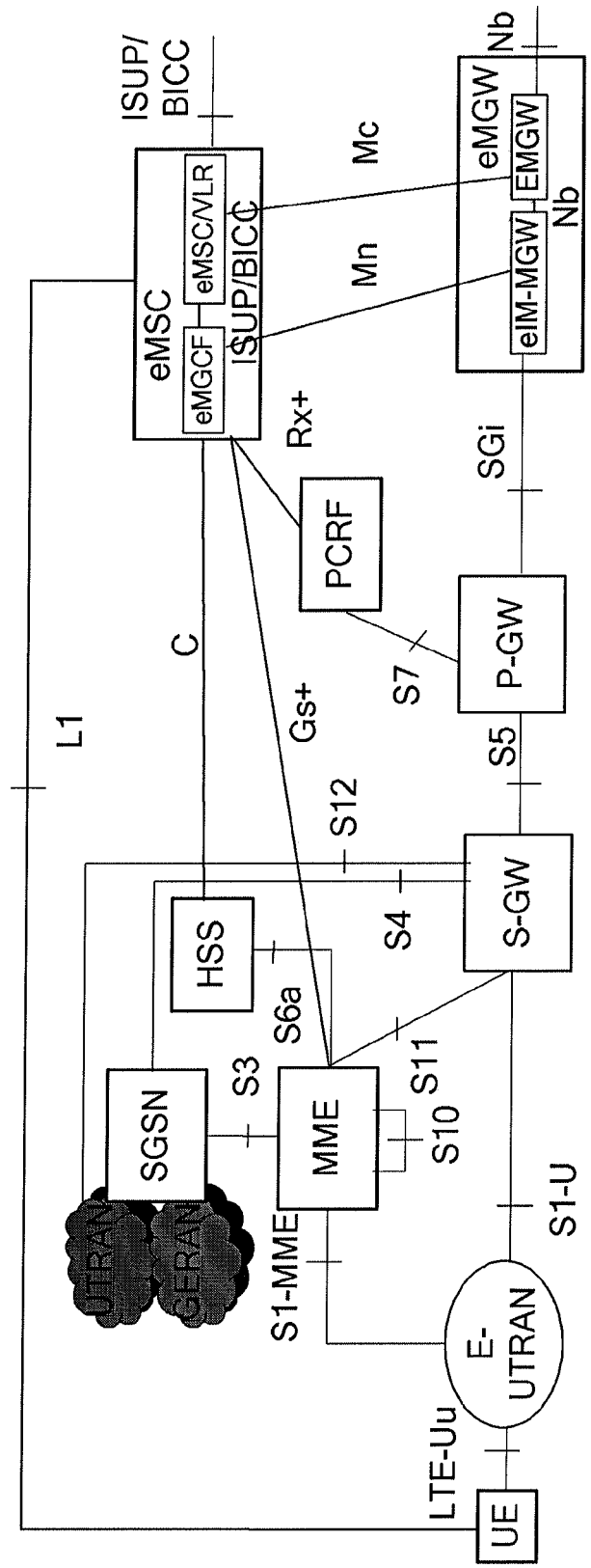
FIG. 3 shows an architecture B of an eMSC solution in an embodiment of the present disclosure.

FIG. 3 shows an architecture B of an eMSC solution in an embodiment of the present disclosure. As shown in FIG. 3, the difference between the architecture B and the architecture A is as follows: In the architecture B, the interface between the MME and the eMSC, namely the Gs+ interface, is introduced to transmit handover message parameters.

First Embodiment

Figure 4A:
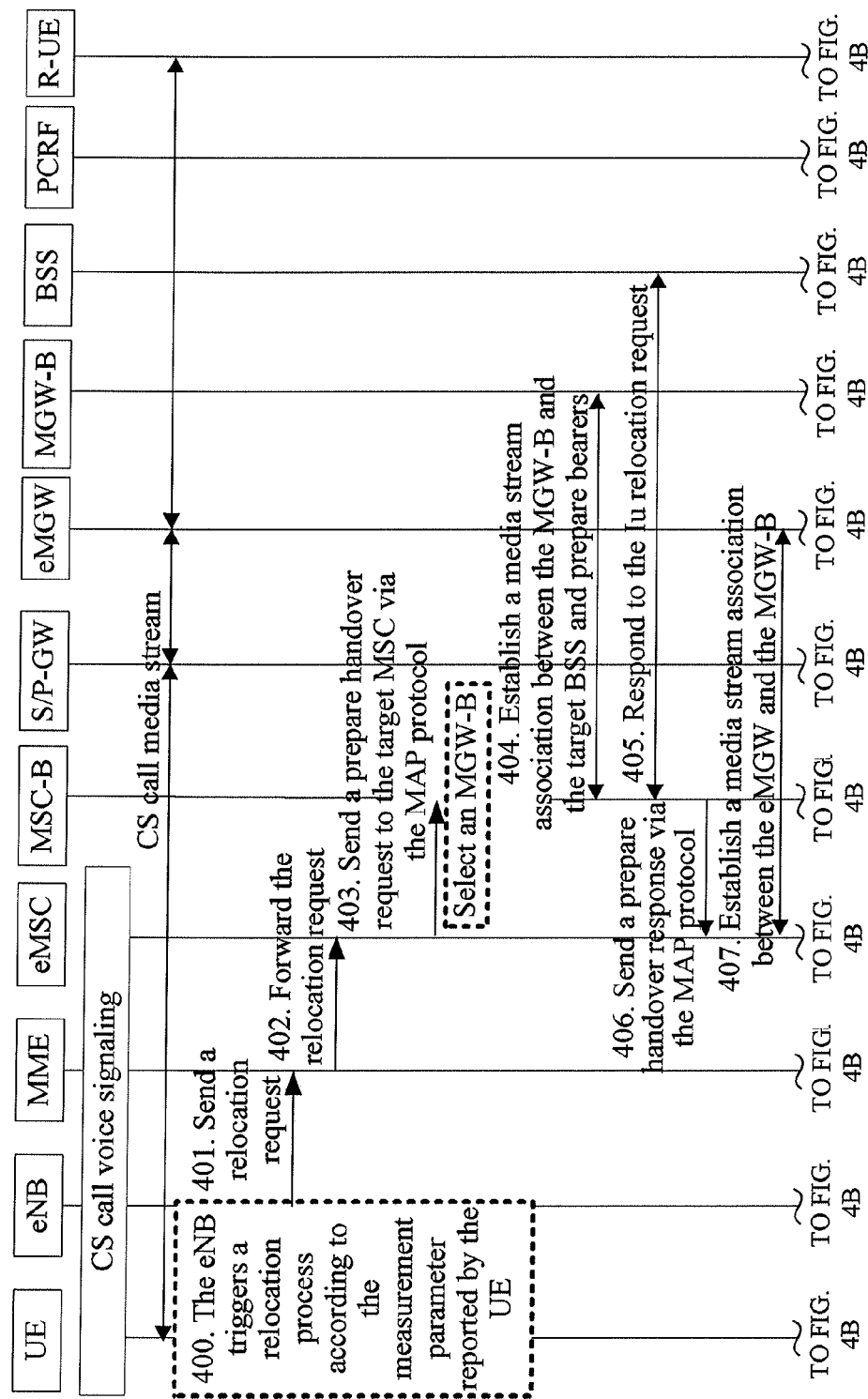
FIG. 4 shows a process of UE handover from a PS domain to a CS domain in a first embodiment of the present disclosure.
Figure 4B:
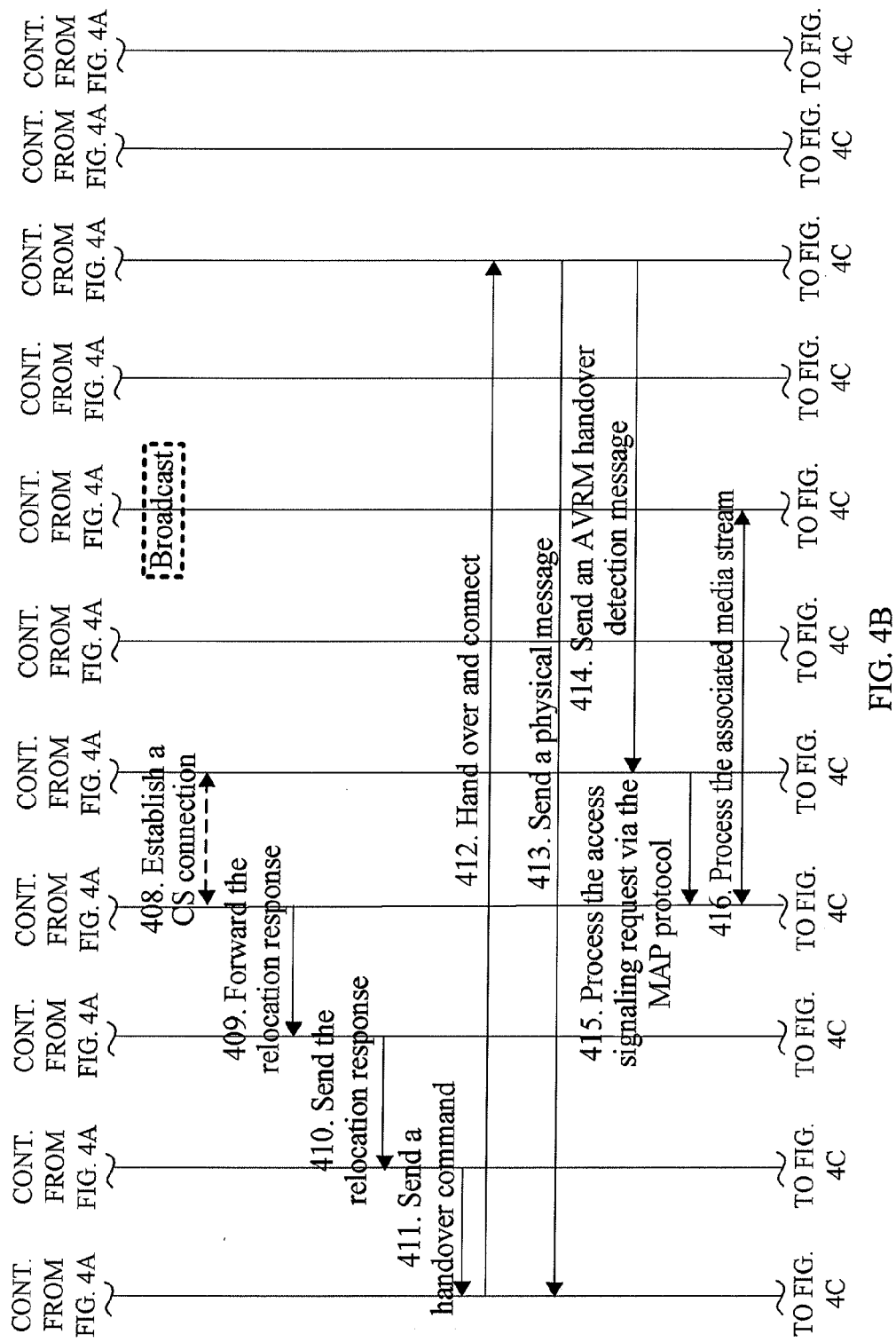
Figure 4C:
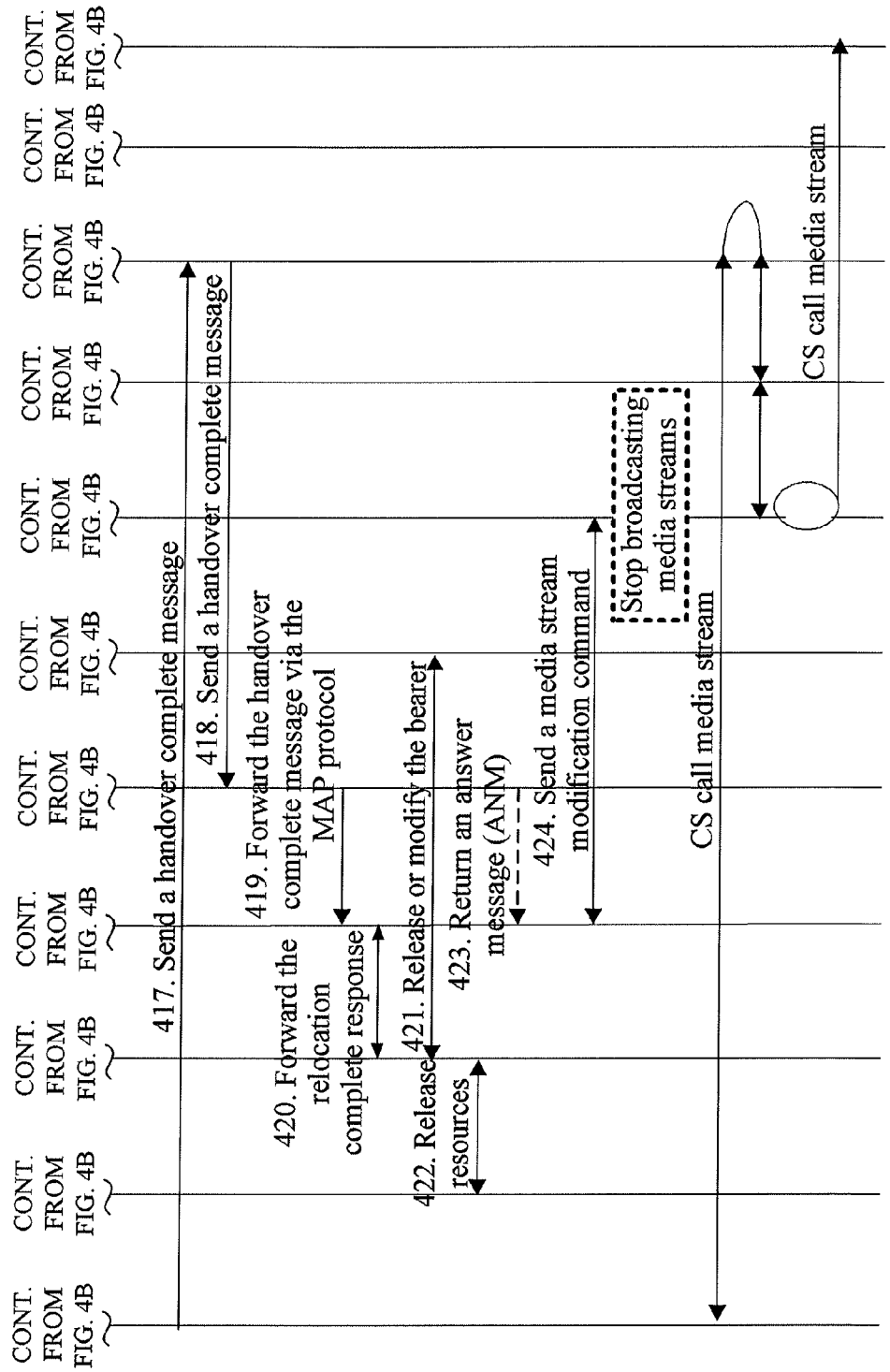

FIG. 4 shows a process of UE handover from a PS domain to a CS domain in the first embodiment of the present disclosure. In this case, the first network is a PS network and the second network is a CS network. The UE initiates the handover via the Gs+ interface between the MME and the eMSC in an SAE network. As shown in FIG. 4, the process includes the following steps:

Step 400: After the UE moves to the border area between the CS domain and the PS domain, the UE reports measurement parameters to the eNB actively or according to the instruction of the eNB. The reported measurement parameters include physical signal and upper-layer message indications of neighbor cells, for example, dual transfer mode (DTM) switching support, network load, and cell feature indications. After receiving the information, the eNB judges whether to initiate a relocation process.

Step 401: The eNB sends a relocation request to the MME notifying the MME that the UE needs to perform relocation. The following describes two cases. Case 1: The eNB initiates an inter MME relocation request or inter radio access technology (Inter RAT) relocation request no matter whether the service is handed over to the CS domain or to the PS domain.

Case 2: If the eNB determines that the handover is a simulated PS-CS handover, the eNB adds a cause value indicating that the handover is a simulated PS-CS handover to the relocation request, thereby instructing the core network entity (e.g., the MME) to perform subsequent processing. In this case, the eNB may construct a new relocation request in which previous source radio parameters may not be included or may be filled with null because the previous source radio parameters cannot be mapped in the target network. Thus, the relocation request does not need to carry these parameters. The eNB adds a target cell list to the relocation request. The request also carries a context ID of a bearer that needs to be forwarded to a peer entity, for example, a radio access bearer (RAB) ID. In this case, the MME can judge which the bearer(s) is/are handed over to the target network according to the context ID.

The eNB may determine that the handover is a simulated PS-CS handover by using the following two methods.

Method 1: The eNB analyzes whether a neighbor cell belongs to the CS domain through configuration relationships and judges whether the neighbor network has the CS capability according to the cell measurement information that the UE reports to the eNB. In addition, the eNB may further judge whether the UE has the CS capability according to radio parameters or network capability parameters of the UE stored in the eNB, where the radio parameters or network capability parameters may be notified by the MME to the eNB during the call and attachment processes or be reported by the UE to the eNB through air interface messages (for example, an RRC message). If the neighbor cell belongs to the CS domain and the neighbor network has the CS capability, the eNB may determine that the handover is a special simulated PS-CS handover, or if the neighbor cell belongs to the CS domain and the neighbor network has the CS capability and the UE has the CS capability, the eNB determines that the handover is a special simulated PS-CS handover.

Method 2: To carry media streams of a simulated CS call, a dedicated bearer needs to be established earlier in the PS domain. In addition, the quality of service (QoS) of the bearer should be guaranteed and related voice coding and decoding should be defined. Then, a special label is defined for the dedicated bearer that carries the media streams of the simulated CS call to map the media streams of the CS call to the dedicated bearer, where the label is generated by the PCRF during the call establishment and carried in the QoS. Thus, the eNB may know that the handover is a special simulated PS-CS handover according to the special label parameters and information in the measurement report such as neighbor cell information.

Currently, the radio capabilities of the UE do not include the CSoPS capability of the UE. Thus, the UE needs to report a message about whether the UE has the CSoPS capability to the network, where the message is a two-bit binary number and is carried in the mobile station radio access capability information. "00" indicates that the UE has the PS capability. "01" indicates that the UE does not have the PS capability. "10" indicates that the UE has the CSoPS capability. "11" indicates that the UE does not have the CSoPS capability.

The preceding technical solution is applicable to the simulated CS-PS handover and all voice services carried in the PS domain. For multimedia services, the continuity needs to be kept in a scenario in which the services are handed over via an interface between the core network entity in the PS domain and the core network entity in the CS domain (example e.g., the interface between the MME and the MSC).

Step 402: The MME sends a relocation request to the eMSC via the Gs+ interface. The following describes two cases.

Case 1: The MME receives only an inter MME/inter RAT relocation message from the eNB, where the relocation message is the same as the relocation message that the eNB sends to the core network in case of inter MME handover or inter RAT handover. The MME sends a relocation request to the eMSC according to the target entity ID. This also involves two cases according to whether the MME in the existing evolved network needs to be upgraded.

When the existing MME does not need to be upgraded, the MME regards the eMSC as the MME or SGSN. In this case, the MME needs to send all the bearer context information of the UE to the eMSC after sequencing all the bearer context information according to priority. As a result, both the bearer contexts of the CSoPS signaling and voices and the bearer contexts that are used for only the PS services are transferred to the eMSC. To ensure that the voice bearer has the top priority, it is necessary to define that the bearer carrying the simulated CS service has the top priority.

The priority of the bearers may be defined according to the label features or explicit parameters instructed by the core network entity. The core network entity may establish the priority of the data plane bearer by checking the CS call signaling or define the bearer priority according to the operator's configuration. In the eMSC solution, the network and the UE need to notify each other of the eMSC support capability. Thus, the MME may know whether the UE supports the CSoPS attribute. The attribute may be obtained through the special label or other instructions. For example, the MME checks an NAS signaling message and forwards the message to the eMSC, where the NAS message carries related service indications. The MME can know that the service attribute is a CSoPS service. After the MME knows that the service attribute is the CSoPS service, the MME sets the service priority to the highest level. In this scenario, the eMSC has some functions of the MME or SGSN.

When the existing MME needs to be upgraded, the MME may send a special relocation request according to the service continuity requirement and add a group of relocation parameters to the relocation request such as relocation cause and target entity ID. The relocation cause indicates that the handover is a simulated PS-CS handover and that a lot of parameters that previously need to be carried in the handover message are null. In addition, the eMSC is instructed to trigger an Intra/inter MSC handover through the relocation cause. Because the MME is upgraded, the MME may determine that the handover is a simulated PS-CS handover. Thus, the MME does not need to send all the bearer contexts established for the UE to the eMSC. The MME only needs to send those bearer contexts to be transferred to the eMSC. The MME may continue reserving contexts of the bearers used for the PS service only after sending a forward handover request to the eMSC. Accordingly, the UE also needs to reserve the PS service bearer contexts. Thus, when the UE moves back to the SAE network, the UE may reactivate the PS service bearer contexts reserved in the MME without reestablishing PS service bearer contexts. The duration of reserving these contexts in the core network depends on the operator's configuration or the duration of a call of the UE in the CS domain. That is, when the UE releases the call in the CS domain, the UE notifies the core network of deleting related bearer contexts stored in the core network. In addition, these contexts may be deleted in case of simulated PS-CS handover. To reserve or delete the bearer contexts depends on the operator's policy or subscription data of the UE.

The preceding technical solution is applicable to the simulated CS-PS handover and all voice services carried in the PS domain. For multimedia services, the continuity needs to be kept in a scenario in which the services are handed over via an interface between the core network entity in the PS domain and the core network entity in the CS domain (e.g., the interface between the MME and the MSC). Thus, the MME may transmit only the context parameters carrying the voice service to the core network entity in the CS domain.

Case 2: If the inter RAT handover request that the MME receives from the eNB includes a simulated handover command and carries bearer contexts to be transferred, for example, an RAB ID, the MME may construct a message regarding the simulated PS handover and forward all necessary parameters to the eMSC. With regards to the bearers used only for the PS service, the bearer contexts are processed by using the method in the first case.

To send the message, the MME needs to know the address of the eMSC. Before this step, the MME may already have obtained the address of the eMSC, for example, during the attachment or location update process. However, if the MME has not obtained the address of the eMSC before this step, the following mechanisms may be used to find the address of the eMSC.

a. The home subscriber server (HSS) provides the address of the eMSC directly. That is, during the network planning, an eMSC may be configured in an MME pool. After the UE is attached to the network, the MME may obtain the address of the eMSC from the HSS. If the MME is changed in case of a location update, the HSS may provide a more suitable eMSC to serve the UE.

b. The MME discovers an eMSC according to the network planning and operator's policy. For example, the HSS provides an indication similar to an access point name (APN), where the indication carries a roam enabling/disabling flag or a location area ID, and the MME discovers the eMSC according to such information. To associate the mobility of the MME with the mobility of the eMSC, the MME adds a location ID to an eMSC address request. For example, during the domain name server (DNS) query, a location area ID is added after the domain name so that a more reasonable eMSC may be queried.

c. The MME instructs the packet data network gateway (P-GW) to discover an eMSC according to the discovery mechanism of the proxy call server control function (P-CSCF). To associate the mobility of the MME with the mobility of the eMSC, the MME adds a location indication to a request, for example, a tracking area (TA) indication, requesting the P-GW to discover an eMSC and return the result to the MME.

d. The MME configures the mapping relationship between the MME and the eMSC. That is, the MME configures the mapping relationship between the MME and the eMSC in the MME pool.

e. The MME discovers an eMSC through a traditional location area (TA) relationship. That is, the MME may deduce the address of the eMSC according to the TA ID and user ID.

Step 403: After the eMSC receives a relocation command, the eMSC judges whether to initiate an intra MSC relocation process or an inter MSC relocation process. If the eMSC determines to initiate an inter MSC relocation process, the eMSC selects a target MSC and sends a prepare handover request to the target MSC via the Mobile Application Part (MAP) protocol. If the eMSC determines to initiate an intra eMSC relocation process, the eMSC sends a handover request to the BSS directly.

The eMSC judges whether to initiate an intra MSC relocation process or an inter MSC relocation process by using one of the following methods: according to the explicit indication, for example, a handover cause, from the MME or analyzing parameters provided by the source MME, for example, analyzing the target cell ID, or using an internal mechanism.

After receiving the relocation request, the eMSC generates the following parameters which are used by the target network to reserve resources:

Channel Type: This parameter is directly filled in by the eMSC. For other parameters regarding the air interface channel rate, their configurations may be selected by default or according to the voice coding and decoding, user's subscription data, and the operator's policy.

Encryption Information: In case of voice calls, all the related encryption information is stored in the eMSC. These parameters need to be directly filled in during the handover. For example, during the handover, if the radio network is required to provide security related parameters, for example, random number, the eMSC simulates the generation of default parameters.

Classmark Information 1 or Classmark Information 2: The classmark information 1 or classmark information 2 is provided by the UE to the eMSC through a simulated registration message or is transmitted by the MME to the eMSC. The classmark information 1 or classmark information 2 includes some radio interface capabilities of the UE in the CS domain. The UE may transmit these capabilities to the eMSC when the CS attachment is simulated, the UE may transmit these capabilities to the eNB through a radio message, for example, an RRC message, the eNB transmits these capabilities to the eMSC via the MME in case of handover, or the UE notifies the MME of these capabilities directly through an NAS message. Then the MME transmits these capabilities to the eMSC.

Cell Identifier (Serving): This parameter may be null or be the source cell ID and target cell ID provided by the MME.

When the eMSC determines that the handover is an inter MSC handover, the eMSC sends a handover request to a selected MSC (hereinafter referred to as the MSC-B). The MSC-B may trigger a process of selecting an MGW (hereinafter referred to as the MGW-B) after receiving the handover request. The following describes methods for selecting an MGW-B:

a. The MSC-B selects an MGW-B according to conditions such as user subscription data, network topology, and equipment load.

b. The eMSC selects an MGW-B. After selecting the MGW-B, the eMSC notifies the MSC-B of the address of the MGW-B through a handover command.

Step 404: The MSC-B controls the establishment of a media stream association between the MGW-B and the target BSS.

Step 405: The MSC-B sends an Iu relocation request to the target BSS. The BSS reserves related radio resources and responds to the Iu relocation request.

Step 404 may be executed after step 405. In this case, the MSC-B may provide the MGW-B with the BSS user plane related parameters such as IP address and port number. Certainly, these parameters may be provided by other means. For example, these parameters may be preconfigured in the MSC-B.

Step 406: The MSC-B returns a prepare handover response to the eMSC via the MAP protocol.

Step 407: The eMSC notifies the eMGW of establishing a media stream association between the eMGW and the MGW-B. After the media stream association between the eMGW and the MGW-B is established, the eMGW may broadcast media streams to the P-GW and the MGW-B. The P-GW and the MWG-B are media plane gateways of the PS network and the CS network, respectively.

Step 408: The eMSC establishes a CS connection with the MSC-B.

Step 409: The eMSC sends a relocation response to the MME, where the relocation response carries the following parameters to notify the UE of radio parameter configuration used after the UE is handed over to the second network.

a. Relocation Cause, indicating that the handover is a simulated PS-CS handover.

b. Message Type and Layer 3 Information (L3 Information), the formats of which are shown in Table 1.

TABLE 1

| Message Type | M | 1 |
|---|---|---|
| Layer 3 Information | M | 11-n |

The L3 information includes radio interface information. The Message Type indicates the type of a message. That is, the message indicates that the handover is a simulated PS-CS handover and that the target network is a CS domain.

After receiving the relocation response, the MME does not parse the preceding parameters but transmits these parameters to the UE through the eNB. Then, the UE parses these parameters and performs handover according to these parameters.

Step 410: The MME sends a relocation response to the eNB, where the relocation response includes parameters related to the target CS domain and carries the relocation cause indicated in step 409. That is, the relocation cause indicates that the handover is a simulated PS-CS handover. In addition, the MME may add related handover cause values to the relocation response. The parameters are used to indicate the handover actions of the eNB.

Step 411: The eNB sends a handover command to the UE, where the handover command carries the relocation cause carried in step 410 instructing the UE to parse the radio parameters of the CS domain and to prepare for connecting to the target CS domain.

Step 412 and step 413: After the UE receives a handover request, the UE connects to the target entity according to the radio parameters of the CS domain.

Step 414: After the target BSS receives an access message of the UE, the target BSS sends a handover detection message to the MSC-B.

Step 415: The MSC-B sends an access signaling processing request to the eMSC.

Step 416: The eMSC sends a command for processing associated media streams to the eMGW, where the command may trigger the eMGW to stop broadcasting media streams to the P-GW and the MGW-B, and to only broadcast media streams to the MGW-B.

Step 417: After connecting to the target BSS, the UE sends a handover complete message to the BSS.

Step 418: The BSS forwards the handover complete message to the MSC-B.

Step 419: The MSC-B forwards the handover complete message to the eMSC.

Step 420: The eMSC sends a relocation complete message to the MME, and the MME responds to the message, where the response may include an information element (IE) indicating whether the MME stores UE related context information.

Step 421: The MME deletes or modifies S5 and S8 bearers. The MME may determine whether to delete or reserve related bearers in the PS domain according to the instruction of the eMSC, configuration of the MME, user subscription data, and operator's policy. If the MME determines to reserve a bearer, the MME initiates a bearer modification process and sets some parameters of the bearer such as guaranteed bit rate (GBR), maximum bit rate (MBR), and aggregate maximum bit rate (AMBR) to 0, or the MME directly sends a bear reservation instruction to the serving gateway (S-GW) or the P-GW to reserve related bearers and notifies the PCC system of adjusting the PCC policy. The duration of reserving the bearer contexts depends on the operator's configuration or the duration of a call of the UE in the CS domain. That is, when the UE releases the call in the CS domain, the UE notifies the core network of deleting related bearer contexts in the core network. The following describes a possible call release process: When the UE releases a call in the CS domain, the eMSC triggers a bearer deletion process via the Rx interface. Because the PS domain related bearer contexts need to be stored in the eMSC or an intermediate entity, the eMSC may judge whether to release bearers in the PS domain via the Rx interface after the UE releases the call in the CS domain. To store PS domain related bearer contexts, the eMSC needs to have functions of the MME. In addition, the PS domain related bearer contexts may be stored in another logical entity in the core network, for example, a PS-CS handover control central entity (PCHCCE). The details about the PCHCCE are given in the third embodiment of the present disclosure.

Because the SAE network has default bearers and dedicated bearers, the MME judges whether to store the signaling planes of simulated voice calls, media plane bearers, or default bearers according to the preceding conditions.

Step 422: The MME releases the bearer of the S1 interface.

Step 423 and step 424: The MSC-B returns an answer message (ANM) to the eMSC and triggers the eMSC to send a media stream modification command to the eMGW.

In this embodiment, an active UE may be handed over from the CS domain back to the LTE/SAE network. Thus, the network needs to instruct the UE to continue storing related context information in the LTE/SAE network.

As shown in FIG. 4, the CS call media stream path in the PS domain before the handover is as follows: UE—S/P—GW—eMGW—Remote UE. However, when the source UE is handed over to the CS domain, the path is changed as follows: UE—BSS—MGW-B—eMGW—Remote UE.

Second Embodiment

Figure 5A:
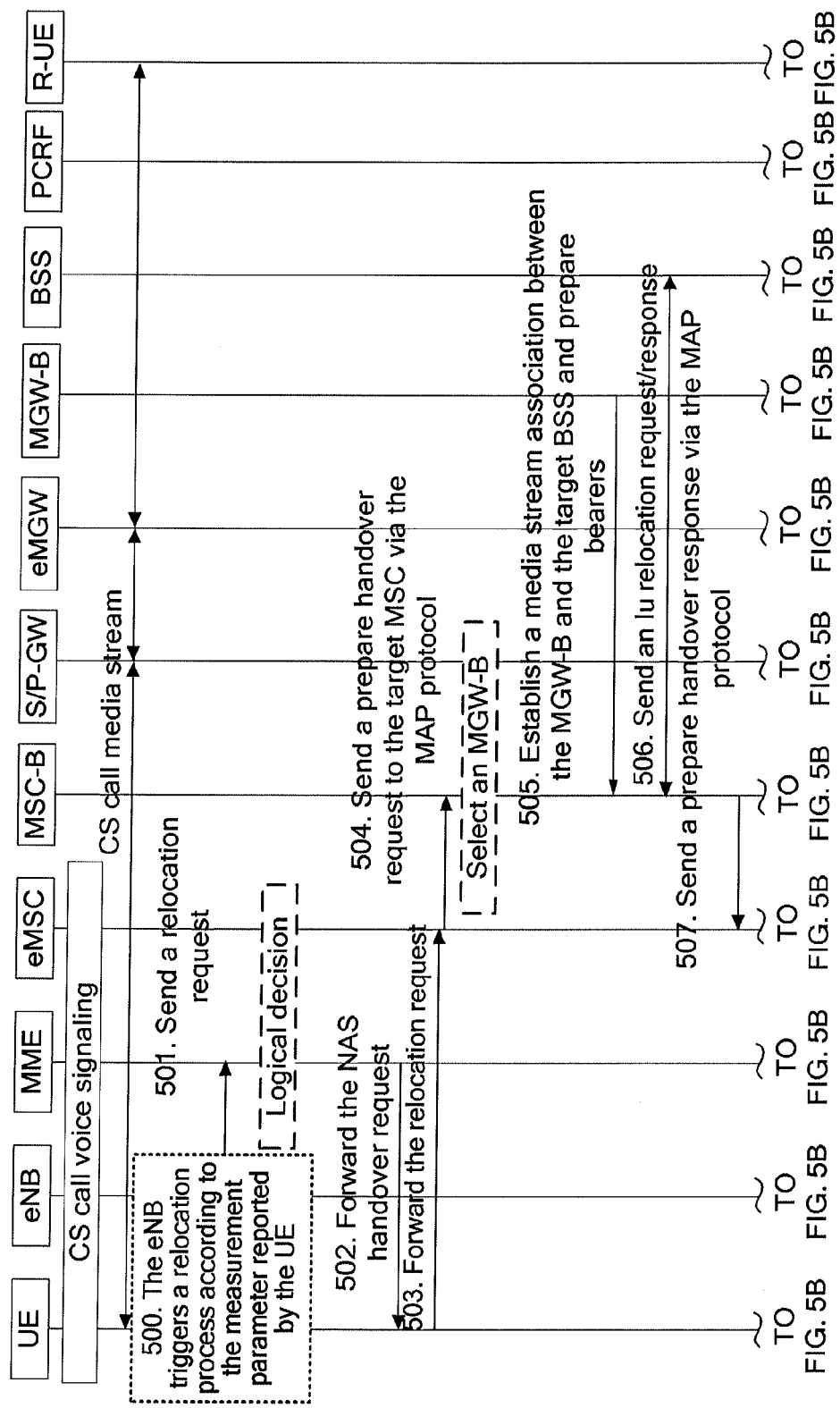
FIG. 5 shows a process of UE handover from a PS domain to a CS domain in a second embodiment of the present disclosure.
Figure 5B:
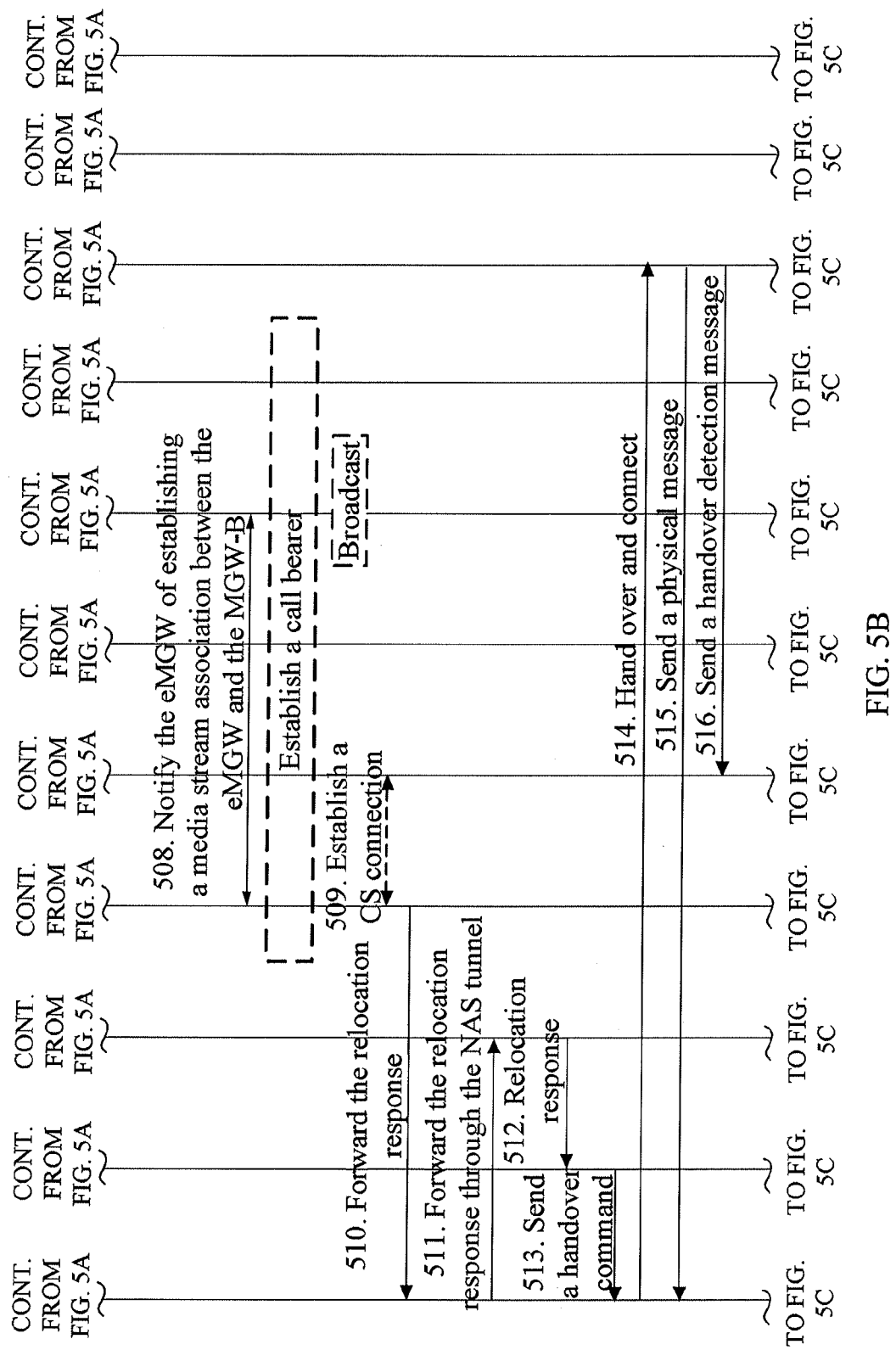
Figure 5C:
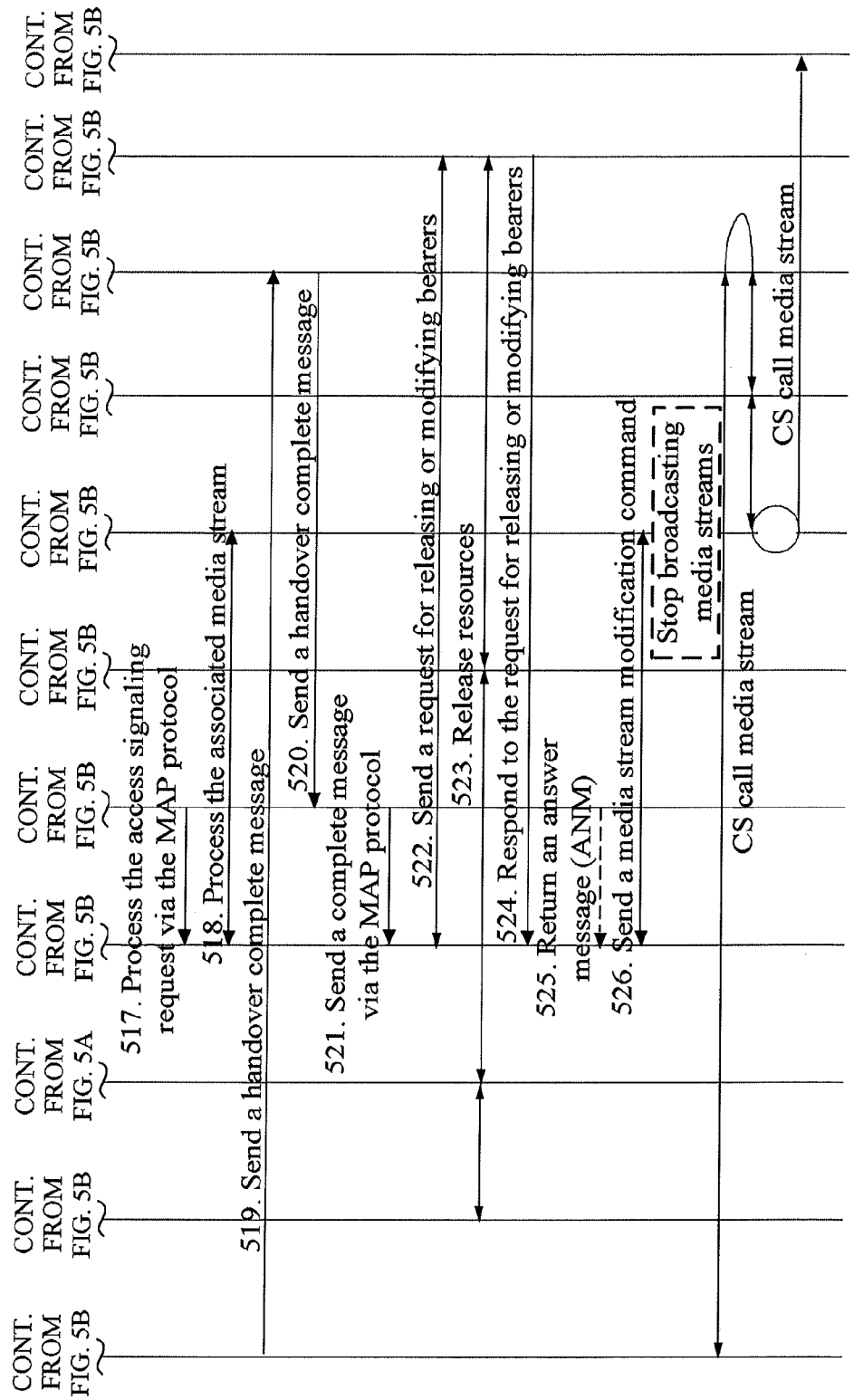

FIG. 5 shows a process of UE handover from a PS domain to a CS domain in the second embodiment of the present disclosure. The scenario is as follows: when the network does not support the Gs+ interface, the UE initiates the handover through a logical channel.

In this embodiment, the logical channel may be one of the following:

NAS channel. That is, the MME sends a relocation request to the UE through an NAS message, and the UE forwards the relocation request to the eMSC.

The logical channel is similar to the signaling plane, for example, a short message path in a radio network. The MME may send a handover request to a short message gateway (SMG) through a short message, and the SMG forwards the short message to the eMSC. Currently, the short message needs to be extended, for example, to carry target entity IDs.

IP connection. The MME may send a handover request to the eMSC directly through the IP connection. In this case, a secure IP connection association needs to be established between the MME and the eMSC. This mode is similar to the scenario where the Gs+ interface exists between the MME and the eMSC, but this mode emphasizes communications through the IP connection.

This embodiment describes a PS to CS process of the MME through the NAS channel. As shown in FIG. 5, the process includes the following steps:

Step 500 and step 501: The eNB initiates a relocation request. This process is the same as step 400 and step 401.

Step 502: After receiving the relocation request from the eNB, the MME determines that the relocation request needs to be forwarded to the peer eMSC through a logical channel according to the target entity ID or IE indication in the handover command. Then, the MME forwards the relocation request to the UE through an NAS message.

Step 503: The UE forwards the relocation request to the eMSC through the logical channel between the UE and the eMSC.

As described in the first embodiment, when the MME does not need to be upgraded, the MME needs to send all the bearer context information of the UE to the eMSC by priority. The priority of the bearer may be defined according to the label features or explicit parameters instructed by the core network entity. The core network entity may establish the priority of the data plane bearer by detecting the CS call signaling or define the priority of the bearer according to the operator's configuration. In the eMSC solution, the network and the UE need to notify each other of the eMSC support capability. Thus, the MME may know whether the UE supports the CSoPS attribute. The attribute may be obtained through a special label or other instructions. For example, after the eMSC receives a setup message from the UE, the eMSC may send a message indicating that the service attribute is a voice service in the CSoPS domain to the PCRF via the Rx interface. The CSoPS attribute is further transmitted to the MME.

The eMSC discovery mechanism is the same as that described in the first embodiment.

Step 504 to Step 509: After receiving the relocation request, the eMSC may perform processing in the same way as step 403 to step 408.

Step 510 to step 511: The eMSC sends a relocation response to the MME through the UE via an NAS tunnel.

The NAS tunnel forwards a handover request command to the MME.

Step 512 to step 521: The MME notifies the UE of performing handover and establishing a media connection with the target entity. These steps are the same as step 410 to step 419.

Step 522 to step 524: The MME or the P-GW releases the bearer of the S1 interface and releases or modifies the bearer of the S5 interface.

The bearer in the PS domain may be released or deleted by the MME or by the P-GW triggered by the eMSC.

Step 525 to step 526: The MSC-B returns an ANM to the eMSC, and triggers the eMSC to send a media stream modification command to the eMGW. This process is the same as step 423 and step 424.

In this embodiment, an active UE may be handed over from the CS domain back to the LTE/SAE network. Thus, the network needs to instruct the UE to continue storing related context information in the LTE/SAE network.

In this embodiment, the bearer in the PS domain is released or modified by the PCC system triggered by the eMSC.

Third Embodiment

Figure 6A:
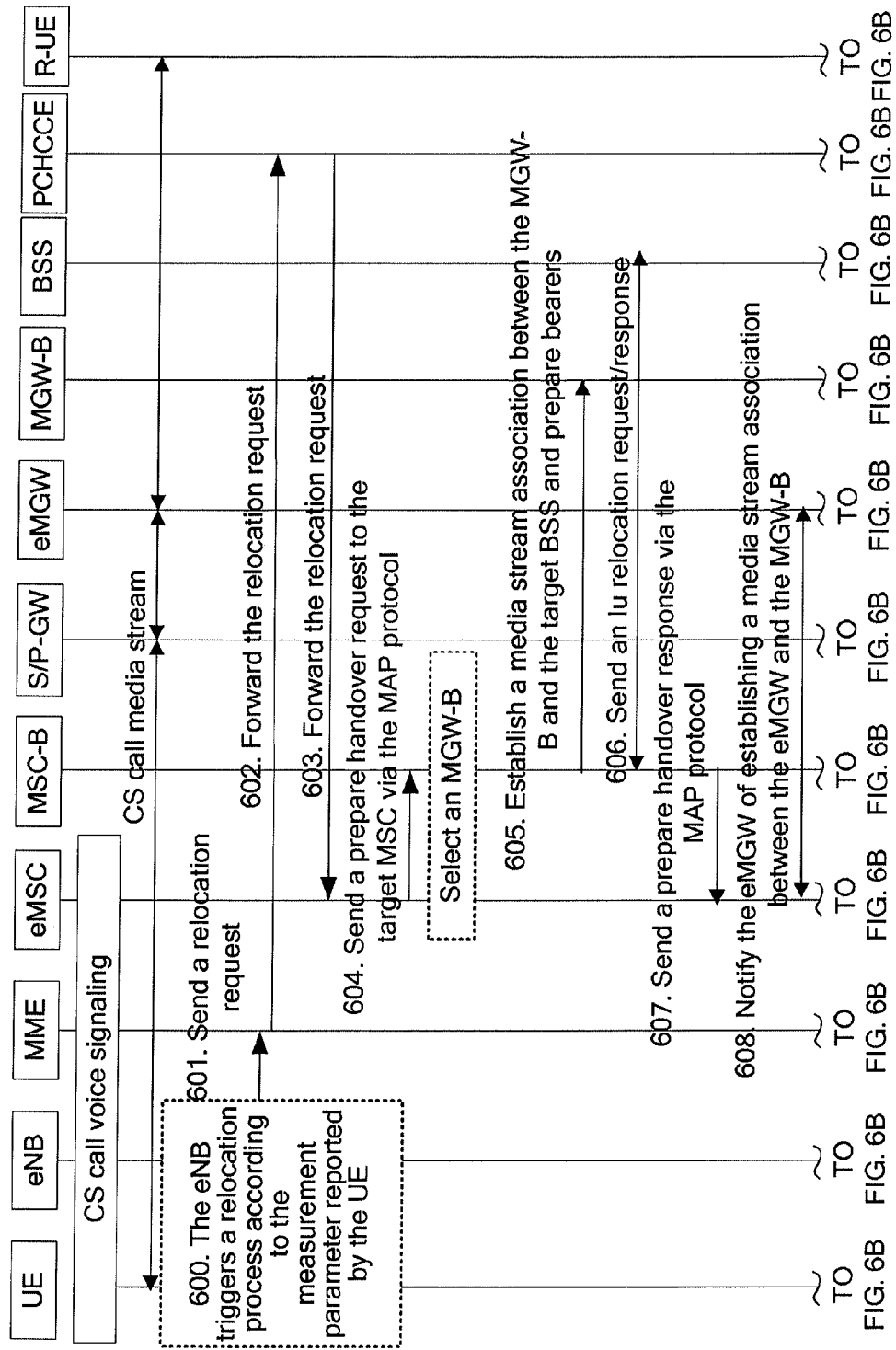
FIG. 6 shows a process of UE handover from a PS domain to a CS domain in a third embodiment of the present disclosure.
Figure 6B:
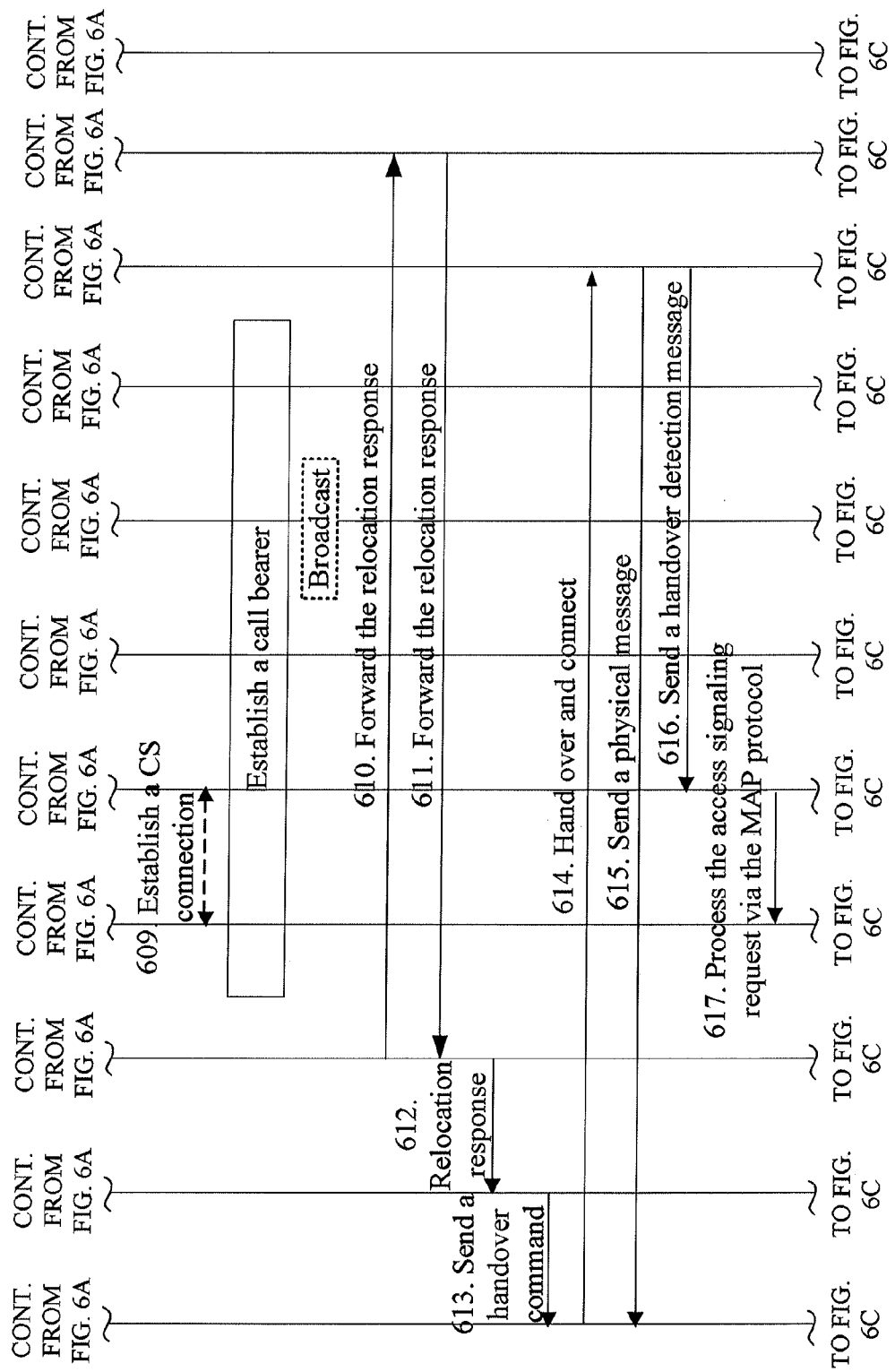
Figure 6C:
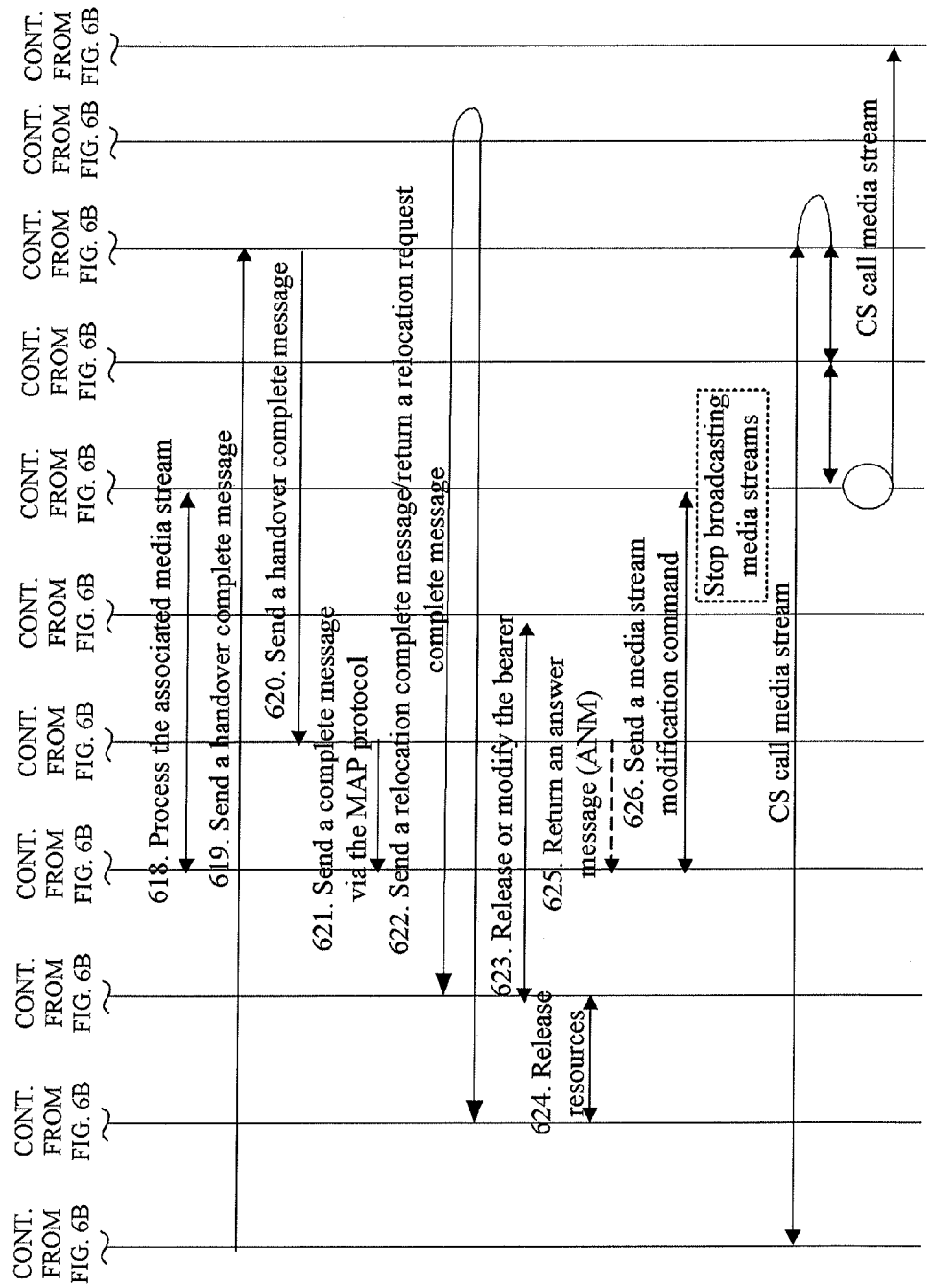

FIG. 6 shows a process of UE handover from a PS domain to a CS domain in the third embodiment of the present disclosure. The scenario is as follows: when the network does not support the Gs+ interface, the UE initiates the handover through the PCHCCE.

The PCHCCE may perform the following functions:

(1) Acting as the signaling conversion gateway: For the PS domain, the PCHCCE includes some functions of the MME. For the CS domain, the PCHCCE includes functions of the MSC, BSS, and RNC. That is, the PCHCCE converts a handover request from the MME into a standard inter MSC handover command and may store related context information in the MME, thereby making it convenient to perform handover from the CS domain back to the LTE network.

(2) Acting as a signaling plane relay: After receiving a handover request from the MME, the PCHCCE analyzes the target entity ID and forwards the handover request to a correct eMSC. It may also provide a real address of the target MSC. This function solves the problem that the eMSC cannot parse the target entity ID due to the mobility of the MME. Because the eMSC also has a controlled service area, it cannot be guaranteed that the eMSC can parse out the target entity ID correctly to find a correct MSC after the UE is attached to a selected eMSC if the MME is relocated but the eMSC is not relocated. However, the PCHCCE logical entity may be used to parse out a correct address of the target MSC after this entity is introduced.

(3) Acting as the SMG as mentioned in the second embodiment to transfer a similar handover request.

(4) Acting as the MME and the BSS: The MME initiates an inter MME handover and forwards related parameters to the PCHCCE. After receiving related commands, the PCHCCE simulates the BSS to initiate an intra eMSC or inter eMSC handover.

The PCHCCE and the eMSC may be integrated into a same physical entity. The PCHCCE discovery mechanism may be preconfigured in the MME or provided by the HSS, or the PCHCCE is discovered by the MME according to the subscription data, operator's policy, or topology. One or multiple PCHCCEs may be configured in an MME pool.

As shown in FIG. 6, the process of initiating handover by the UE through a logical entity includes the following steps:

Step 600 and step 601: The eNB initiates a relocation request. This process is the same as step 400 and step 401.

Step 602 and step 603: The MME sends a relocation request to the PCHCCE, and the PCHCCE sends the relocation request to the eMSC.

Step 604 to step 609: After receiving the relocation request, the eMSC may perform processing in the same way as step 403 to step 408.

Step 610 and step 611: The eMSC sends a relocation response to the PCHCCE, and the PCHCCE sends the relocation response to the MME.

Step 612 to step 621: The MME notifies the UE of performing handover and establishing a media connection with the target entity. This process is the same as step 410 to step 419.

Step 622: The eMSC sends a relocation request to the PCHCCE. The PCHCCE sends the relocation request to the MME, and the MME returns a relocation complete message to the eMSC through the PCHCCE.

Step 623 to step 626: The MME releases or modifies the S5 bearer and releases the S1 bearer and triggers a media stream modification command of the eMGW. This process is the same as step 422 to step 425.

The second embodiment and third embodiment are based on the fact that no interface is available between the MME and the eMSC and that the logical entity forwards a handover request via a logical channel. The logical channel refers to an IP channel or a non access stratum (NAS) signaling channel. Thus, a logical channel must be established between network entities directly or indirectly. However, the logical channel mentioned in the technical solution further includes a direct IP connection between the UE and the eMSC. Thus, the UE may directly send the handover related measurement parameters, handover request, or data to the eMSC to trigger the intra MSC handover or inter MSC handover directly without the control of the MME in the SAE network. For example, the eNB instructs the UE to send a handover request to the eMSC according to the measurement parameters reported by the UE to trigger the subsequent processes, or the UE sends a simulated handover request to the eMSC directly through a logical channel according to the measurement parameters.

In this embodiment, an active UE may be handed over from the CS domain back to the LTE/SAE network. Thus, the network needs to instruct the UE to continue storing related context information in the LTE/SAE network.

Fourth Embodiment

Figure 7A:
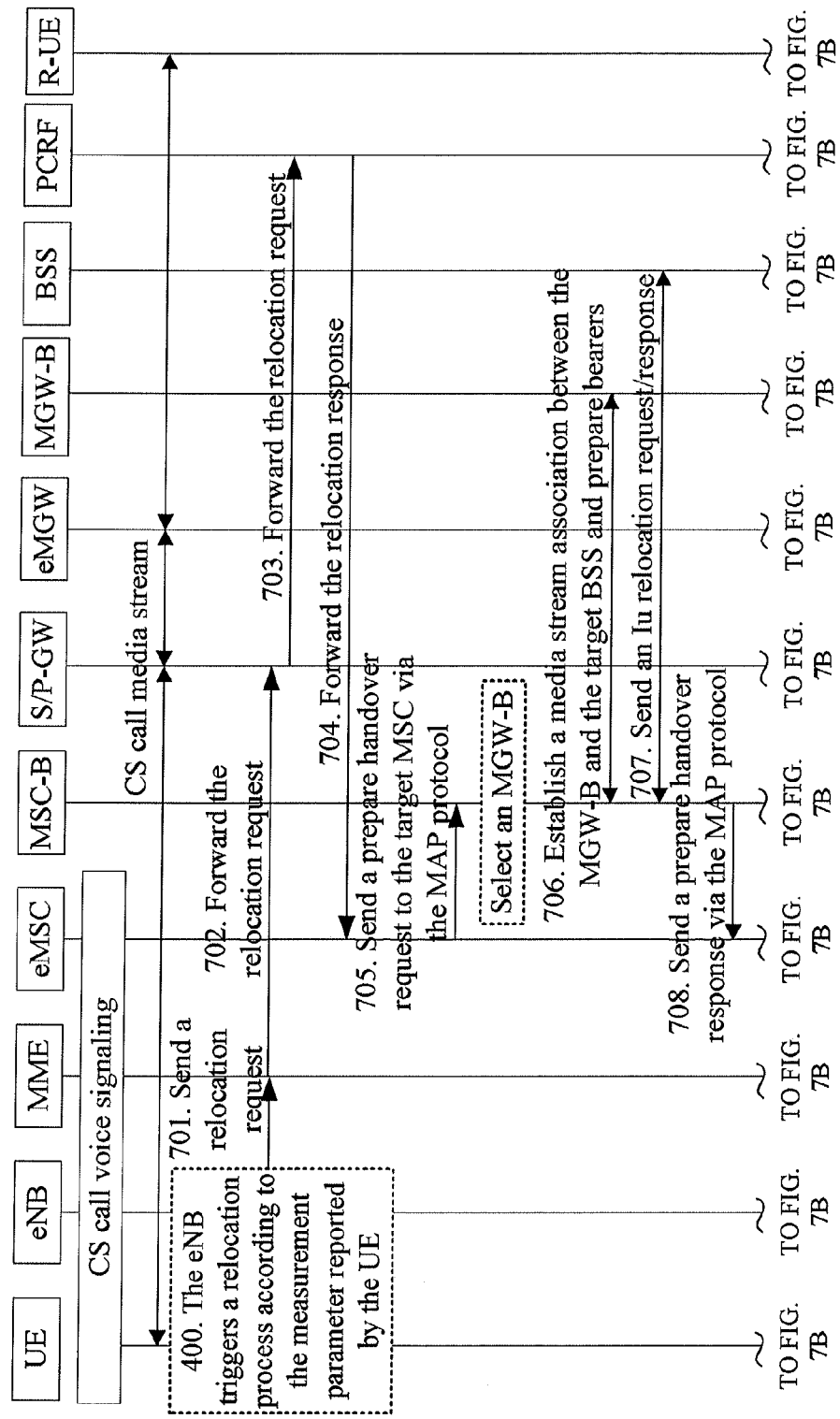
FIG. 7 shows a process of UE handover from a PS domain to a CS domain in a fourth embodiment of the present disclosure.
Figure 7B:
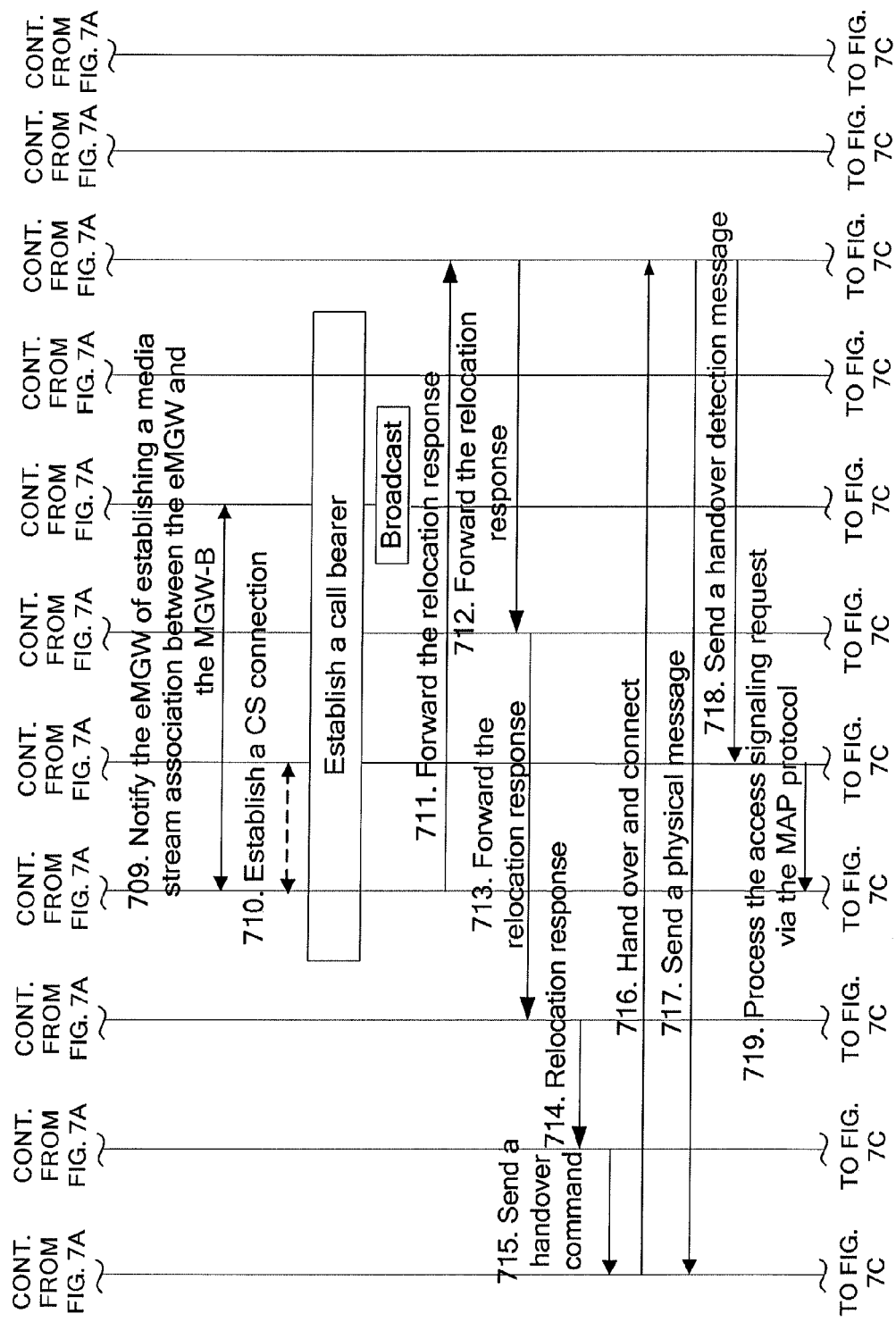
Figure 7C:
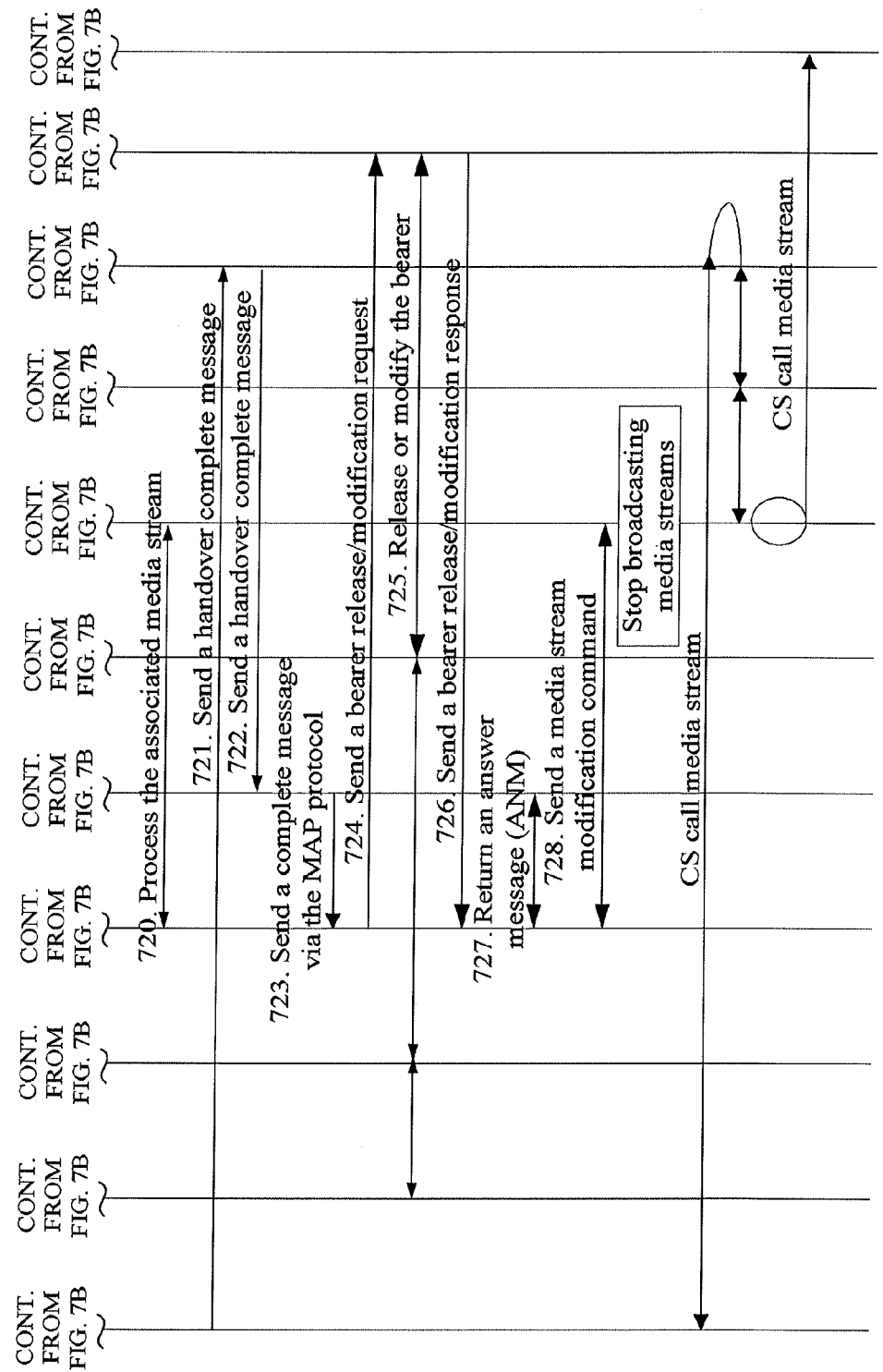

FIG. 7 shows a process of UE handover from a PS domain to a CS domain in the fourth embodiment of the present disclosure. The scenario is as follows: when the network does not support the Gs+ interface, the UE initiates the handover through a PCC system.

In this case, the PS-CS handover is performed by modifying the existing PCC command and the control plane command of the SAE core network and adding related IEs to encapsulate messages. That is, after the MME knows that a relocation command needs to be sent to the target eMSC by judging the message sent from the eNB, the MME encapsulates the relocation request command into a message such as GTP-C, MIP, or PMIP, and sends a special message to instruct the P-GW to parse the message. Then, the MME sends the relocation request command to the PCRF through the message sent to the PCC system. The PCRF analyzes the message and parses out the physical address of the eMSC, or the MME has already parsed out the physical address of the eMSC, and the PCRF only needs to transmit the physical address of the eMSC. Then, the PCRF forwards the message to the eMSC via the Rx interface. After receiving the command from the PCRF, the eMSC triggers an inter MSC relocation process or an intra MSC relocation process. The subsequent relocation response is also transmitted to the MME through the PCC system.

As shown in FIG. 7, the process of initiating handover by the UE through the PCC system includes the following steps:

Step 700 and step 701: The eNB initiates a relocation request. This process is the same as step 400 and step 401.

Step 702 to step 704: The MME sends a relocation request to the eMSC through the PCC system.

Step 705 to Step 710: After receiving the relocation request, the eMSC may perform processing in the same way as step 403 to step 408.

Step 711 to step 713: The eMSC returns a relocation response to the eMSC through the PCC system.

Step 714 to step 723: The MME notifies the UE of performing handover and establishing a media connection with the target entity. This process is the same as step 410 to step 419.

Step 724 to step 726: The eMSC releases the bearer of the S1 interface through the PCC system and releases or modifies the bearer of the S5 interface.

An active UE may move back to the SAE/LTE network after moving to the CS domain. In this case, related bearer contexts in the SAE network, IP address, QoS of the bearer, and security related parameters in the PS domain need to be reserved during the PS-CS handover process. In this case, because the UE already stores related contexts, the core network equipment can restore related bearers so long as it can obtain related context parameters. Thus, the UE may connect to the LTE/SAE network quickly and seamlessly. In this scenario, because the signaling plane anchor point of the UE in the CS domain is located in the eMSC and the user plane anchor point is located in the eMGW, the bearer of the UE in the SAE network can be restored when the eMSC triggers an inter MME relocation.

In the first embodiment to the fourth embodiment, the eMSC always sends a handover command to the UE through the MME and the eNB which brings about delay unavoidably. In actual applications, the eMSC may also send a handover command to the UE directly instead of through the MME and the eNB.

In actual applications, the UE may also be handed over from the PS domain to the CS domain in the following modes:

1. After the UE sends a cell measurement report to the eNB, the eNB determines to hand over the UE to the target eNB. The eNB does not send a message to the MME directly but notifies the UE of the handover request. The UE sends the handover request to the eMSC.

2. After receiving the relocation request from the eNB, the MME does not trigger the handover process through an NAS message but sends a relocation response to the eNB. The eNB sends a handover request to the UE. The relocation response and handover request carry an instruction for handing over the UE to the CS domain.

Fifth Embodiment

Figure 8A:
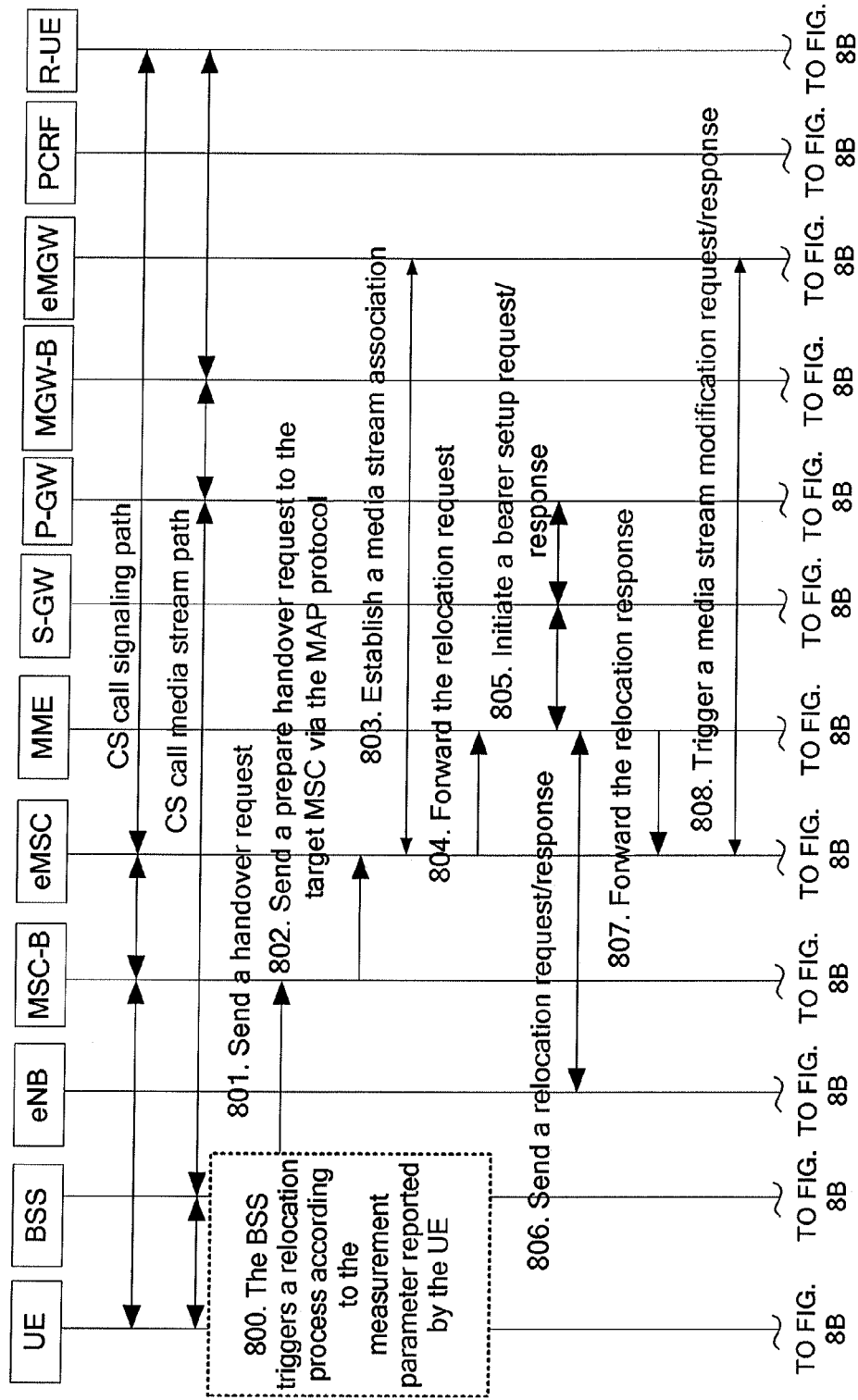
FIG. 8 shows a process of UE handover from a CS domain back to a PS domain in a fifth embodiment of the present disclosure.
Figure 8B:
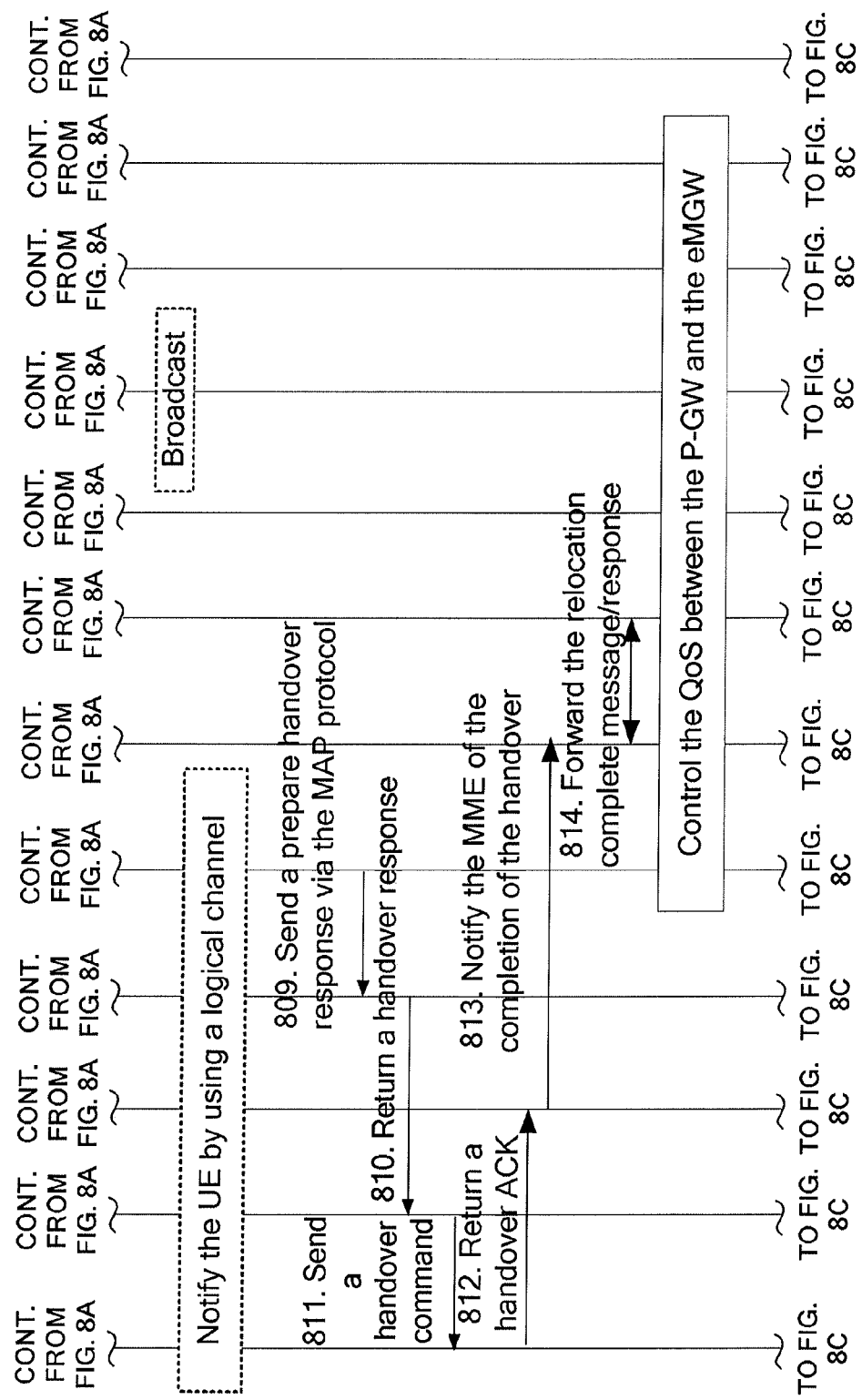
Figure 8C:
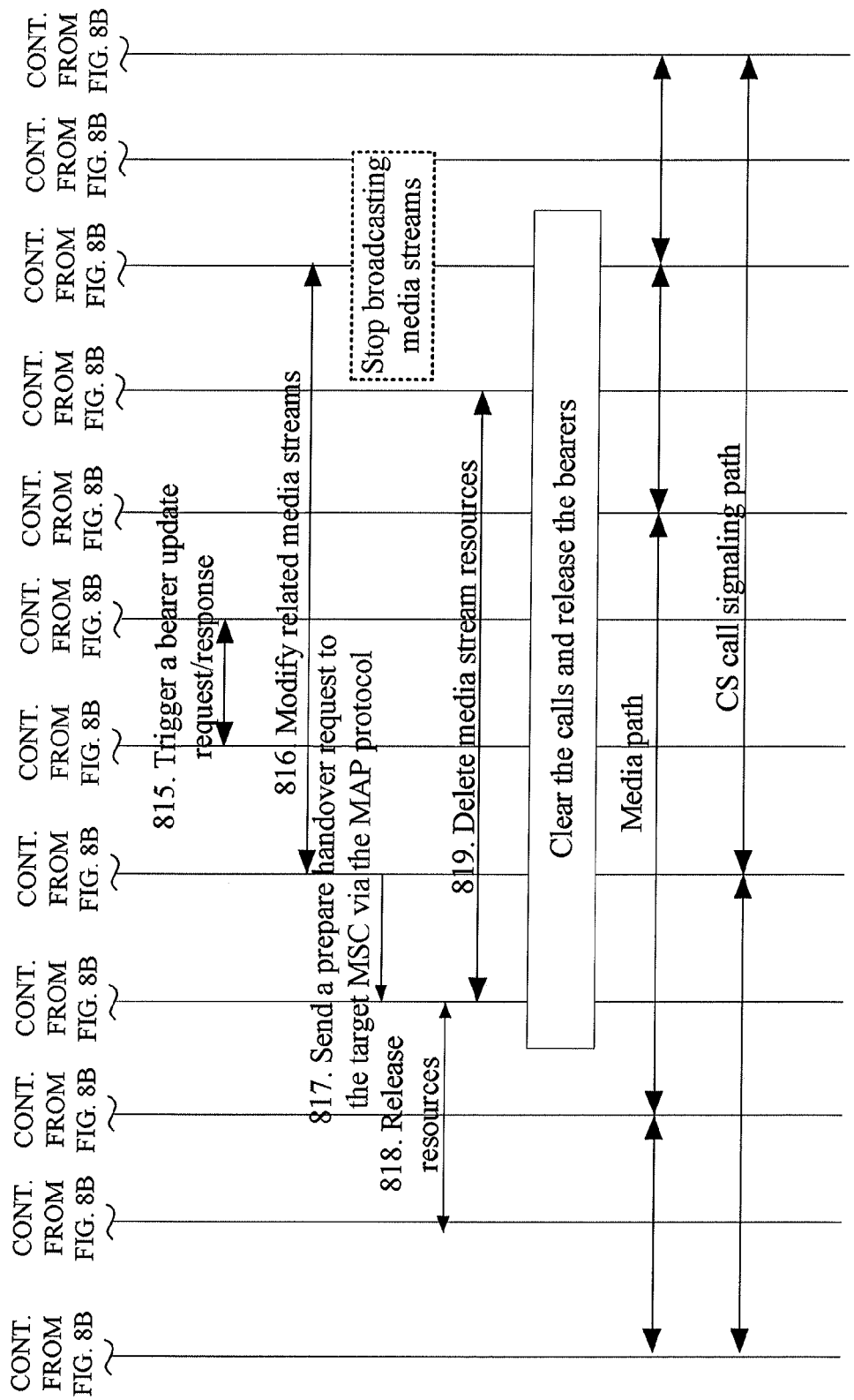

FIG. 8 shows a process of UE handover from a CS domain back to a PS domain in the fifth embodiment of the present disclosure. In this embodiment, the first network is a CS network and the second network is a PS network. The scenario is as follows: when the Gs+ interface exists between the MME and the eMSC, the UE is handed over from the CS domain back to the PS domain.

The eMSC includes functions of the MME. As shown in FIG. 8, the process includes the following steps:

Step 800: When the UE moves in the CS domain, the UE reports measurement data to the BSS.

Step 801: The BSS determines to initiate a relocation process according to the measurement report reported by the UE and sends a relocation request to the MSC-B, namely, the core network entity in the CS domain, where the relocation request involves two cases. Case 1: The relocation request is the same as the relocation command in the traditional CS domain. In this case, the BSS remains unchanged, but the BSS needs to pre-configure a cell parameter list of the target LTE network and determine to initiate the intra MSC relocation or inter MSC relocation by analyzing the parameter of the target entity ID. Case 2: A relocation cause value is added to the relocation request to indicate that the handover is a simulated CS-PS handover. In addition, source radio parameters and encryption parameters may not be carried in the relocation request or filled with null. In this case, the BSS has been upgraded.

Step 802: The MSC-B forwards the relocation request to the eMSC.

Step 803: The eMSC triggers the establishment of a media stream association between the eMGW and the MGW-B.

Because the eMSC already stores the context parameters of the UE during the PS-CS handover of the UE, the eMSC may also provide new parameters of the media plane, for example, IP address and downlink port number of the UE. Thus, when the UE is handed over from the PS domain to the CS domain, the MME needs to store the address or port where the UE accepts the voice media streams in the PS domain and to send the address or port number to the eMSC, or the MME needs to store the IP address and port number where the UE initiates a simulated voice call in the SAE in the eMGW.

To meet the scenario where the UE is handed over from the CS domain back to the PS domain, the eMGW, being the anchor point of the upper-layer user media plane, may store the media plane data accepted by the UE. The media plane data may always be stored by the eMSC from the time when the SAE network starts calling. The related port number may also be allocated by the eMSC.

Step 804: The eMSC discovers an MME and sends a relocation request to the MME via the GS interface.

The method for discovering an MME by the eMSC includes discovering an MME by analyzing the target entity ID, that is, configuring an association between the target eNB and the MME in the eMSC, storing the address of the MME in the context of the UE, and searching for an MME according to the context of the UE. If the discovered MME cannot control the eNB connected to the UE, the MME reselects a proper MME and forwards the message to a new MME. The first MME may select a proper MME by using a query mechanism. For example, the first MME searches for the configuration relationship between the MME and the eNB in an entity such as the DNS, or, the first MME configures a large number of associations between the eNB and the MME in the first MME and obtains a proper MME by searching for the associations.

The relocation request that the eMSC sends to the MME includes bearer context information of the UE in the SAE network, where the context includes only the context of the voice bearer in the PS domain. The context of the voice bearer may be differentiated through the label or by an additional instruction. For example, when the UE initiates a call in the CS domain, the network entity may add a special differentiation instruction or a bearer priority indication to the bearer context of the call. In addition, the network entity may add a relocation cause indication indicating that the handover is a simulated CS-PS handover without providing source radio parameters or encryption parameters. The relocation request may also need to carry radio classmark capabilities of the UE in the LTE/SAE network. The classmark capability information may be already stored in the eMSC or other entities in the core network during the PS-CS handover of the UE, or the classmark capability information is reported by the UE to the BSS in the CS domain and then transmitted by the BSS to the eMSC in case of handover.

Step 805: After the MME receives the relocation request from the eMSC, the MME triggers the establishment of bearers in the existing SAE core network and restores the bearers in the core network.

Step 806: The MME sends a relocation request command to the eNB, where the relocation request includes a special instruction used to inform the eNB of the fact that the handover is different from the normal handover, and the eNB re-reserves radio resources according to the QoS parameters provided by the MME. The relocation request may include a relocation cause value used to inform the eNB of the handover type. After the eNB establishes air interface resources, the eNB responds to the command that includes radio L3 parameters.

Step 807: The MME sends a relocation response that carries radio parameters in the LTE network to the eMSC via the GS+ interface.

Step 808: After receiving the response, the eMSC sends a media stream modification command to the eMGW. To prevent the data from being lost, the command may trigger an eMGW to broadcast media streams to the P-GW and the MGW-B.

The radio parameters carried in the LTE network cannot be encapsulated in the existing handover message. Thus, after receiving the relocation response from the MME, the eMSC may transmit the radio parameters in the LTE network to the UE directly through a logical channel to minimize the impact on the handover in the CS domain. In this case, subsequent relocation commands may use the standard relocation format of the CS domain, but the air interface parameters in the target network may be filled with null. The logical channel between the UE and the eMSC may use a short message mechanism. That is, the eMSC may transmit the radio parameters through an NAS plane between the eMSC or the MSC and the UE. However, this embodiment is not limited to this mode.

Step 809 to step 811: The eMSC sends a relocation request to the UE, where the relocation request includes a relocation cause indication, some air interface parameters in the target network needed by the UE, and a relocation type ID. The relocation cause indication indicates that the relocation message body carries PS related air interface resources. The relocation type ID indicates that the handover type is a PS-CS handover or a simulated CS-CS handover.

Step 812 and step 813: The UE accesses the LTE network and notifies the MME of the completion of the handover.

Step 814: The MME returns a relocation complete message to the eMSC via the GS+ interface. After receiving the message, the eMSC may trigger an action to guarantee the QoS in the MGW and the P-GW. For example, the eMSC notifies the P-GW of classifying some uplink IP data streams through the PCC system so as to guarantee the QoS. In addition, the eMSC notifies the eMGW of classifying some downlink IP data streams so as to guarantee the QoS. These conditions for triggering the QoS guarantee are not limited to the handover complete message, and the QoS guarantee mode is not limited to the preceding mode.

Step 815: The MME triggers the update of bearers between the P-GW and the S-GW.

Step 816: The eMSC controls the eMGW to modify related media streams and may trigger the eMGW to stop broadcasting media streams to the P-GW and the MGW-B.

Step 817 and step 818: The eMSC notifies the CS domain of releasing related resources.

Step 819: The eMSC controls the eMGW to delete the related media stream association.

As shown in FIG. 8, before the UE is handed over from the CS domain back to the PS domain, the CS call signaling path is as follows: UE—MSC-B—eMSC—remote UE. The CS call media path is as follows: UE—BSS—MGW-B—eMGW—remote UE. After the UE is handed over from the CS domain back to the PS domain, the media plane path of the UE is as follows: UE—eMSC—Remote UE, and the CS call media path is as follows: UE—eNB—S/P-GW—eMGW—remote UE.

Sixth Embodiment

Figure 9A:
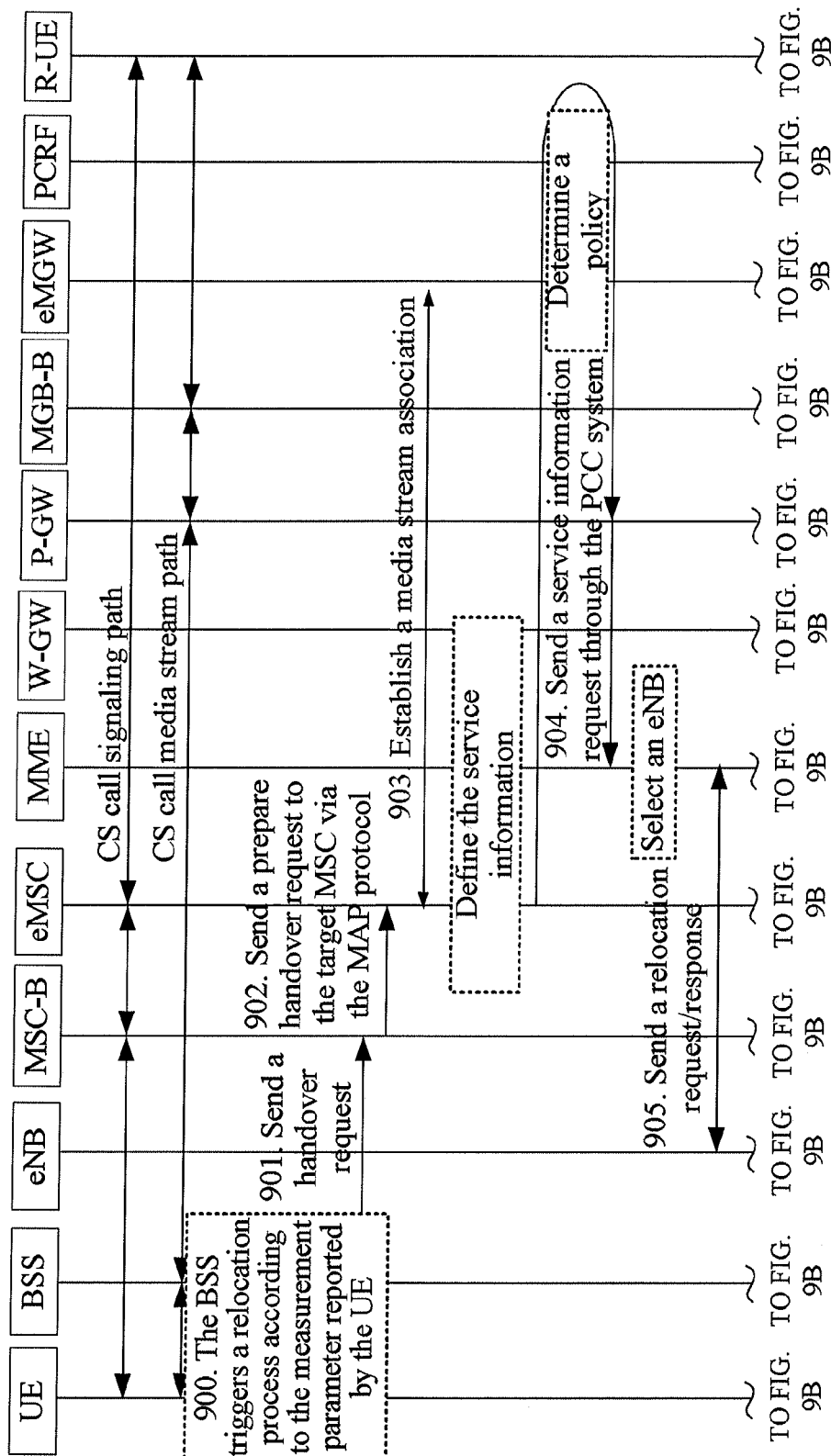
FIG. 9 shows a process of UE handover from a CS domain back to a PS domain in a sixth embodiment of the present disclosure.
Figure 9B:
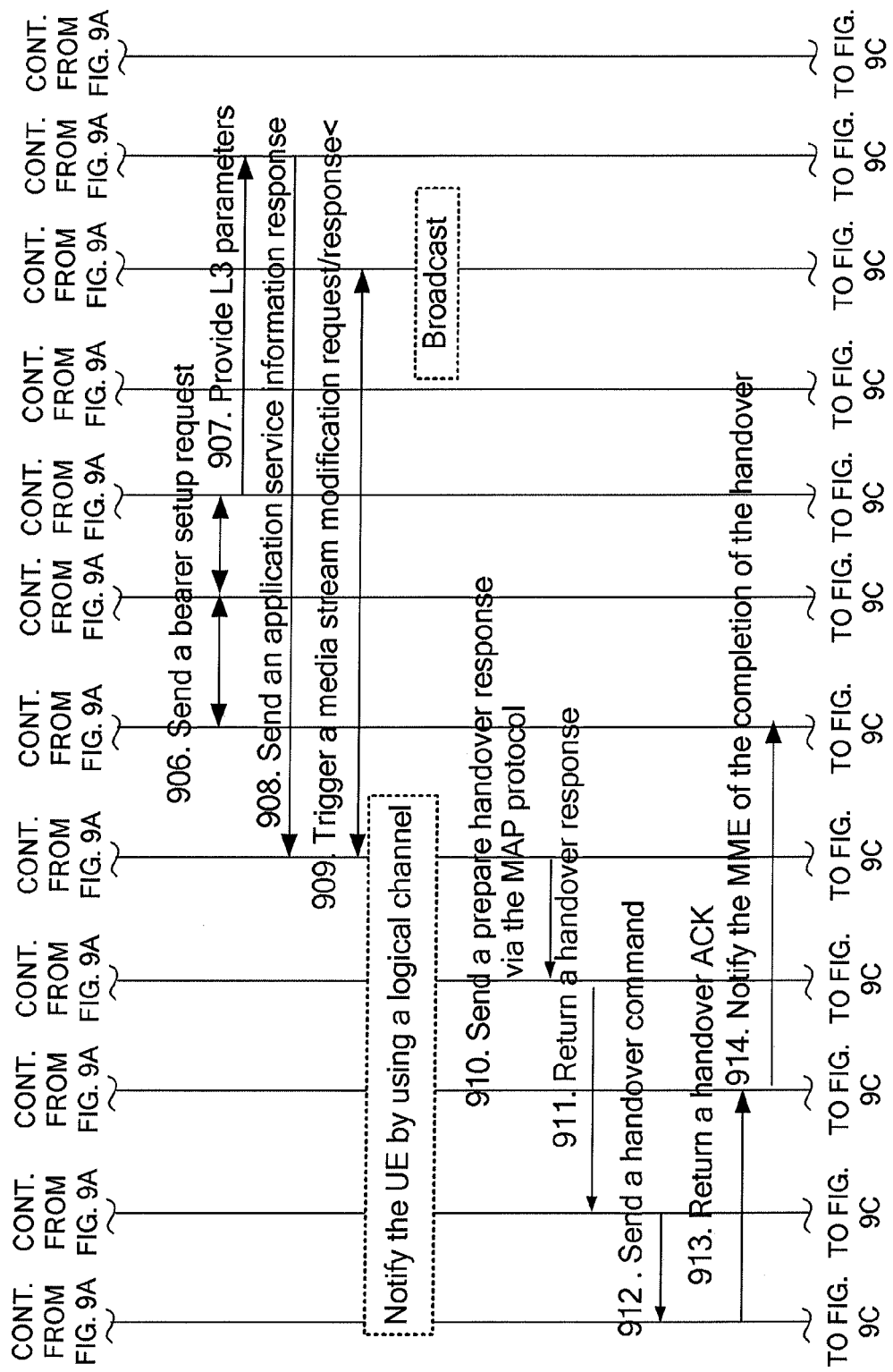
Figure 9C:
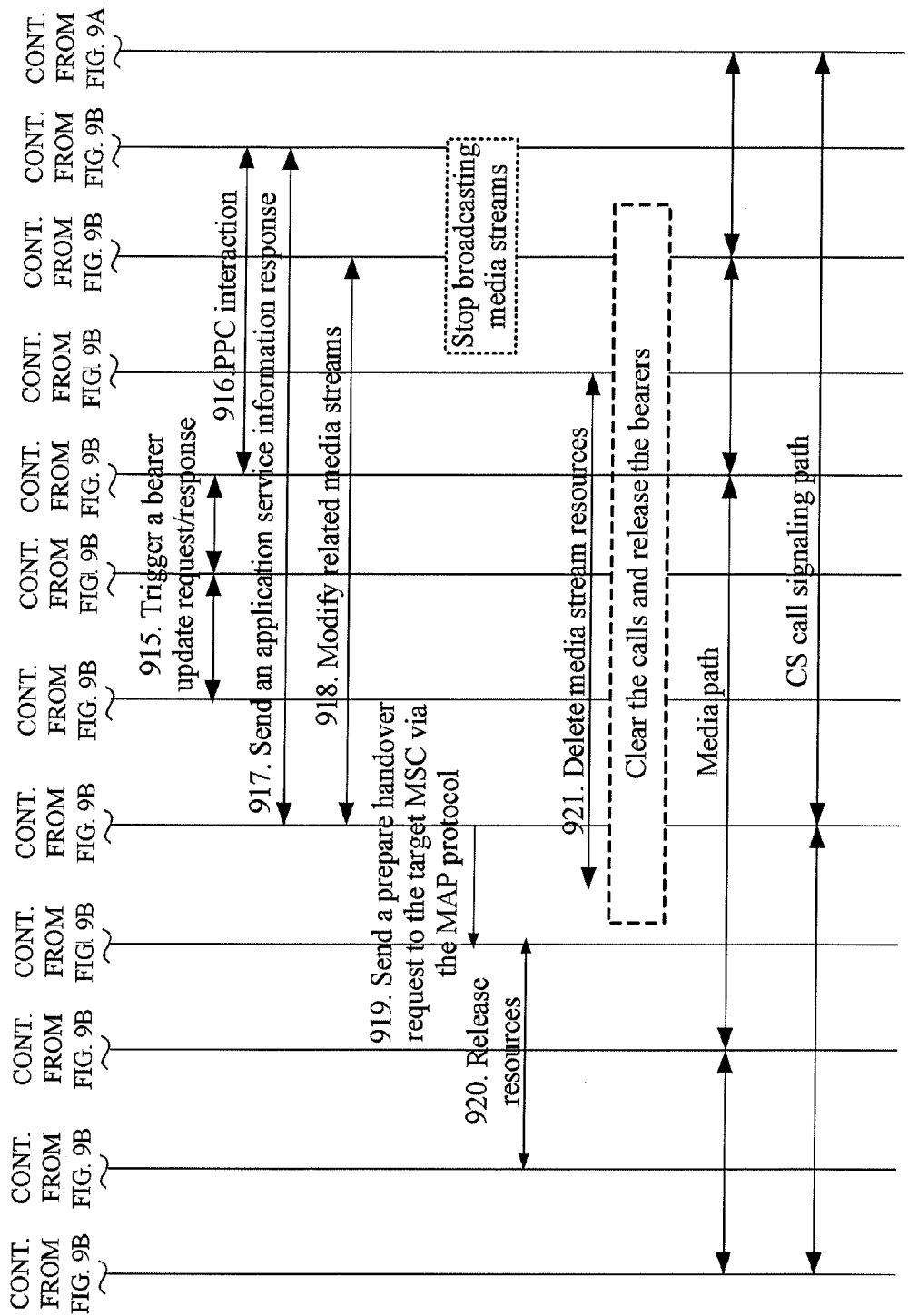

FIG. 9 shows a process of UE handover from a CS domain back to a PS domain in the sixth embodiment of the present disclosure. The scenario is as follows: when no GS+ interface exists between the MME and the eMSC, the UE is handed over from the CS domain back to the PS domain.

In comparison with the fifth embodiment, no Gs+ interface exists between the MME and the eMSC in the sixth embodiment. Thus, the MME needs to communicate with the eMSC through a logical interface, a logical entity (the PCHHCCE) or a PCC system.

When the handover is performed through the PCC system, the eMSC sends a handover command to the P-GW through the Rx interface, and the MME then processes related handover and sends subsequent handover commands to the eMSC through the PCC system.

The following describes a process of UE handover from the CS domain to the PS domain supposing the MME communicates with the eMSC through the PCC system. As shown in FIG. 9, the process includes the following steps:

Step 900 to step 903: The UE sends a relocation request to the eMSC, and the eMSC triggers the establishment of a media stream association in the eMGW. This process is the same as step 800 to step 803.

Step 904: The eMSC sends a handover request command to the MME through the PCC system.

Step 905: The MME sends a relocation request command to the eNB and receives a relocation response from the eNB. This process is the same as step 806.

Step 906 to step 908: The MME forwards the relocation response to the eMSC through the PCC system.

In step 906, the MME sends a bearer setup request to the S/P-GW. In step 907, the MME provides L3 parameters to the PCRF. In step 908, the PCRF sends an application service information response to the eMSC.

Step 909: After receiving the message, the eMSC sends a media stream modification command to the eMGW. To prevent the data from being lost, the instruction may trigger an eMGW to broadcast media streams to the P-GW and the MGW-B.

Step 910 to step 914: The eMSC triggers a media stream modification command to instruct the UE to perform handover, and the UE notifies the MME of completion of the handover. This process is the same as step 809 to step 813.

Step 915 to step 917: The MME forwards a relocation complete message to the eMSC through the PCC system, and the eMSC sends a handover complete response to the MME.

In step 915, the MME triggers the update of bearers between the S-GW and the P-GW.

Step 918 to step 921: The eMSC modifies and releases media streams. This process is the same as step 816 to step 819.

To perform the handover through the PCHCCE, the eMSC sends a relocation request to the PCHCCE, and the PCHCCE triggers related subsequent relocation. If the PCHCCE has functions of the MME, the PCHCCE triggers an inter MME relocation process. Otherwise, the PCHCCE needs to discover a new MME. The MME discovery mechanism includes the PCHCCE finding a proper MME according to the target eNB ID, the eMSC finding a proper MME by searching for the configuration relationship between the eNB and the MME, and the UE sending the attached MME ID in the SAE network to the eMSC. When the UE is handed over from the CS domain to the SAE network, the UE may initiate an inter MME relocation process to select a proper MME.

When an active UE moves, the MME relocation may be triggered. The eMSC has a related service control range. Thus, if the UE is still attached to the source eMSC after the MME is relocated, the source eMSC may loose the control or may not find a BSS or an MSC that serves the UE in the CS domain when the UE continues moving to the CS domain. Thus, an eMSC location update process needs to be triggered so that the UE can be attached to a more suitable eMSC. Therefore, embodiments of the present disclosure describe a process of reattaching a UE to a new eMSC due to MME relocation. However, the UE may also be reattached to the eMSC. If any changes occur to the eMSC, the CS signaling plane bearer may be changed in the evolved network. If the CS signaling is carried on a default bearer, the eMSC needs to notify the UE of the new address and port number of the eMSC. If the CS signaling is carried on a dedicated bearer, the eMSC needs to modify the uplink TFT and modify the original dedicated bearer or establish a new dedicated bearer in addition to notifying the UE of the new address and port number of the eMSC.

When the UE is reattached to a new eMSC due to MME relocation, the source MSCy is still the anchor point of the signaling plane. In this case, the signaling plane path is as follows: UE—target MSC—source MSC—remote UE. Because the change of the serving eMSC of the UE may result in the change of the serving eMGW of the UE, the source eMGW is still the anchor point of the media plane. That is, the media plane path is as follows: UE—P-GW—target eMGW—source eMGW—remote UE.

In this case, the source eMGW needs to notify the lower node of the address and allocated port number of the target eMGW to ensure the smooth uplink on the media plane. The notification method includes notifying the UE of the information directly so that the UE can send media data to the target eMGW, notifying the UE of the information through the P-GW so that the UE can send media data to the target eMGW, and notifying the P-GW rather than the UE of the information so that the P-GW may process the media data received from the UE in a special way and route the media data to the target eMGW although the destination address is the source eMGW.

In addition, the source eMGW needs to notify the target eMGW of the IP address and port number of the UE to ensure the smooth downlink on the media plane. The notification method includes the UE reporting the information to the target eMGW, the source eMSC notifying the target eMSC of the information recorded by the source eMSC, the target eMSC notifying the target eMGW of the information, and the target eMSC searching for the information through the HSS and notifies the target eMGW of the information.

Seventh Embodiment

Figure 10A:
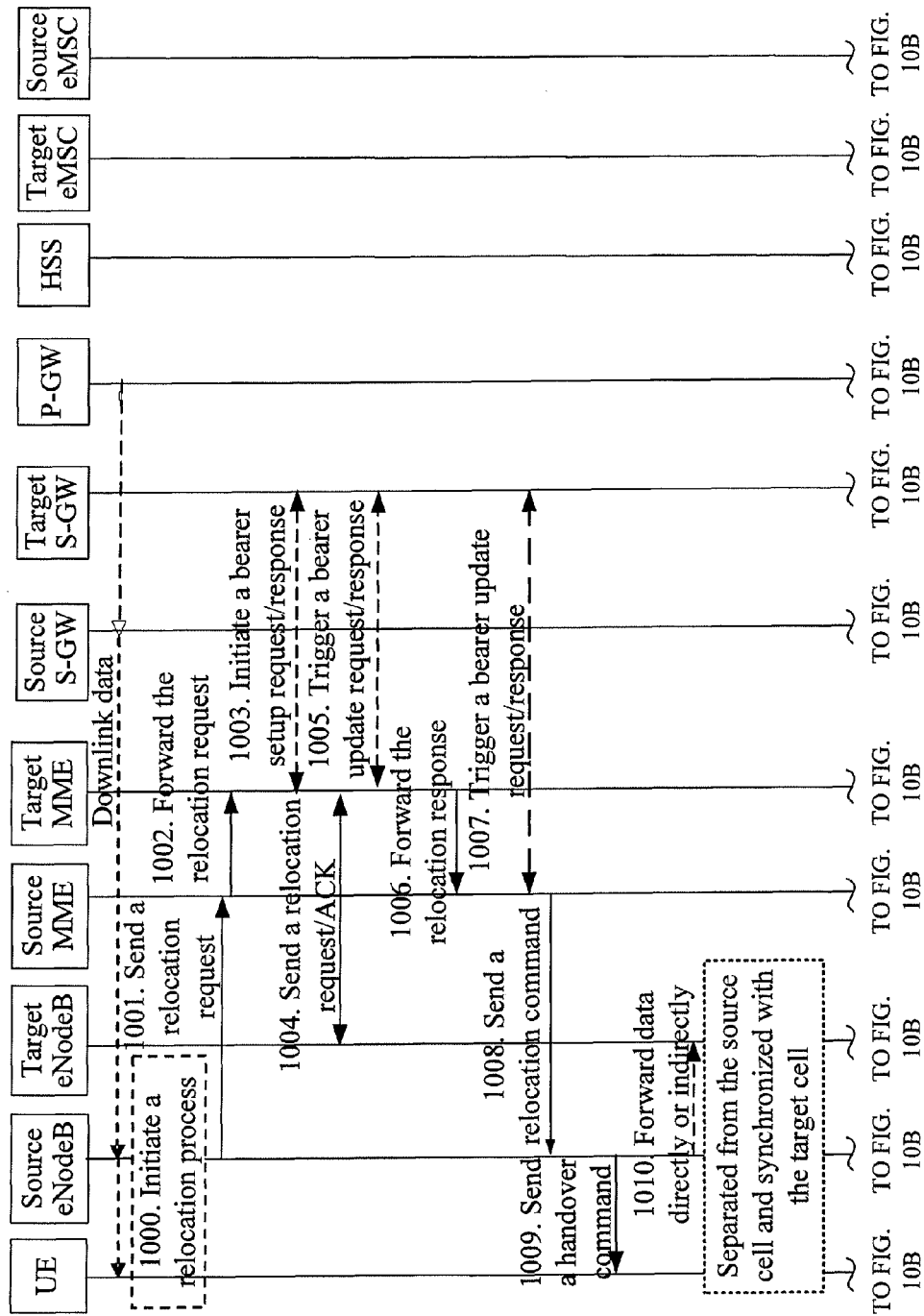
FIG. 10 shows a process of reattaching a UE to an eMSC due to MME relocation in a seventh embodiment of the present disclosure.
Figure 10B:
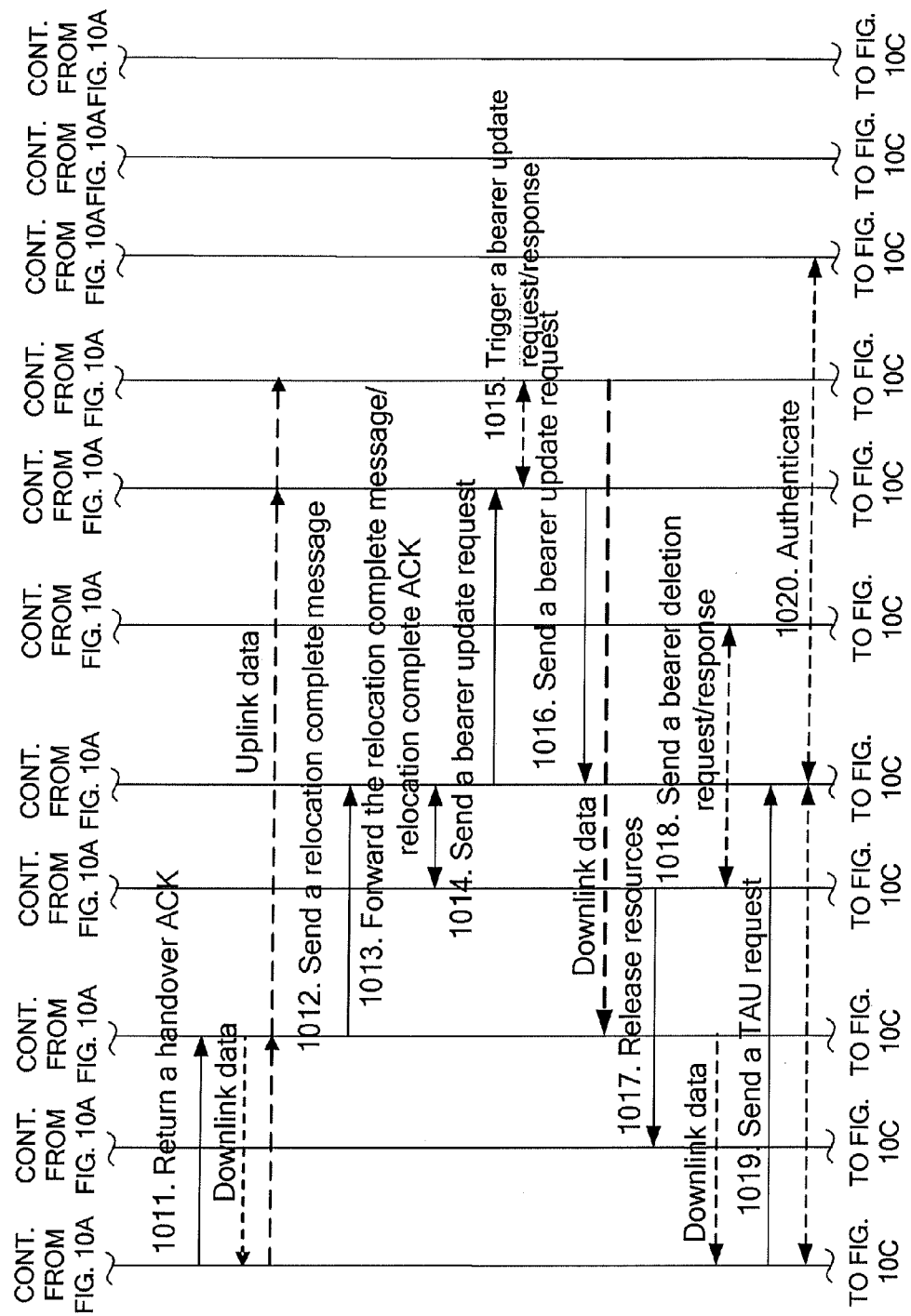
Figure 10C:
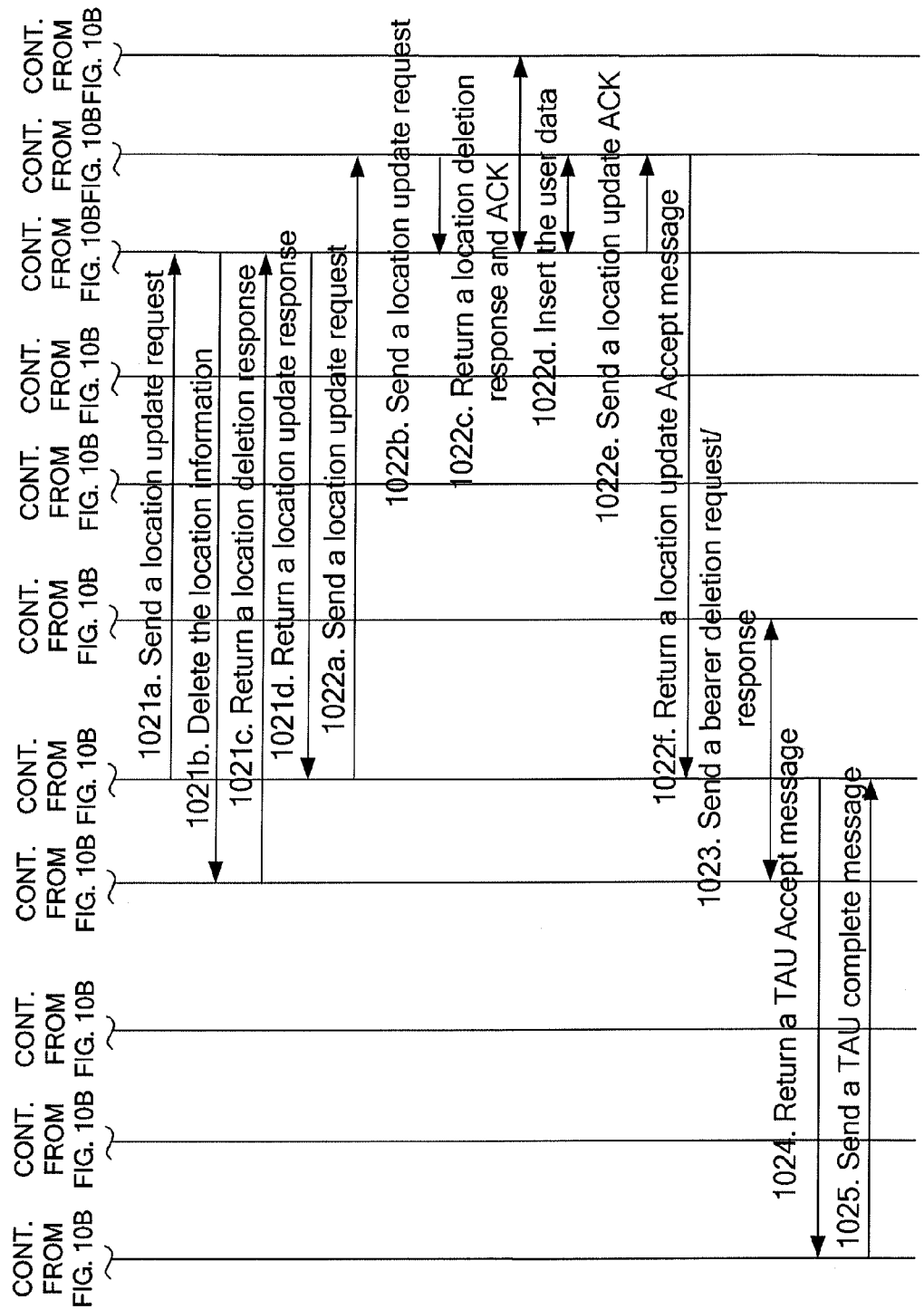

FIG. 10 shows a process of reattaching a UE to an eMSC due to MME relocation in the seventh embodiment of the present disclosure. The scenario is as follows: when the Gs+ interface exists between the MME and the eMSC and no simulated CSoPS service is available in the system, the UE is reattached to a new eMSC due to MME relocation.

As shown in FIG. 10, the process includes the following steps:

Step 1000: The source eNB initiates a handover from the source eNB to the target eNB.

Step 1001: The source eNB sends a relocation request to the source MME, where the relocation request indicates bearer information related to data transmission.

Step 1002: The source MME selects a target MME and sends a relocation request to the target MME.

The source MME selects a target MME according to the location relationship of the UE, the coverage relationship of the MME service area, and whether the interface between the MME and the eMSC is supported.

Step 1003: The target MME judges whether the original S-GW can continue serving the UE. If the S-GW cannot serve the UE, the target MME selects a target S-GW for serving the UE. After selecting a target S-GW, the target MME may send a bearer setup request to the target S-GW. After allocating addresses and tunnel endpoint identifiers (TEIDs) for the uplink service transmission, the target S-GW may send a bearer setup response to the target MME. If the S-GW can serve the UE, this step may be omitted.

Step 1004: The target MME sends a relocation request that includes the address of the S-GW and the uplink TEID to the target eNB. After receiving the relocation request, the target eNB generates a UE context that includes bearer and security related information. The target eNB sends a relocation request ACK as the response to the MME. The ACK includes addresses and TEIDs that the eNB allocates for the downlink service.

Step 1005: The target MME establishes forward parameters in the target S-GW.

Step 1006: The target MME sends a relocation response to the source MME.

Step 1007: If an indirect data forward mechanism is used between the eNBs, the source MME updates the tunnel between the source S-GW and the target S-GW.

Step 1008: The source MME sends a relocation command that includes destination addresses and TEIDs to the source eNB.

Step 1009: The source eNB sends a handover command to the UE.

Step 1010: The source eNB begins to transmit the downlink data to the target eNB.

Step 1011: After the UE is synchronized to the target cell, the UE sends a handover ACK to the target eNB.

Step 1012: The target eNB sends a relocation complete message to the target MME.

Step 1013: The target MME sends a relocation complete message to the source MME. The source MME sends a relocation complete ACK as the response to the target MME.

Step 1014: The target MME sends a bearer update request to the target S-GW.

Step 1015: If the S-GW is relocated, the target S-GW allocates addresses and TEIDs for the downlink service of the P-GW and adds these addresses and TEIDs to the bearer update request that the target S-GW sends to the P-GW. By using these addresses and TEIDs, the P-GW sends downlink packets to the target S-GW through the tunnel between the target S-GW and the target eNB. If the S-GW does not perform the reallocation, this step is omitted.

Step 1016: The target S-GW sends a bearer update response to the target MME.

Step 1017: After receiving the relocation complete message, the source MME sends a resource release message to the source eNB. After the source eNB receives the resource release message and has no other transmission requirements, the source eNB releases the resource.

Step 1018: If any changes occur to the S-GW, the source MME sends a bearer deletion request to the source S-GW.

Step 1019: When the UE is handed over to a new TA and is not registered in the network, the UE may send a tracking area update (TAU) request to the target MME.

Step 1020: The target MME authenticates the UE.

Step 1021: The target MME notifies the HSS of updating the location information of the UE. Then, the HSS notifies the source MME of deleting the user data.

Step 1022: The target MME sends a location update request to the target eMSC requesting to update the user location. Then, the target eMSC notifies the HSS of updating the user location, and the HSS notifies the source eMSC of deleting the user data and notifies the target eMSC of inserting the user data. The details are as follows:

Step 1022*a*: The target MME selects a target eMSC and sends a location update request to the target eMSC, where the location update request carries a new location area identity (LAI), an international mobile subscriber identity (IMSI), an MME number, and a location update type. The LAI may be mapped out from the TAID. The location area type indicates that the location update is to simulate the CS attachment due to MME relocation. The LAI and the location update type parameters may also be omitted or be filled with null or a special parameter.

The method for selecting a target eMSC by the target MME is the same as the eMSC discovery mechanism in step 402 described in the first embodiment.

Step 1022*b* to step 1022*e*: The target eMSC, the source eMSC, and the HSS perform a normal location update process.

Step 1022*f*: The source e-MSC returns a location update ACK to the MME, and the MME stores the address of the target eMSC in the mobility management context.

Step 1023: The source MME deletes the bearer context in the source S-GW. If the S-GW remains unchanged, only the signaling connection between the source MME and the source S-GW is released.

Step 1024: The target MME allocates a new SAE temporary mobile subscriber identity (S-TMSI) for the UE and sends the new S-TMSI to the UE through a TAU Accept message.

Step 1025: The UE sends a TAU complete message to the target MME to confirm that the new S-TMSI is allocated.

Eighth Embodiment

Figure 11A:
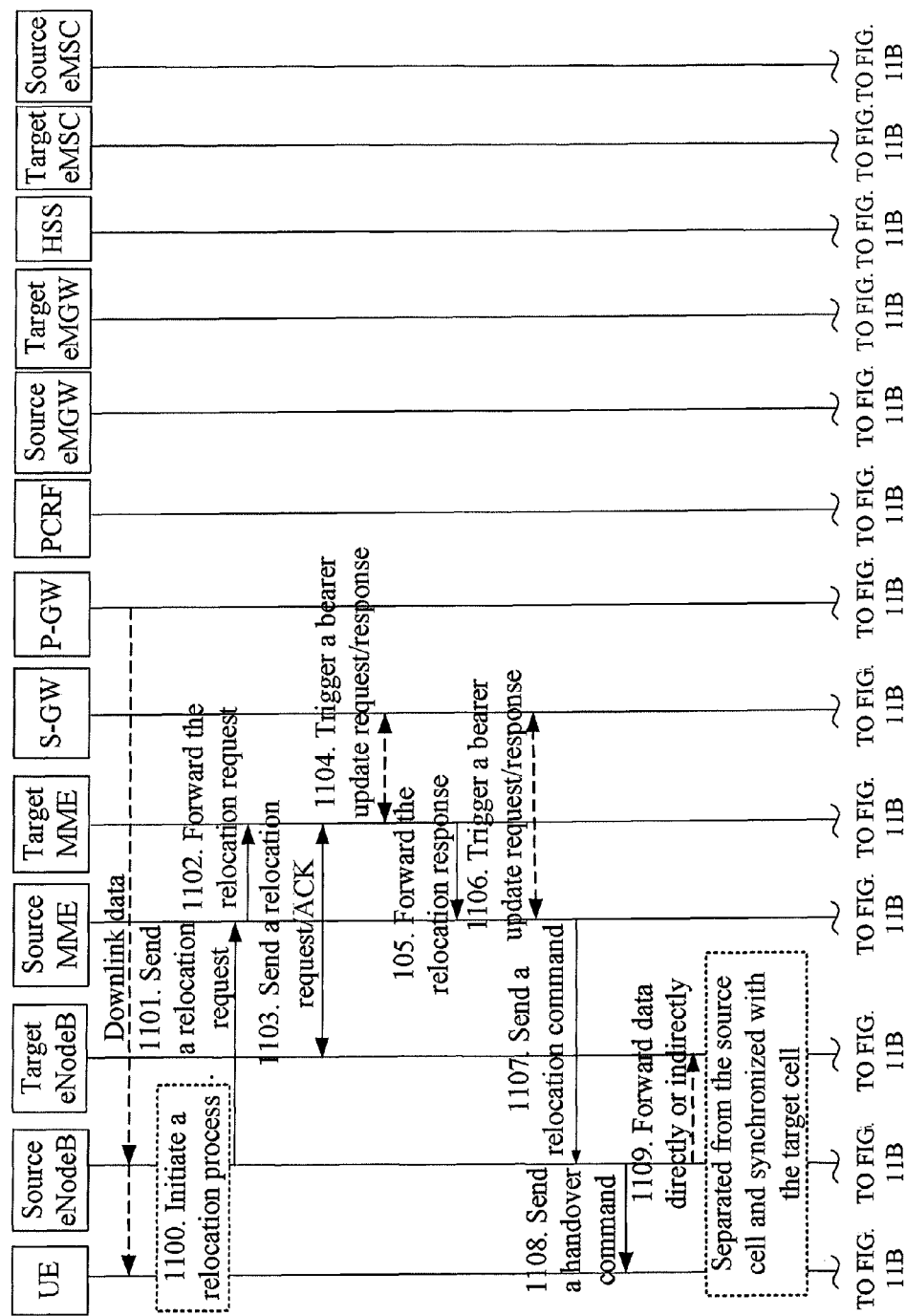
FIG. 11 shows a process of reattaching a UE to an eMSC due to MME relocation in an eighth embodiment of the present disclosure.
Figure 11B:
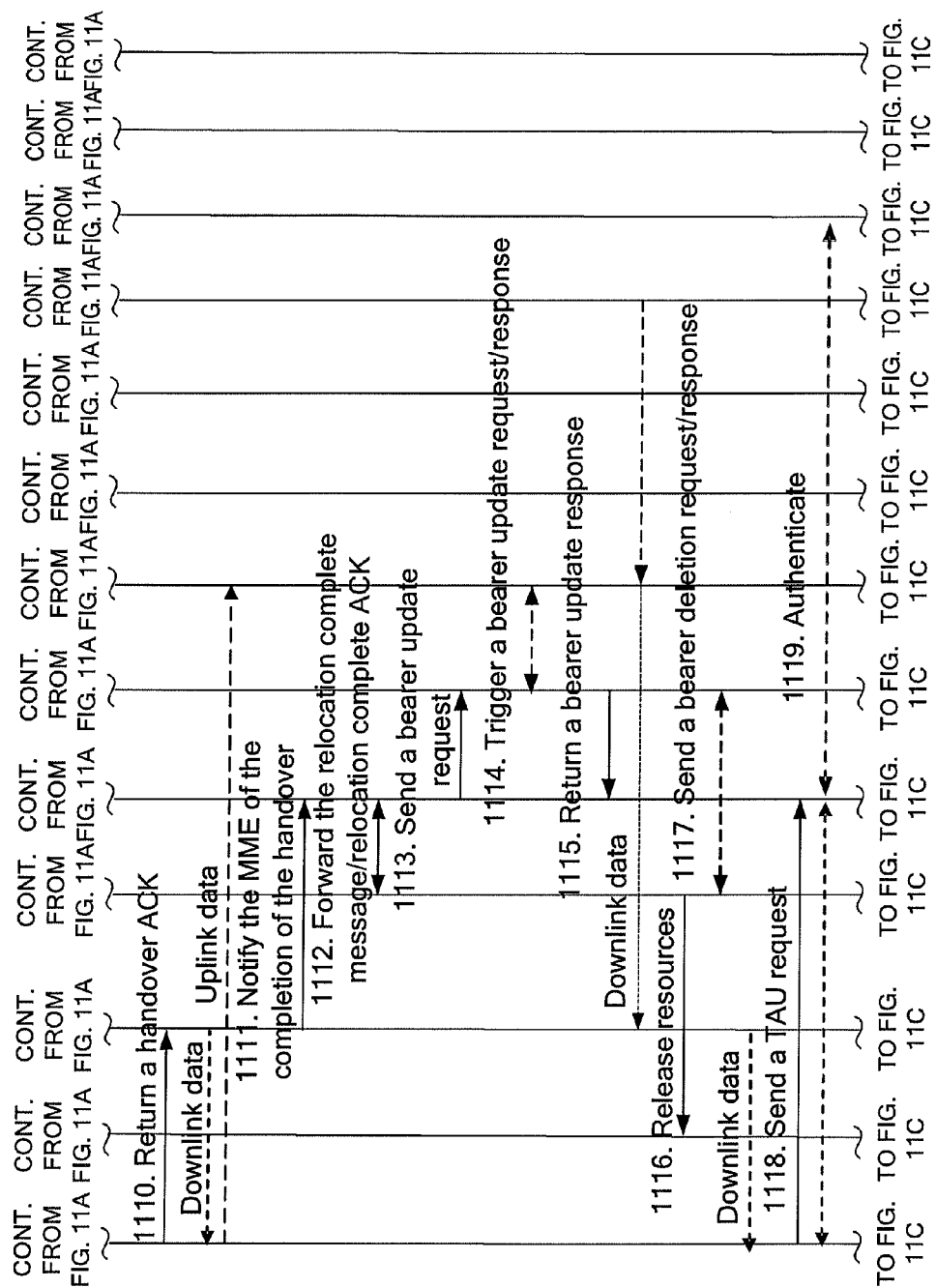
Figure 11C:
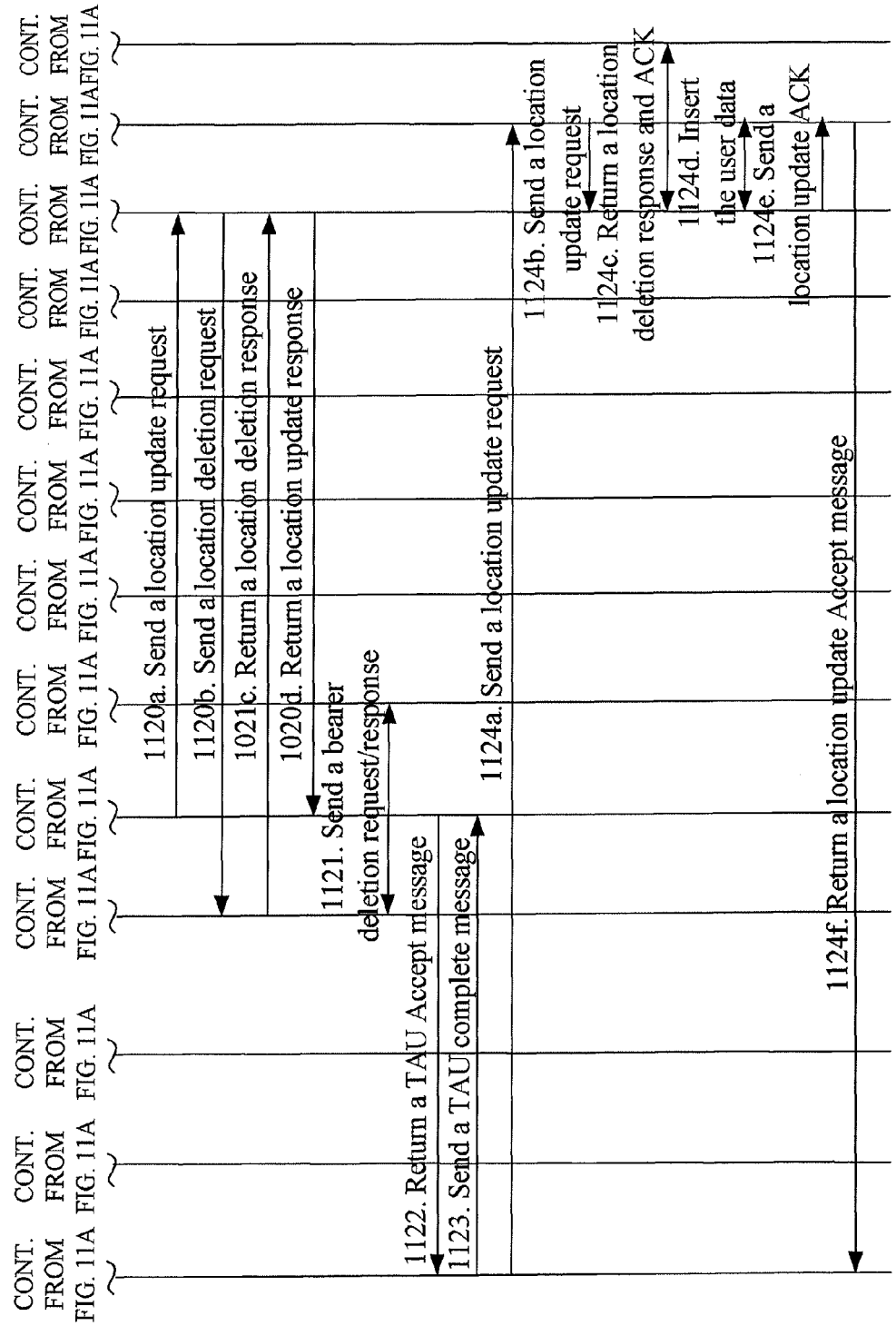

FIG. 11 shows a process of reattaching a UE to an eMSC due to MME relocation in the eighth embodiment of the present disclosure. The scenario is as follows: when the Gs+ interface does not exist between the MME and the eMSC and no simulated CSoPS service is available in the system, the UE is reattached to a new eMSC due to MME relocation.

In comparison with the seventh embodiment, no Gs+ interface exists between the MME and the eMSC in the eighth embodiment. Thus, when the target MME sends a location update request to a target eMSC, the MME needs to forward the location update request to the eMSC through the UE or the network entity via a logical channel, a logical entity, or the PCC system. For example, to forward a location update request to the target eMSC through the IP connection, the target MME sends the location update request to the UE after updating the tracking area to the target MME, and then the UE sends the location update request to the target eMSC through the IP connection. This embodiment describes a process of reattaching a UE to a new eMSC due to MME relocation by taking the IP connection as an example. As shown in FIG. 11, the process includes the following steps:

Step 1100 to step 1120: The UE is relocated from the source MME to the target MME. These steps are the same as step 1000 to step 1122. In this process, it is assumed that the original S-GW may continue serving the UE. That is, the target MME does not need to send a bearer setup request to the new S-GW.

Step 1121 to step 1123: The source MME deletes the bearer between the source MME and the S-GW, and the target MME allocates a new S-TMSI for the UE. This process is the same as step 1023 to step 1205.

Step 1124: Because no Gs interface exists between the MME and the eMSC, the UE triggers a location update request to the target eMSC.

Ninth Embodiment

Figure 12A:
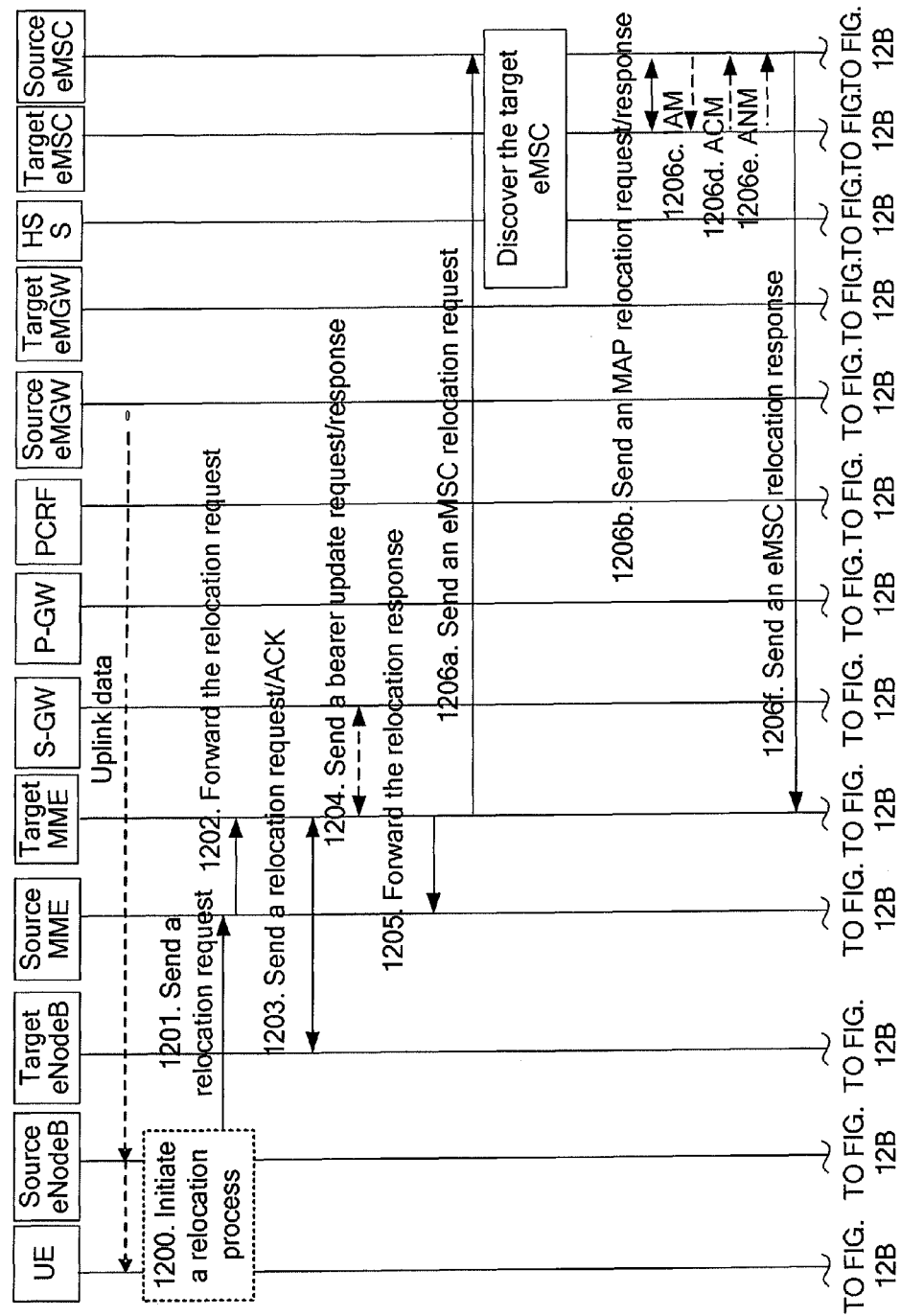
FIG. 12 shows a process of reattaching a UE to an eMSC due to MME relocation in a ninth embodiment of the present disclosure.
Figure 12B:
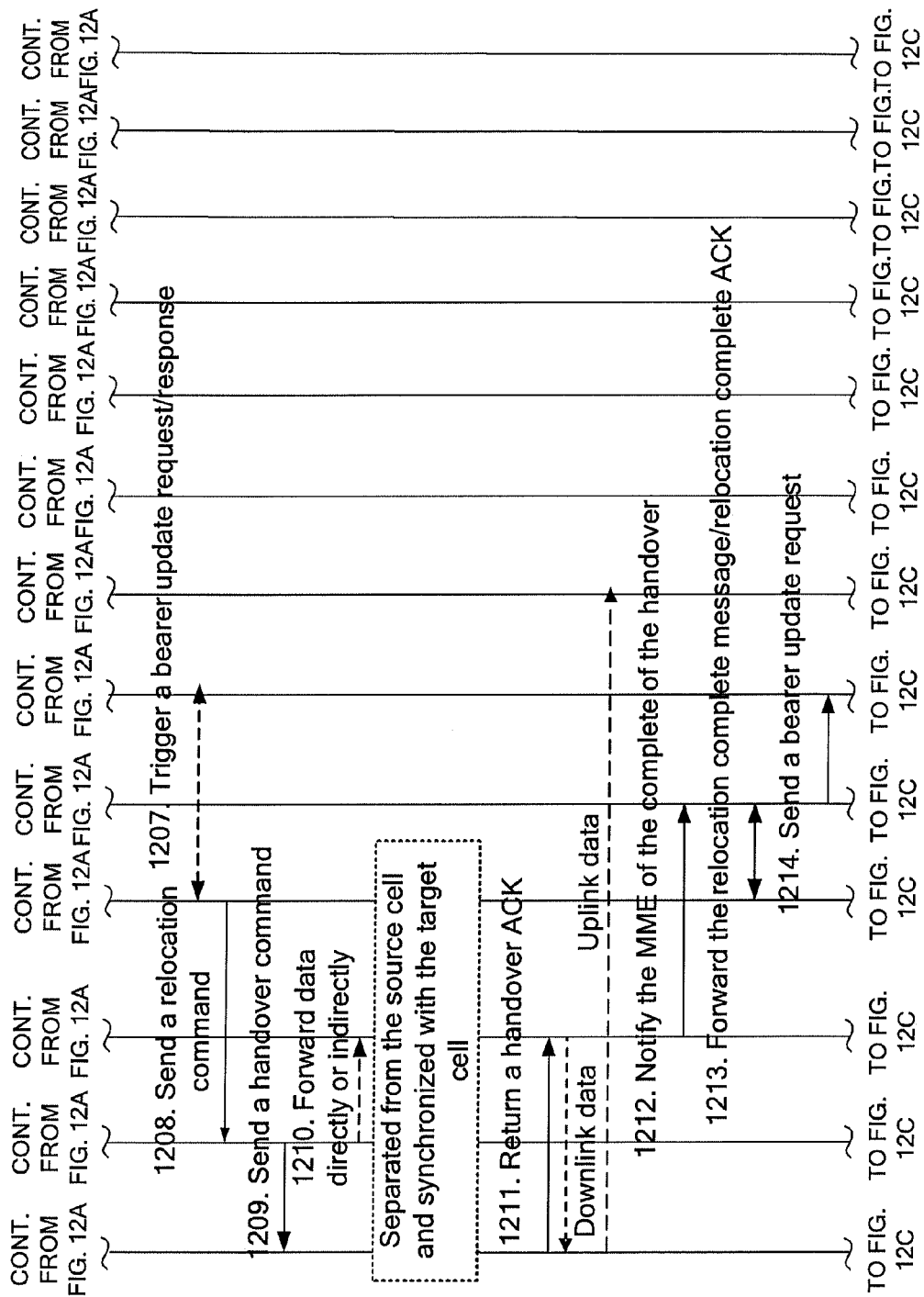
Figure 12C:
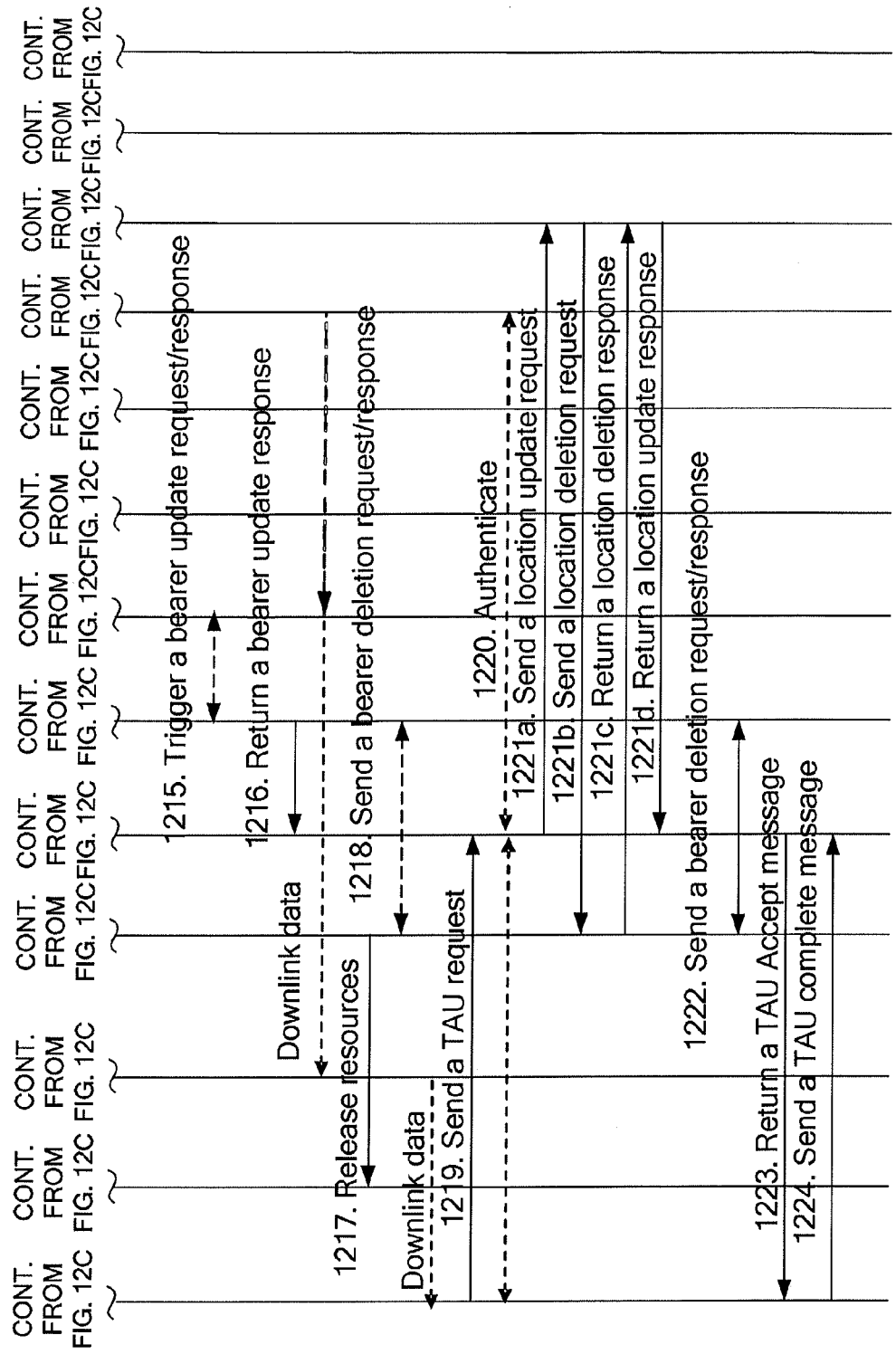

FIG. 12 shows a process of reattaching a UE to an eMSC due to MME relocation in the ninth embodiment of the present disclosure. The scenario is as follows: when the Gs+ interface exists between the MME and the eMSC and the simulated CSoPS service is available in the system but no change occurs to related media planes, that is, without considering the change of the user media plane due to adding a new eMSC to the signaling path for the CS service call of the UE, the UE is reattached to a new eMSC due to MME relocation.

The difference between the ninth embodiment and the seventh embodiment is as follows: in the seventh embodiment, due to the lack of the CSoPS service, the target MME sends a location update request to the target eMSC after the MME is relocated. In the ninth embodiment, due to the availability of the CSoPS service, the target MME sends an eMSC relocation request to the source eMSC.

As shown in FIG. 12, the process of reattaching a UE to a new eMSC due to MME relocation includes the following steps:

Step 1200 to step 1205: The source access network sends a relocation request to the target access network and receives a response from the target access network. This process is the same as step 1000 to step 1006. In this process, it is assumed that the original S-GW may continue serving the UE. That is, the target MME does not need to send a bearer setup request to the new S-GW.

Step 1206a: After relocating the MME, the target MME judges whether to initiate the relocation. If so, the target MME initiates a relocation request to the source eMSC.

When the source eMSC determines not to initiate the relocation, the source eMSC may reject this handover request. If the source eMSC determines to initiate the relocation, the source eMSC initiates the search for the target eMSC. The target MME may search for the address of the target eMSC and add the searched address to an eMSC relocation command or add the current LAI of the UE to the eMSC relocation command. The source eMSC finds a proper target eMSC according to the LAI.

Step 1206b: The source eMSC sends an MAP relocation request to the selected target eMSC, and the target eMSC returns an MAP relocation response to the source eMSC.

Step 1206c to step 1210e: The source eMSC establishes a CS domain bearer between the target eMSC and the source eMSC.

Step 1206f: The source eMSC sends a relocation response to the target MME and notifies the target MME of a new address of the eMSC.

In step 1206, the target MME may initiate a relocation request to the source eMSC in subsequent steps.

Step 1207 to step 1224: The UE is reattached to a new eMSC. This process is the same as step 1007 to step 1021 and step 1003 to step 1025.

When the simulated CS call signaling of the UE is carried on a default bearer in the SAE network, only the address information of the target eMSC needs to be provided to the UE. When the simulated CS call signaling of the UE is over a dedicated bearer in the SAE network, the eMSC needs to modify the special signaling plane bearer through the PCC system, or the UE initiates a bearer modification process after obtaining the address parameters of the target eMSC.

Tenth Embodiment

Figure 13A:
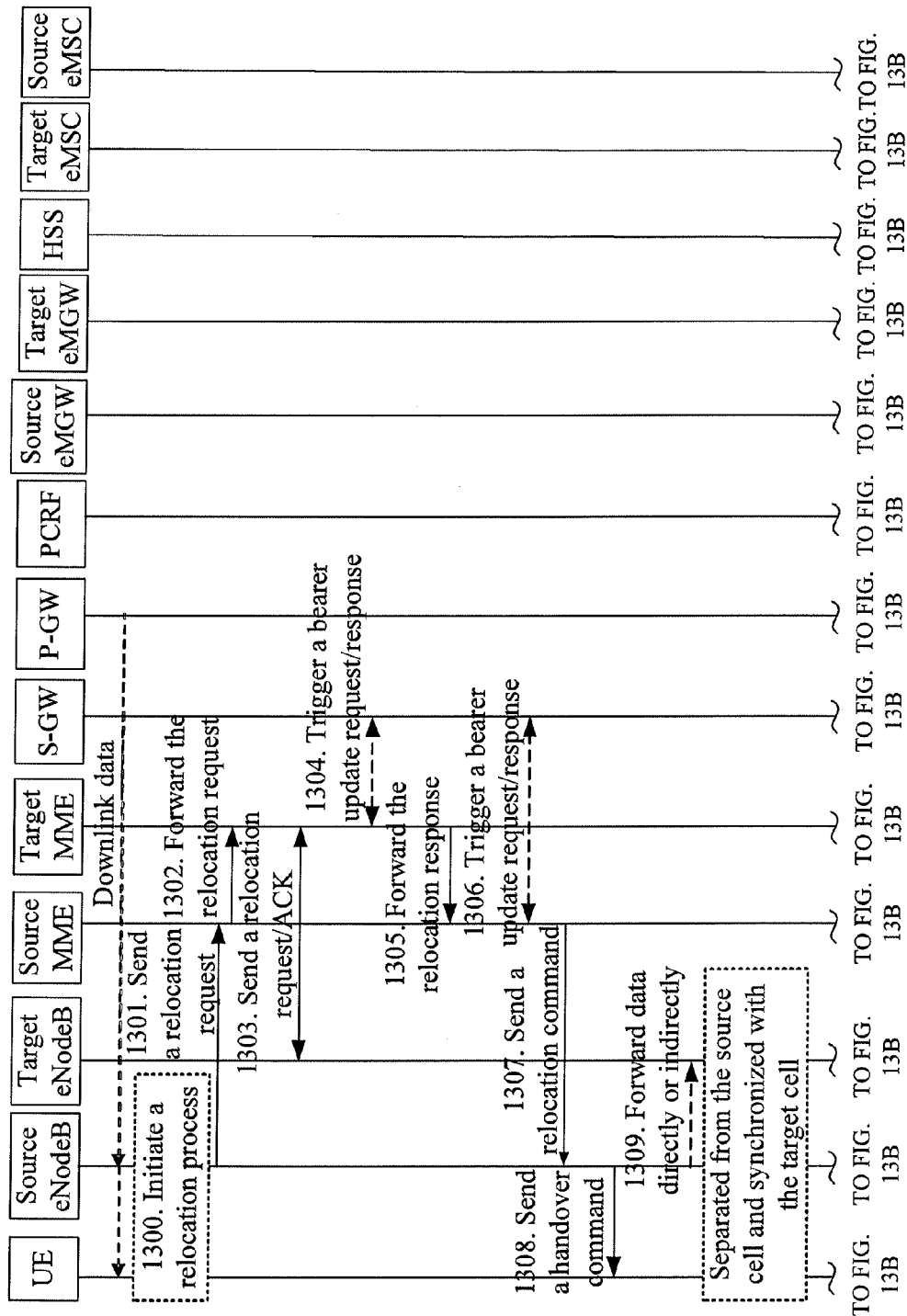
FIG. 13 shows a process of reattaching a UE to an eMSC due to MME relocation in a tenth embodiment of the present disclosure.
Figure 13B:
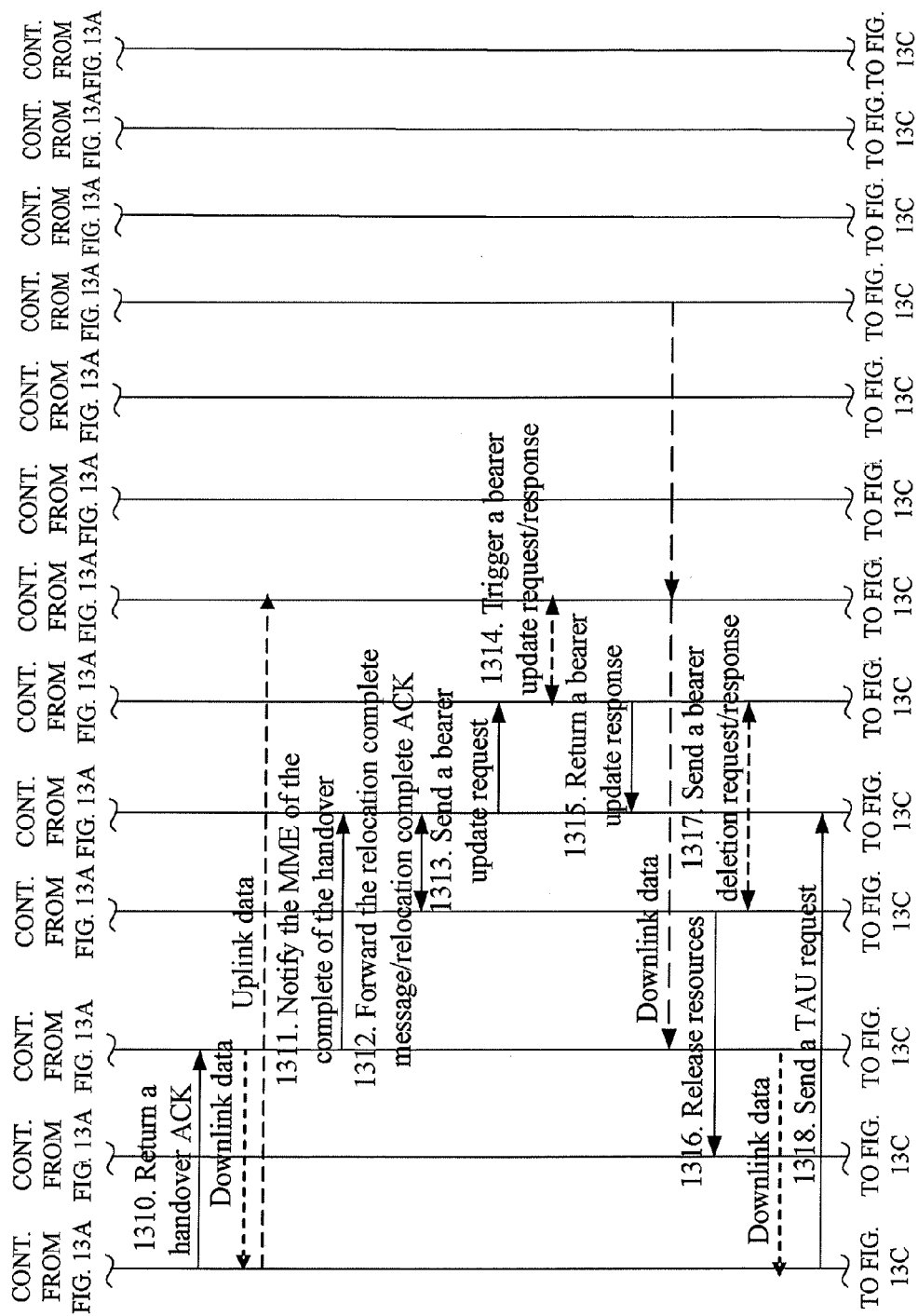
Figure 13C:
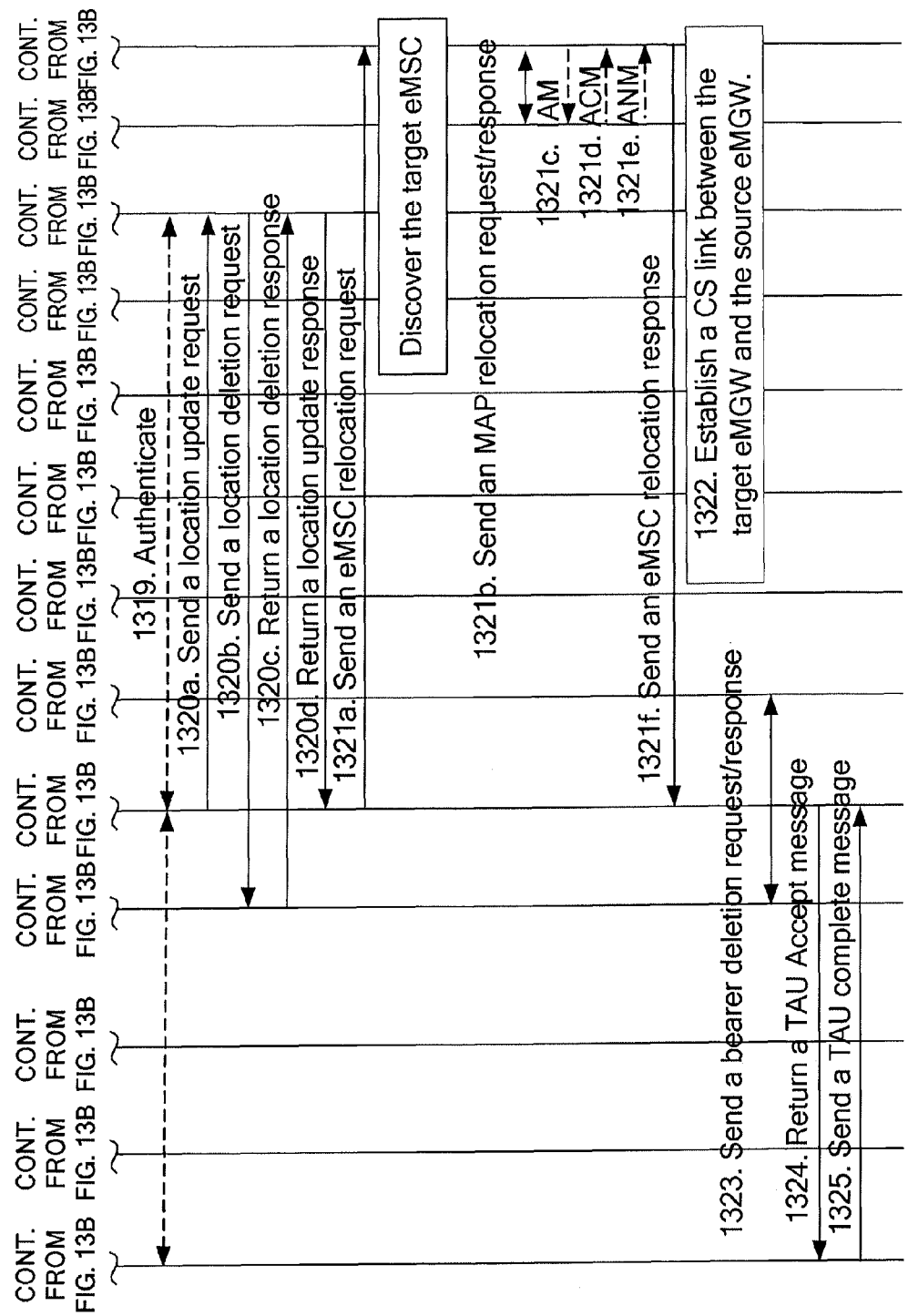

FIG. 13 shows a process of reattaching a UE to an eMSC due to MME relocation in the tenth embodiment of the present disclosure. The scenario is as follows: when the Gs+ interface exists between the MME and the eMSC, the simulated CSoPS service is available in the system, and changes occur to the related media planes, the UE is reattached to a new eMSC due to MME relocation.

In comparison with the ninth embodiment, the change of the eMSC results in the change of the MGW in the tenth embodiment. That is, the target eMSC needs to select a target MGW and to add the selected target MGW to the media plane path.

Step 1300 to step 1320: The process of relocating the MME is the same as step 1200 to step 1205 and step 1207 to step 1221.

Step 1321: The target MME sends a relocation request to the source eMSC and determines a target eMSC. This process is the same as step 1206.

Step 1322: After the source eMSC returns a relocation ACK to the target MME, the source eMSC and the target eMSC control the source eMGW and the target eMGW, respectively, to establish a media association (that is, a media path) between the source eMGW and the target eMGW. Then, the source eMSC changes the current path of media streams in a special CS domain of the UE through the PCC system. For example, the source eMSC controls the creation and modification of the stream template previously carried in the PS domain or controls the P-GW to forward the media data to the target eMGW by using a specific route. If the source eMSC modifies the media plane by modifying the stream template, the source eMSC may also notify the UE of new related media plane parameters so that the UE initiates the bearer modification. When all the bearers are associated, the new bearer plane path of the UE is as follows: UE—P-GW—target eMGW—source eMGW—remote UE.

Step 1323 to step 1325: The source eMSC deletes the bearer between the source MME and the S-GW, and the UE updates the TA. This process is the same as step 1222 to step 1224.

Eleventh Embodiment

Figure 14A:
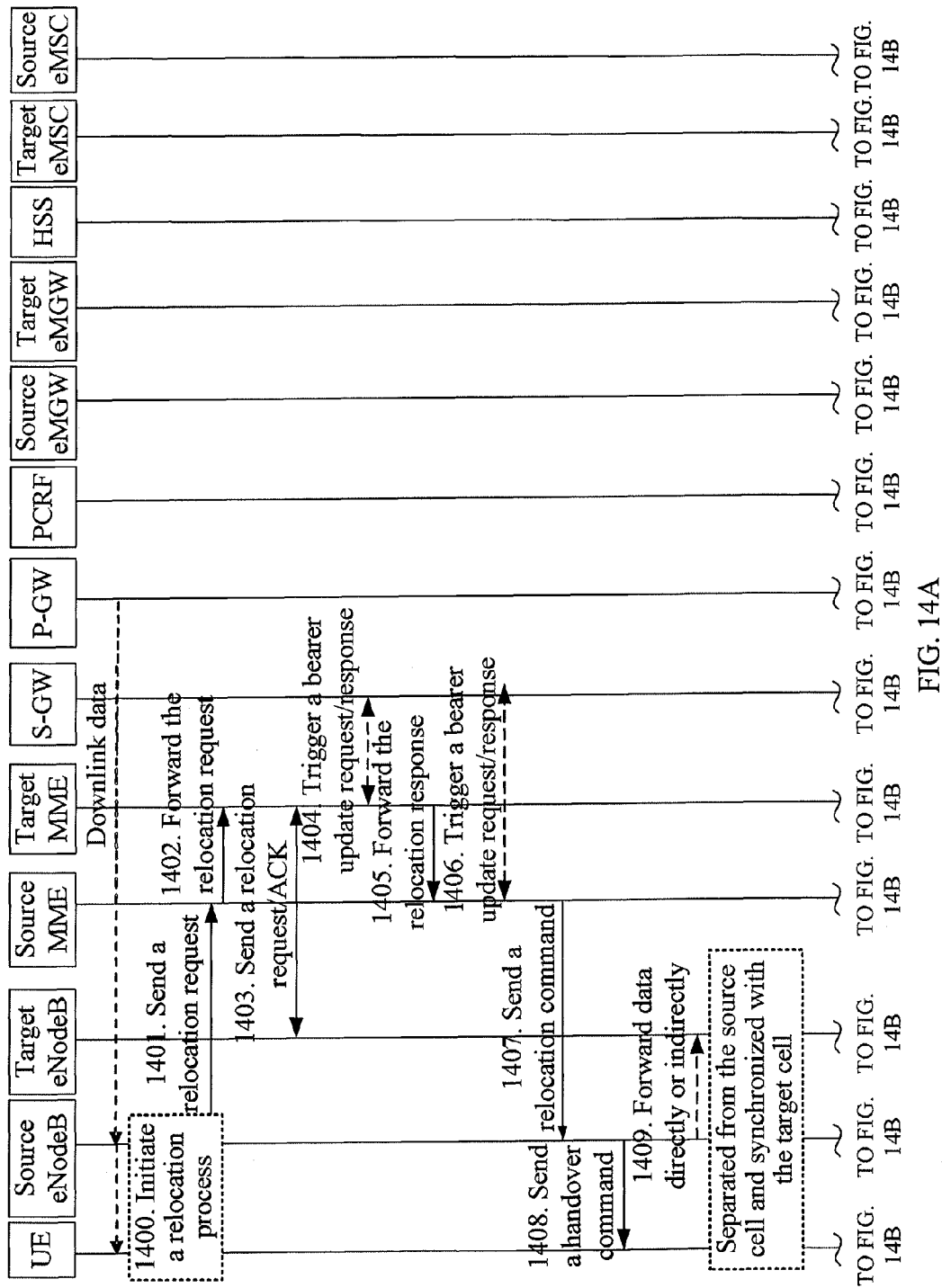
FIG. 14 shows a process of reattaching a UE to an eMSC due to MME relocation in an eleventh embodiment of the present disclosure.
Figure 14B:
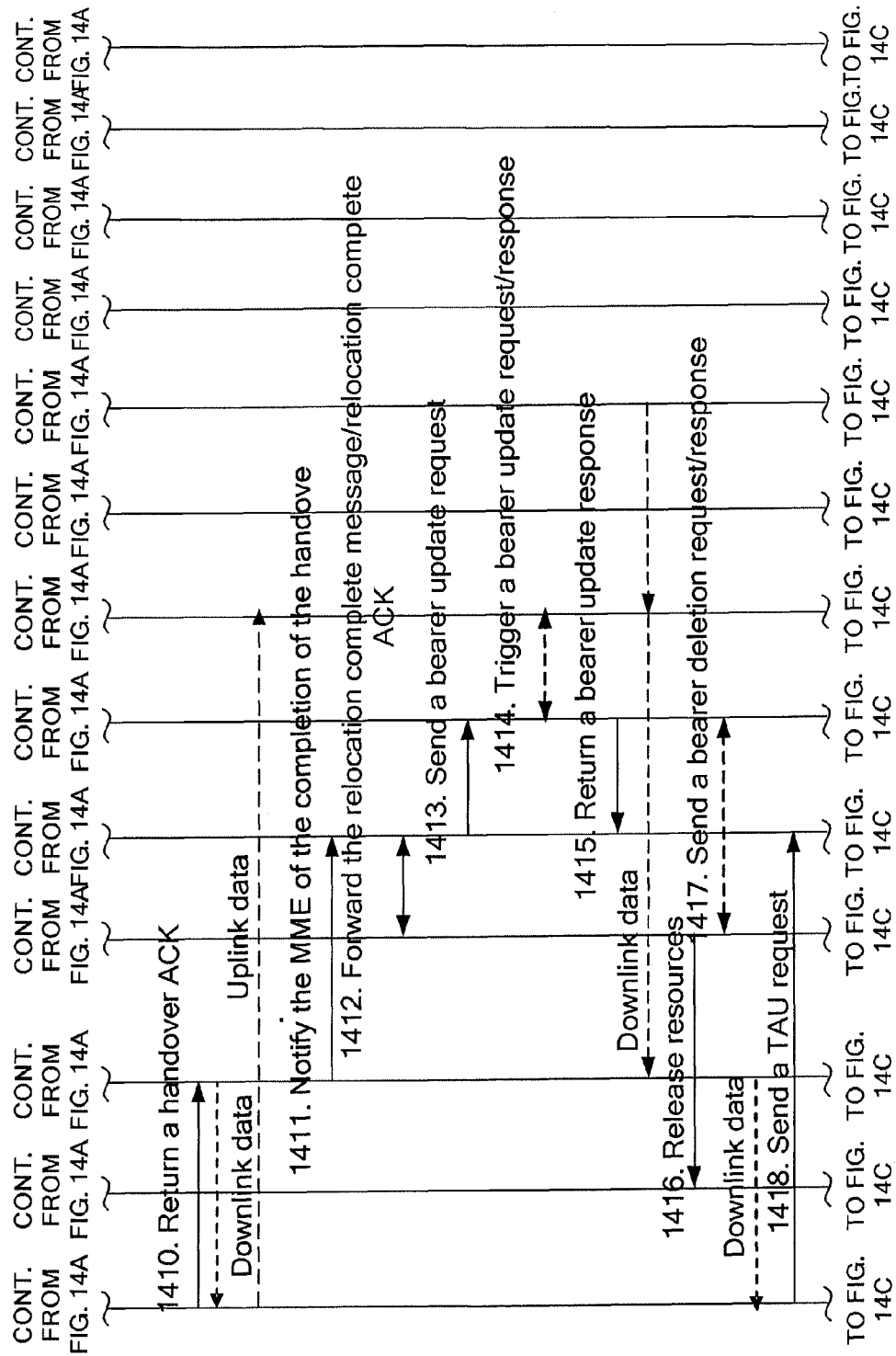
Figure 14C:
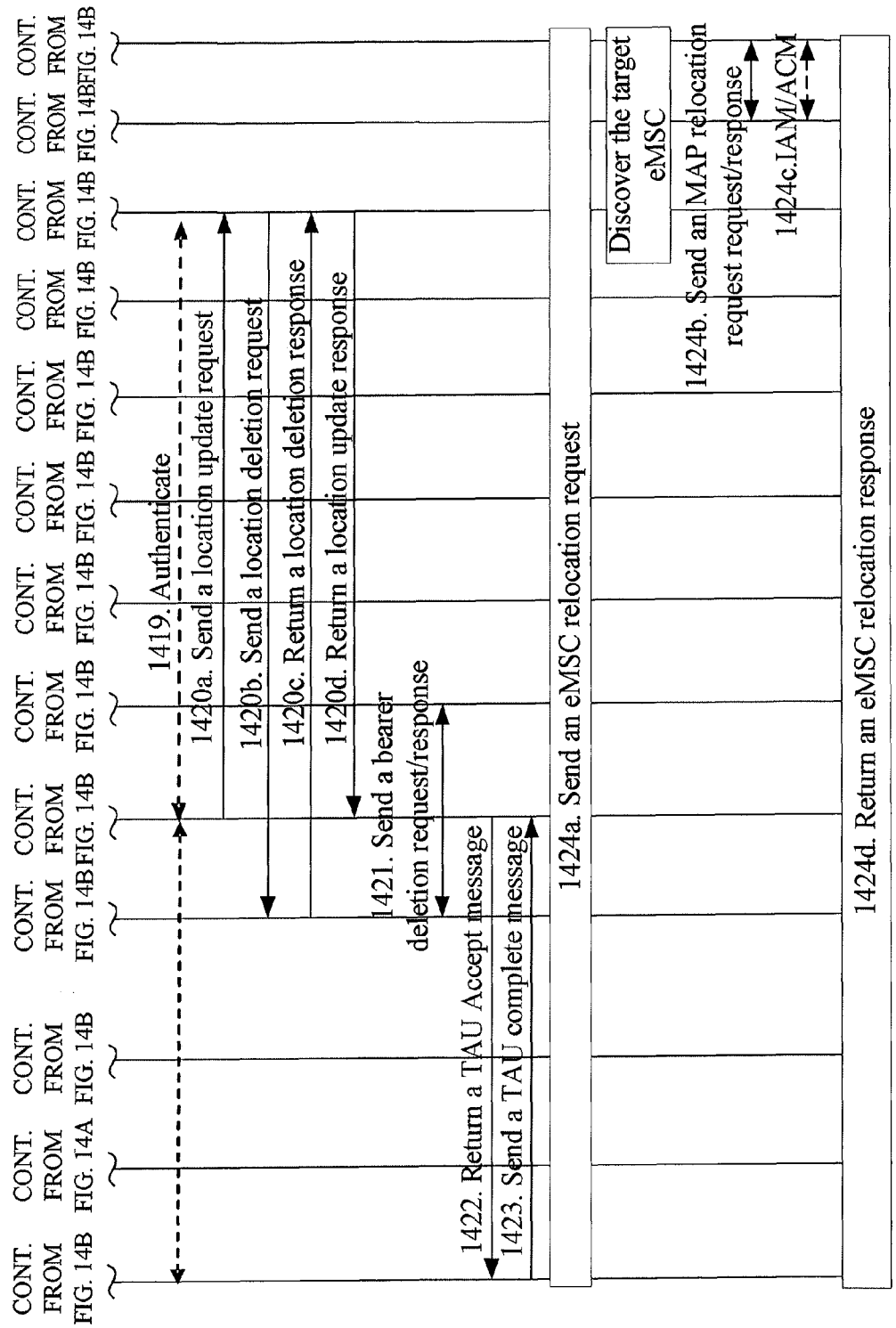

FIG. 14 shows a process of reattaching a UE to an eMSC due to MME relocation in the eleventh embodiment of the present disclosure. The scenario is as follows: when the Gs+ interface does not exist between the MME and the eMSC and the simulated CSoPS service is available in the system but related media planes remain unchanged, the UE is reattached to a new eMSC due to MME relocation.

The difference between the eleventh embodiment and the ninth embodiment is as follows: In the eleventh embodiment, there is no interface between the MME and the eMSC. Thus, to send a relocation request to the source eMSC, the target MME needs to forward the eMSC relocation request to the source eMSC through the UE or the network entity via a logical channel, a logical entity, or the PCC system. For example, to implement the preceding process through the IP connection, the target MME sends an eMSC relocation request to the UE after the tracking area of the target MME is updated, and then the UE sends the eMSC relocation request to the source eMSC through the IP connection.

This embodiment describes a process of reattaching a UE to a new eMSC due to MME relocation by taking the IP connection as an example. As shown in FIG. 14, the process includes the following steps:

Step 1400 to step 1405: The source access network sends a relocation request to the target access network and receives a response from the target access network. This process is the same as step 1200 to step 1205.

Step 1406 to step 1423: The process of relocating the MME is the same as step 1207 to step 1224.

In step 1422, the target MME provides the UE with the address information of the target eMSC through a TAU Accept message.

Step 1424: The UE sends an eMSC relocation request to the source eMSC through the IP connection. The source eMSC establishes a CS domain bearer between the target eMSC and the source eMSC. The source eMSC sends a relocation response to the UE.

Twelfth Embodiment

Figure 15A:
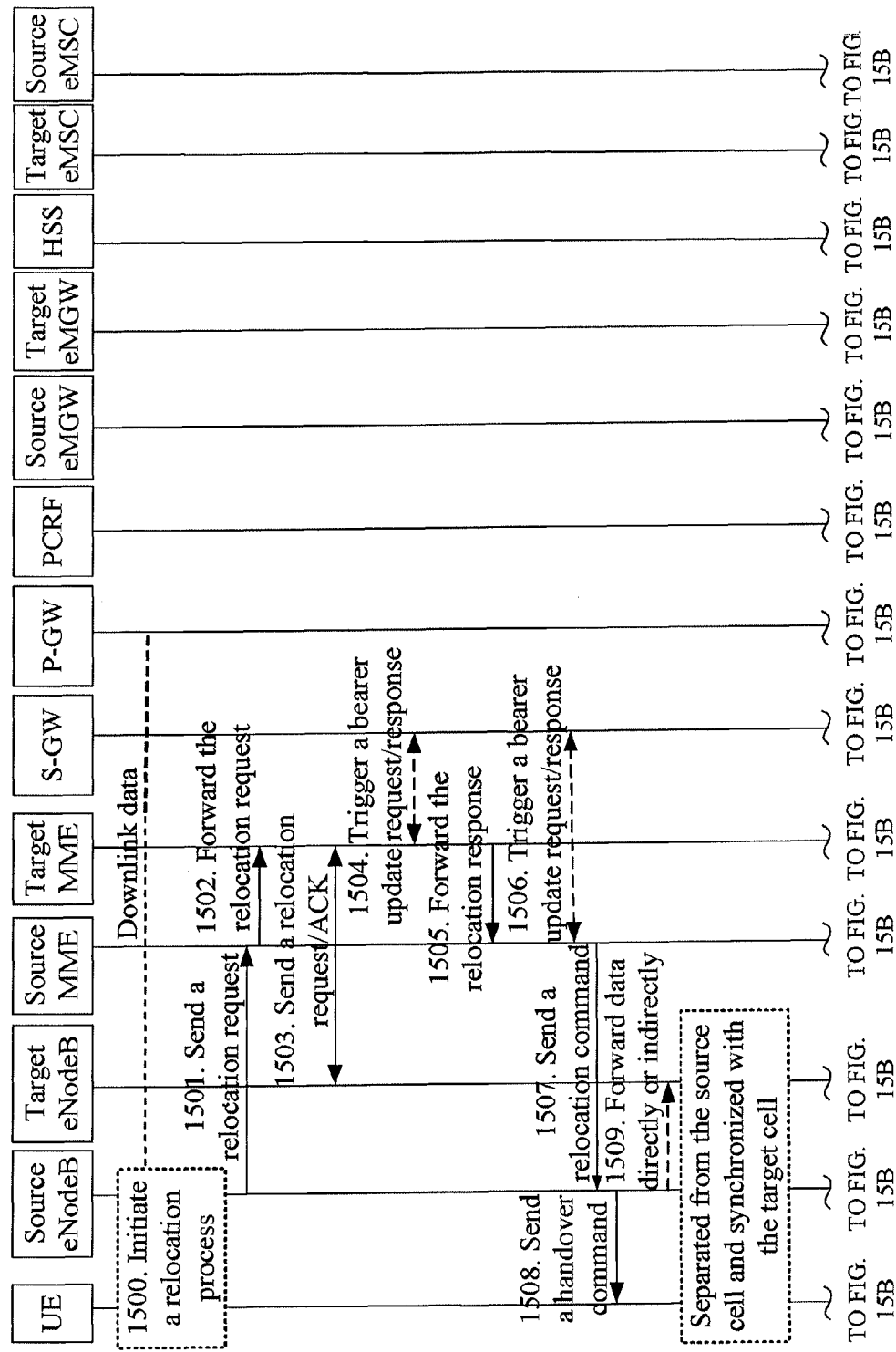
FIG. 15 shows a process of reattaching a UE to an eMSC due to MME relocation in a twelfth embodiment of the present disclosure.
Figure 15B:
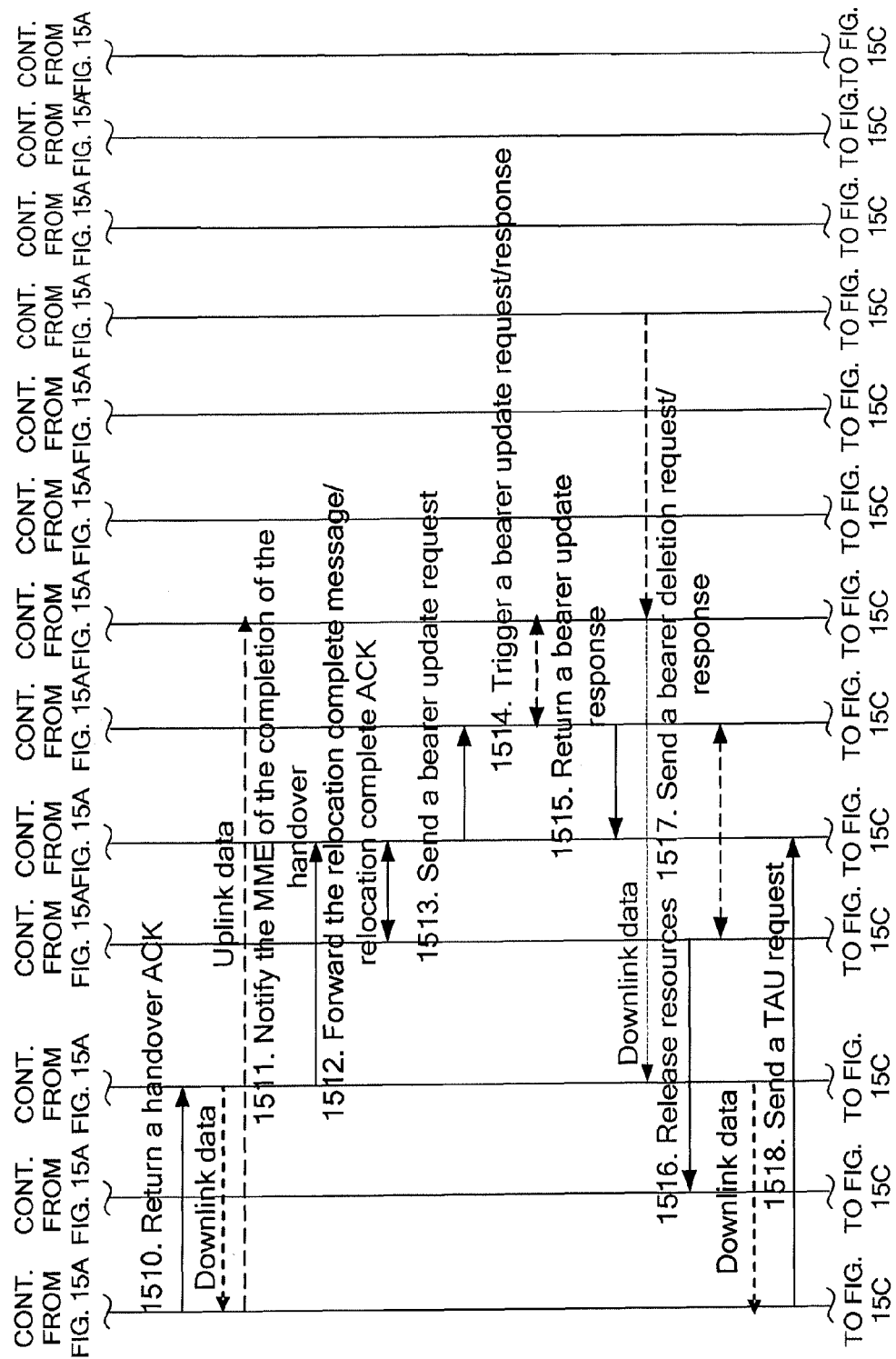
Figure 15C:
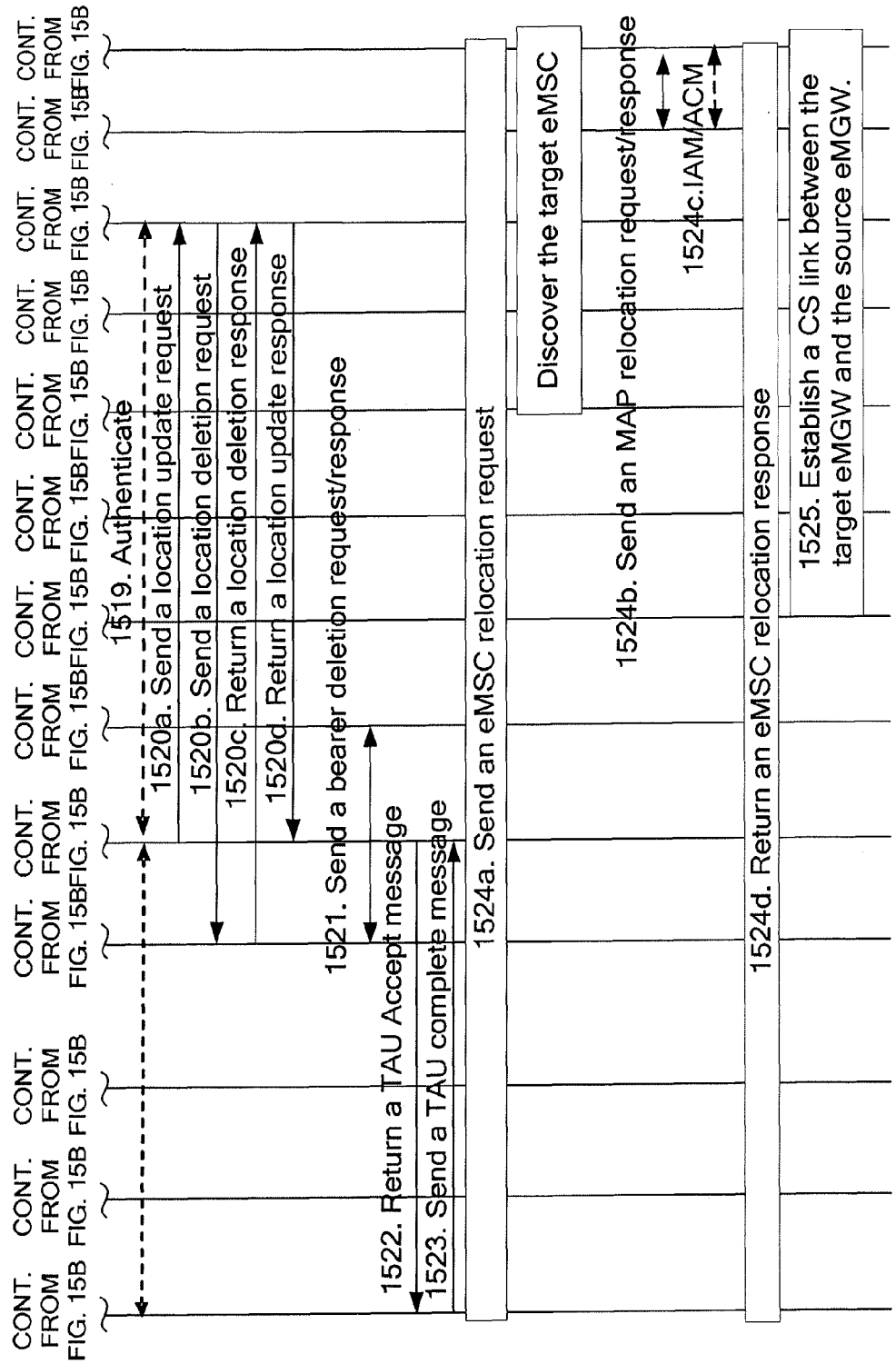

FIG. 15 shows a process of reattaching a UE to an eMSC due to MME relocation in the twelfth embodiment of the present disclosure. The scenario is as follows: when the Gs+ interface does not exist between the MME and the eMSC and the simulated CSoPS service is available in the system and changes occur to related media planes, the UE is reattached to a new eMSC due to MME relocation.

The difference between the twelfth embodiment and the eleventh embodiment is as follows: In the eleventh embodiment, related media planes remain unchanged which means the relocation of the eMSC may not result in the change of the eMGW. In the twelfth embodiment, the media planes are changed so that the relocation of the eMSC requires selection of a new eMGW to carry media services and establishment of a connection between the new eMSC and the old eMSC.

As shown in FIG. 15, the process includes the following steps:

Step 1500 to step 1524: The process of relocating the eMSC due to MME relocation is the same as step 1400 to step 1424.

Step 1525: After the source eMSC returns a relocation ACK to the target MME, the source eMSC controls the source MGW and the target MSC to establish a media association (that is, a media path) between the source MGW and the target MGW. Then, the source eMSC changes the current path of media streams in a special CS domain of the UE through the PCC system. For example, the source eMSC controls the creation and modification of the stream template previously carried in the PS domain or controls the PDN-GW to forward the media data to the target MSC by using a specific route. If the source eMSC modifies the media plane by modifying the stream template, the source eMSC may also notify the UE of new related media plane parameters so that the UE initiates the bearer modification. After all the bearers are associated, the new bearer plane path of the UE is as follows: UE—P-GW—target MGW—source MGW—remote UE.

Thirteenth Embodiment

Figure 16:
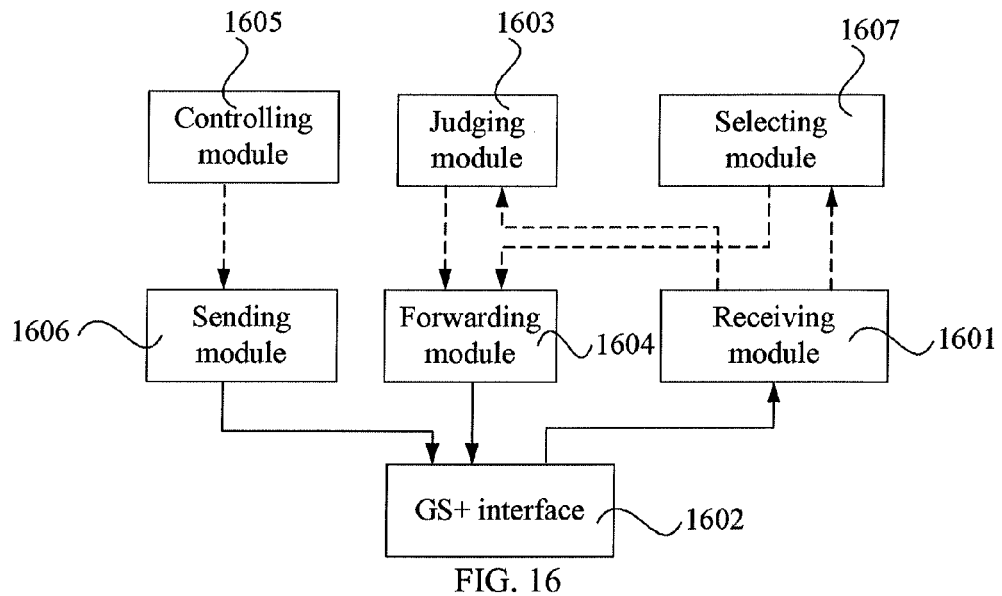
FIG. 16 shows a structure of a handover apparatus in a thirteenth embodiment of the present disclosure.

FIG. 16 shows a structure of a handover apparatus in the thirteenth embodiment of the present disclosure. The handover apparatus may perform the handover method described in the first embodiment to the sixth embodiment.

As shown in FIG. 16, the handover apparatus includes a receiving module 1601, a GS+ interface 1602, a judging module 1603, a forwarding module 1604, a controlling module 1605, a sending module 1606, and a selecting module 1607.

After the receiving module 1601 receives a relocation request from the PS network via the GS+ interface 1602, the judging module 1603 determines to initiate an inter MSC relocation request. The forwarding module 1604 sends the inter MSC relocation request to the MSC-B requesting the MSC-B to establish a media plane association with the MGW-B. In addition, the controlling module 1605 establishes a media plane association between the eMGW and the MGW-B according to the relocation request received by the receiving module 1601. After the media plane association between the eMGW and the MGW-B is established, the sending module 1606 sends a handover command to the UE via the GS+ interface 1602 through the MME and the eNB.

After the receiving module 1601 receives a relocation request from the CS network, the selecting module 1607 selects an MME, and the forwarding module 1604 sends the relocation request to the MME selected by the selecting module 1607 via the GS+ interface 1602 requesting the MME to establish a media plane association with the media plane of the eNB. In addition, the controlling module 1605 establishes a media plane association between the eMGW and the P-GW according to the relocation request received by the receiving module 1601. After the media plane association between the eMGW and the P-GW is established, the sending module 1606 sends a handover command to the UE via the GS+ interface through the MCS-B and the BSS.

Fourteenth Embodiment

Figure 17:
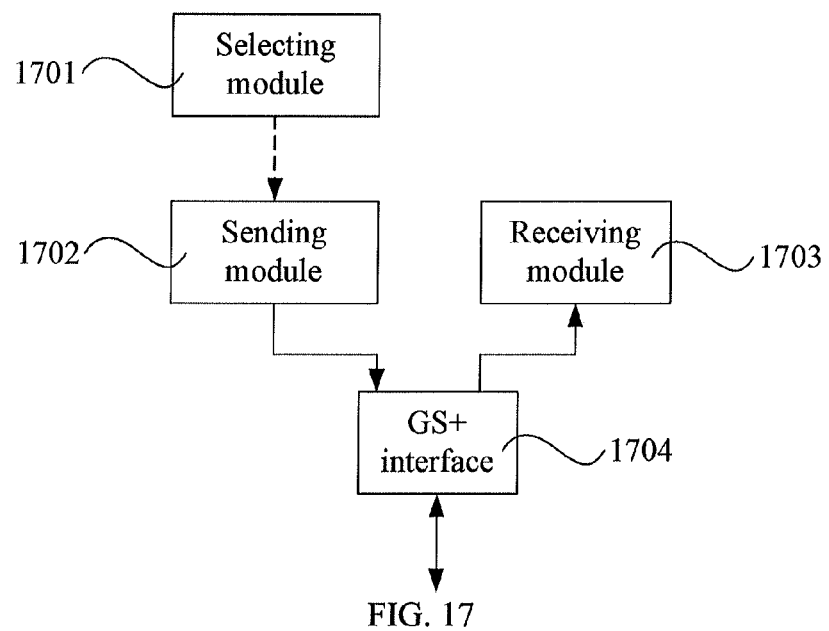
FIG. 17 shows a structure of an apparatus for reattaching a UE to an eMSC in a fourteenth embodiment of the present disclosure.

FIG. 17 shows a structure of an apparatus for reattaching a UE to an eMSC in the fourteenth embodiment of the present disclosure. The apparatus may perform the method for reattaching a UE to an eMSC described in the seventh embodiment and the eighth embodiment.

As shown in FIG. 17, the apparatus includes a selecting module 1701, a sending module 1702, a receiving module 1703, and a GS+ interface 1704.

After the selecting module 1701 selects a target eMSC, the sending module 1702 sends a location update request to the target eMSC via the GS+ interface 1704.

The receiving module 1703 receives a location update ACK from the target eMSC via the GS+ interface 1704.

Fifteenth Embodiment

Figure 18:
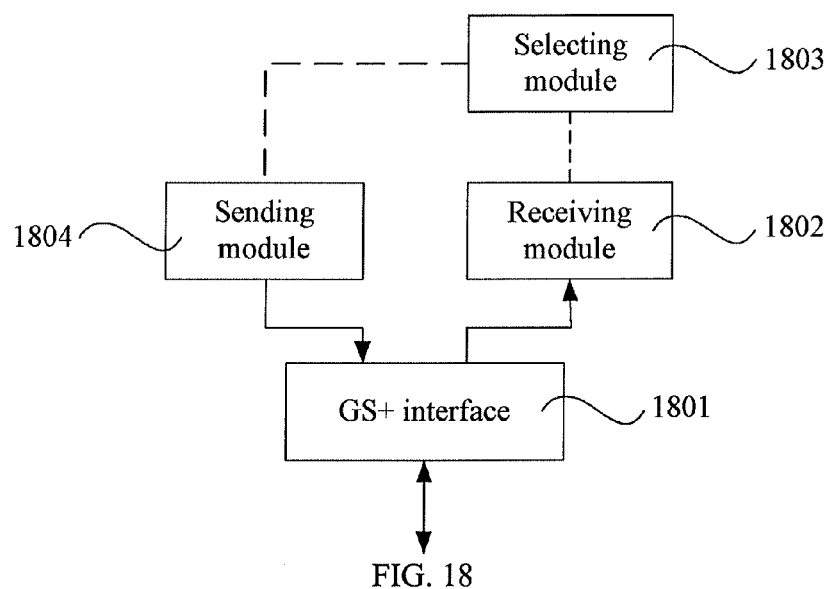
FIG. 18 shows a structure of an apparatus for reattaching a UE to an eMSC in a fifteenth embodiment of the present disclosure.

FIG. 18 shows a structure of an apparatus for reattaching a UE to an eMSC in the fifteenth embodiment of the present disclosure. The apparatus may perform the method for reattaching a UE to an eMSC described in the ninth embodiment and the twelfth embodiment.

As shown in FIG. 18, the apparatus includes a GS+ interface 1801, a receiving module 1802, a selecting module 1803, and a sending module 1804.

The receiving module 1802 receives a relocation request from the target MME via the GS+ interface 1801. The selecting module 1803 selects a target eMSC according to the relocation request received by the receiving module 1802. The sending module 1804 sends the relocation request received by the receiving module 1802 to the target eMSC selected by the selecting module 1803 via the GS+ interface 1801. The sending module 1804 sends a relocation response to the target MME via the GS+ interface 1801 after the target eMSC establishes a circuit connection.

Although the technical solution of the present disclosure has been described through exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the claims or their equivalents.

What is claimed is:

1. A method of handover for a user equipment (UE), comprising:
 receiving, by an evolved NodeB (eNB), in a first network, a measurement parameter from the UE; wherein the first network is a packet switched (PS) domain network;

analyzing, by the eNB, that whether a neighbor cell belongs to a circuit switched (CS) domain, and judging whether the neighbor cell has CS capability according to the measurement parameter reported from the UE;

determining, by the eNB, the relocation is a PS domain-CS domain relocation if the neighbor cell belongs to the CS domain and the neighbor cell has the CS capability;

sending, by the eNB, a relocation request to a target mobility management entity, MME, in the PS domain network, so as to enable the MME sends a relocation command to an evolved mobile switching centre (eMSC);

wherein the relocation request carries a relocation cause value, a target cell list and a context ID of a bearer that needs to be forwarded to a peer entity, and the relocation cause value indicates that the relocation is a PS domain-CS domain relocation.

2. The method according to claim 1, the method further comprising:

sending, by the eMSC, a prepare handover request to a second network to request the second network to establish a media stream association of the second network, wherein the second network is the CS domain network; and instructing, by the eMSC, the UE to access the second network.

3. The method according to claim 1, wherein the measurement parameter comprises at least one of dual transfer mode (DTM) switching support information, network load information and cell feature indication.

4. The method according to claim 1, wherein, before the forwarding, by the core network entity in the first network, the relocation request to the eMSC, the method further comprises:

requesting, by the MME, a home subscriber server (HSS) to provide address of the eMSC;

discovering, by the MME, the eMSC according to network planning and operator's policy;

discovering, by the MME, the eMSC according to mapping relationship between the MME and the eMSC; or discovering, by the MME, the eMSC according to a traditional location area (TA).

5. The method according to claim 1, wherein sending a prepare handover request to a second network, comprises:

sending, by the eMSC, the prepare handover request to a target MSC in the second network;

wherein establishing, by the second network, a media stream association of the second network, comprises:

establishing, by the target MSC, a media stream association between the target MSC and a base station subsystem, BSS, in the second network;

wherein after establishing, by the target MSC, a media stream association between the target MSC and a BSS in the second network, the method further comprises:

sending, by the target MSC, a Iu relocation request to the BSS to reserve radio resource.

6. The method according to claim 1, wherein, the instructing, by the eMSC, a user equipment, UE, to access the second network, comprises:

sending, by the eMSC, a handover command via the first network to the UE; and connecting, by the UE, to the BSS in the second network, and accessing the second network via the BSS;

wherein, the sending, by the eMSC, a handover command via the first network to the UE, comprises:

forwarding, by the eMSC, to the MME a relocation response, that the relocation response carries radio parameter configuration of the UE used in the CS domain;

forwarding, by the MME, the relocation response to the eNB; and sending, by the eNB, the handover command to the UE that the handover command carries the radio parameter configuration for the UE to connect the BSS.

7. The method according to claim 1, wherein, after instructing, by the eMSC, a UE to access the second network, the method further comprises:

forwarding, by the eMSC, a relocation complete message to an MME; and initiating, by the MME, a modification process of a PS domain media plane bearer;

wherein the initiating, by the MME, a modification process of a PS domain media plane bearers, comprises:

initiating, by the MME, the bearer modification process, and setting the parameter of the bearer to 0; or sending, by the MME, a bear reservation instruction to a serving gateway (S-GW) or a packet data network gateway (P-GW) to reserve related bearers, and notifying a policy and charging control (PCC) system to adjust PCC policy.

8. An evolved NodeB (eNB) of a first network, comprising:

a receiver, configured to receive a measurement parameter from the UE; wherein the first network is a packet switched (PS) domain network;

a processor, configured to analyze whether a neighbor cell belongs to a circuit switched (CS) domain, judge whether the neighbor cell has CS capability according to the measurement parameter reported from the UE, and determine the relocation is a PS domain-CS domain relocation if the neighbor cell belongs to the CS domain and the neighbor cell has the CS capability;

a transmitter, configured to send a relocation request to a target mobility management entity, MME, in the PS domain network, so as to enable the MME sends a relocation command to an evolved mobile switching centre (eMSC);

wherein the relocation request carries a relocation cause value, a target cell list and a context ID of a bearer that needs to be forwarded to a peer entity, and the relocation cause value indicates that the relocation is a PS domain-CS domain relocation.

9. The eNB according to claim 8, wherein the measurement parameter comprises at least one of dual transfer mode (DTM) switching support information, network load information and cell feature indication.

* * * * *